(12) United States Patent
Church et al.

(10) Patent No.: US 12,514,944 B2
(45) Date of Patent: Jan. 6, 2026

(54) SYSTEMS AND METHODS FOR IMPLEMENTING TREATMENT OF BIOLOGICAL FLUIDS

(71) Applicant: Cerus Corporation, Concord, CA (US)

(72) Inventors: Daniel Church, Danville, CA (US); Tracey Kirkman, Danville, CA (US); Marc Stern, Oakland, CA (US); Hosna Akhlaghpour, Belmont, CA (US)

(*) Notice: Subject to any disclaimer, the term of this patent is extended or adjusted under 35 U.S.C. 154(b) by 544 days.

(21) Appl. No.: 16/908,156

(22) Filed: Jun. 22, 2020

(65) Prior Publication Data

US 2020/0397935 A1 Dec. 24, 2020

Related U.S. Application Data

(60) Provisional application No. 63/035,616, filed on Jun. 5, 2020, provisional application No. 62/869,542, filed
(Continued)

(51) Int. Cl.
*A61L 2/24* (2006.01)
*A61L 2/10* (2006.01)
(Continued)

(52) U.S. Cl.
CPC ........ *A61L 2/24* (2013.01); *A61L 2/10* (2013.01); *G06F 3/04817* (2013.01);
(Continued)

(58) Field of Classification Search
CPC .............................. A61L 2202/122; A61L 2/10
See application file for complete search history.

(56) References Cited

U.S. PATENT DOCUMENTS 5,167,656 A 12/1992 Lynn
5,221,608 A 6/1993 Cimino et al.
(Continued)

FOREIGN PATENT DOCUMENTS

CN 1284886 A 2/2001
CN 1450916 A 10/2003
(Continued)

OTHER PUBLICATIONS

CN 105412960 A_translation.*
(Continued)

*Primary Examiner* — Elizabeth A Robinson
*Assistant Examiner* — Changru Chen
(74) *Attorney, Agent, or Firm* — MORRISON & FOERSTER LLP

(57) ABSTRACT

Disclosed herein are systems and methods for implementing a plurality of graphical user interfaces. In one or more examples, an electronic device can include a display that provides the users with a series of graphical user interfaces, each graphical user interface corresponding to one or more of a plurality steps that a user can engage in to operate the electronic device. The one or more graphical user interfaces can include a visual depiction of what the user should be doing to operate the device at a given time, and can provide the user with information necessary such as processing status and identification information of the material being treated so as to operate the device. In one or more examples, the plurality of graphical user interfaces can place data and information of the screen that corresponds to the physical layout of the electronic device.

45 Claims, 28 Drawing Sheets

Related U.S. Application Data on Jul. 1, 2019, provisional application No. 62/865,210, filed on Jun. 22, 2019.

(51) Int. Cl.
    *G06F 3/04817* (2022.01)
    *G06F 3/0482* (2013.01)

(52) U.S. Cl.
    CPC ...... *G06F 3/0482* (2013.01); *A61L 2202/122* (2013.01); *A61L 2202/14* (2013.01); *A61L 2202/22* (2013.01)

(56) References Cited

U.S. PATENT DOCUMENTS

| | | | |
|---|---|---|---|
| 5,288,605 | A | 2/1994 | Lin et al. |
| 5,399,719 | A | 3/1995 | Wollowitz et al. |
| 5,405,343 | A | 4/1995 | Mohr |
| 5,418,130 | A | 5/1995 | Platz et al. |
| 5,459,030 | A | 10/1995 | Lin et al. |
| 5,482,828 | A | 1/1996 | Lin et al. |
| 5,556,958 | A | 9/1996 | Carroll |
| 5,556,993 | A | 9/1996 | Wollowitz |
| 5,559,250 | A | 9/1996 | Cook |
| 5,571,082 | A | 11/1996 | Bashikirov |
| 5,578,736 | A | 11/1996 | Wollowitz |
| 5,585,503 | A | 12/1996 | Wollowitz |
| 5,589,462 | A | 12/1996 | Patat |
| 5,593,823 | A | 1/1997 | Wollowitz et al. |
| 5,618,662 | A | 4/1997 | Lin et al. |
| 5,625,079 | A | 4/1997 | Wollowitz et al. |
| 5,654,443 | A | 8/1997 | Wollowitz |
| 5,691,132 | A | 11/1997 | Wollowitz et al. |
| 5,709,991 | A | 1/1998 | Lin et al. |
| 5,712,085 | A | 1/1998 | Wollowitz |
| 5,871,900 | A | 2/1999 | Wollowitz |
| 5,908,742 | A | 6/1999 | Lin et al. |
| 5,965,349 | A | 10/1999 | Lin |
| 5,972,593 | A | 10/1999 | Wollowitz |
| 6,004,741 | A | 12/1999 | Wollowitz |
| 6,004,742 | A | 12/1999 | Wollowitz |
| 6,017,691 | A | 1/2000 | Wollowitz et al. |
| 6,093,725 | A | 7/2000 | Cook et al. |
| 6,133,460 | A | 10/2000 | Wollowitz et al. |
| 6,143,490 | A | 11/2000 | Cook et al. |
| 6,171,777 | B1 | 1/2001 | Cook |
| 6,177,441 | B1 | 1/2001 | Cook et al. |
| 6,194,139 | B1 | 2/2001 | Wollowitz |
| 6,218,100 | B1 | 4/2001 | Wollowitz |
| 6,251,580 | B1 | 6/2001 | Lin |
| 6,270,952 | B1 | 8/2001 | Cook et al. |
| 6,277,337 | B1 | 8/2001 | Goodrich, Jr. et al. |
| 6,281,225 | B1 | 8/2001 | Hearst et al. |
| 6,410,219 | B1 | 6/2002 | Cook et al. |
| 6,420,570 | B1 | 7/2002 | Wollowitz |
| 6,433,343 | B1 | 8/2002 | Cimino et al. |
| 6,455,286 | B1 | 9/2002 | Wollowitz |
| 6,469,052 | B2 | 10/2002 | Wollowitz |
| 6,494,753 | B1 | 12/2002 | Tomasino |
| 6,503,699 | B1 | 1/2003 | Wollowitz et al. |
| 6,514,987 | B1 | 2/2003 | Cook et al. |
| 6,544,727 | B1 | 4/2003 | Hei |
| 6,548,242 | B2 | 4/2003 | Horowitz et al. |
| 6,565,802 | B1 | 5/2003 | Hanley |
| 6,586,749 | B2 | 7/2003 | Cimino |
| 6,686,480 | B2 | 2/2004 | Wollowitz |
| 6,709,810 | B2 | 3/2004 | Cook |
| 6,843,961 | B2 | 1/2005 | Hlavinka et al. |
| 6,949,753 | B2 | 9/2005 | Cimino |
| 6,951,713 | B2 | 10/2005 | Hei et al. |
| 6,986,867 | B2 | 1/2006 | Hanley et al. |
| 7,025,877 | B1 | 4/2006 | De Gheldere |
| 7,037,642 | B2 | 5/2006 | Hei et al. |
| 7,105,093 | B2 | 9/2006 | De Gheldere |
| 7,293,985 | B2 | 11/2007 | Cook |
| 7,425,304 | B2 | 9/2008 | De Gheldere |
| 7,433,030 | B2 | 10/2008 | Waldo et al. |
| 7,459,695 | B2 | 12/2008 | Hanley et al. |
| 7,601,298 | B2 | 10/2009 | Waldo et al. |
| 7,611,831 | B2 | 11/2009 | Hei |
| 7,655,392 | B2 | 2/2010 | Stassinopoulos |
| 7,788,038 | B2 | 8/2010 | Oshita |
| 7,829,867 | B2 | 11/2010 | Hlavinka et al. |
| 8,296,071 | B2 | 10/2012 | Edrich et al. |
| 8,492,162 | B2 | 7/2013 | Kippenhan |
| 8,778,263 | B2 | 7/2014 | Walker et al. |
| 8,900,805 | B2 | 12/2014 | Mufti et al. |
| 9,259,525 | B2 | 2/2016 | Hei |
| 9,320,817 | B2 | 4/2016 | Walker et al. |
| 9,713,627 | B2 | 7/2017 | Mufti |
| 10,004,821 | B2 | 6/2018 | Dobrinsky |
| 10,357,516 | B2 | 7/2019 | Mufti |
| 10,506,915 | B2 | 12/2019 | Iwasaki |
| 10,758,868 | B2 | 9/2020 | Fulkerson |
| 10,799,533 | B2 | 10/2020 | Corash |
| 10,842,818 | B2 | 11/2020 | Vermeij |
| 11,096,963 | B2 | 8/2021 | Corash et al. |
| 11,554,185 | B2 | 1/2023 | Church et al. |
| 11,660,365 | B2 | 5/2023 | Thompson |
| 11,883,544 | B2 | 1/2024 | Church |
| 2001/0009756 | A1 | 7/2001 | Hei |
| 2001/0018179 | A1 | 8/2001 | Hei |
| 2002/0006393 | A1 | 1/2002 | Wollowitz |
| 2002/0028432 | A1 | 3/2002 | Cook |
| 2002/0042043 | A1 | 4/2002 | Stassinopoulos |
| 2002/0115585 | A1 | 8/2002 | Hei |
| 2002/0192632 | A1 | 12/2002 | Hei |
| 2003/0035751 | A1 | 2/2003 | Hanley et al. |
| 2003/0062483 | A1 | 4/2003 | Cimino |
| 2003/0105339 | A1 | 6/2003 | Wollowitz |
| 2003/0113704 | A1 | 6/2003 | Stassinopoulos |
| 2003/0146162 | A1 | 8/2003 | Metzel et al. |
| 2003/0185804 | A1 | 10/2003 | Wollowitz et al. |
| 2003/0207247 | A1 | 11/2003 | Stassinopoulos et al. |
| 2003/0219354 | A1 | 11/2003 | Hlavinka et al. |
| 2004/0021809 | A1 | 2/2004 | Sumiyoshi et al. |
| 2004/0029897 | A1 | 2/2004 | Cook |
| 2004/0088189 | A1 | 5/2004 | Veome et al. |
| 2004/0172007 | A1 | 9/2004 | Grimm et al. |
| 2004/0180321 | A1 | 9/2004 | Cook |
| 2004/0185544 | A9 | 9/2004 | Hei |
| 2004/0185553 | A9 | 9/2004 | Hei |
| 2004/0197343 | A1 | 10/2004 | Dubensky et al. |
| 2004/0228877 | A1 | 11/2004 | Dubensky et al. |
| 2005/0142542 | A1 | 6/2005 | Hei |
| 2005/0175625 | A1 | 8/2005 | Jaffee et al. |
| 2005/0202395 | A1 | 9/2005 | Edrich et al. |
| 2005/0249748 | A1 | 11/2005 | Dubensky et al. |
| 2005/0281783 | A1 | 12/2005 | Kinch et al. |
| 2006/0093999 | A1 | 5/2006 | Hei |
| 2006/0115466 | A1 | 6/2006 | Stassinopoulos |
| 2006/0197031 | A1 | 9/2006 | De Gheldere et al. |
| 2006/0221329 | A1 | 10/2006 | Waldo et al. |
| 2007/0031457 | A1 | 2/2007 | Dubensky et al. |
| 2007/0190029 | A1 | 8/2007 | Pardoll et al. |
| 2007/0190063 | A1 | 8/2007 | Bahjat et al. |
| 2007/0207170 | A1 | 9/2007 | Dubensky et al. |
| 2007/0207171 | A1 | 9/2007 | Dubensky et al. |
| 2007/0235376 | A1 | 10/2007 | Daniel |
| 2009/0250626 | A1 | 10/2009 | Schlesser et al. |
| 2010/0133160 | A1 | 6/2010 | Hei |
| 2011/0286987 | A1 | 11/2011 | Mufti |
| 2012/0070339 | A1 | 3/2012 | Lawal |
| 2012/0073614 | A1* | 3/2012 | Otani .............. A61L 2/186 134/56 R |
| 2012/0153783 | A1 | 6/2012 | Shoenfeld |
| 2012/0313014 | A1 | 12/2012 | Stibich et al. |
| 2013/0320299 | A1 | 12/2013 | Li |
| 2013/0323128 | A1 | 12/2013 | Owen et al. |
| 2014/0303547 | A1 | 10/2014 | Loupis et al. |
| 2014/0346370 | A1 | 11/2014 | Dobrinsky et al. |
| 2014/0353519 | A1 | 12/2014 | Wang |
| 2015/0157665 | A1 | 6/2015 | Mufti |
| 2015/0299000 | A1 | 10/2015 | Smith et al. |

(56) References Cited

U.S. PATENT DOCUMENTS

| | | |
|---|---|---|
| 2016/0354533 A1 | 12/2016 | Hei |
| 2017/0014538 A1 | 1/2017 | Rantala |
| 2017/0027986 A1 | 2/2017 | Corash et al. |
| 2017/0028121 A1 | 2/2017 | Manzella et al. |
| 2017/0050046 A1 | 2/2017 | Walder et al. |
| 2017/0054687 A1 | 2/2017 | Ishigaki |
| 2017/0202882 A1 | 7/2017 | Vermeij |
| 2017/0252474 A1* | 9/2017 | Thompson ............... A61L 2/04 |
| 2017/0304363 A1 | 10/2017 | Corash |
| 2018/0008639 A1 | 1/2018 | Mufti |
| 2018/0113066 A1 | 4/2018 | Freitag et al. |
| 2018/0147306 A1 | 5/2018 | Crawley et al. |
| 2018/0184985 A1 | 7/2018 | Håkansson et al. |
| 2018/0185484 A1 | 7/2018 | Greenman et al. |
| 2018/0193500 A1 | 7/2018 | Safavi et al. |
| 2018/0289873 A1 | 10/2018 | David |
| 2018/0318348 A1 | 11/2018 | Corash et al. |
| 2018/0369437 A1 | 12/2018 | Grossman et al. |
| 2019/0085289 A1 | 3/2019 | Greenman |
| 2019/0099543 A1 | 4/2019 | Sasaki |
| 2019/0100718 A1 | 4/2019 | Estes et al. |
| 2019/0209718 A1 | 7/2019 | Church |
| 2019/0321407 A1 | 10/2019 | Erickson et al. |
| 2019/0369087 A1 | 12/2019 | North et al. |
| 2020/0078406 A1 | 3/2020 | Weiner et al. |
| 2020/0397931 A1 | 12/2020 | Church et al. |
| 2020/0405891 A1 | 12/2020 | Church et al. |
| 2021/0038802 A1 | 2/2021 | Madsen |
| 2021/0052804 A1 | 2/2021 | Madsen |
| 2021/0187020 A1 | 6/2021 | Corash et al. |
| 2021/0260114 A1 | 8/2021 | Corash et al. |
| 2021/0322479 A1 | 10/2021 | Vermeij |
| 2022/0031917 A1 | 2/2022 | Cahyadi et al. |
| 2022/0118136 A1 | 4/2022 | Church et al. |
| 2023/0226232 A1 | 7/2023 | Church et al. |
| 2024/0108767 A1 | 4/2024 | Church |
| 2024/0350687 A1 | 10/2024 | Church |

FOREIGN PATENT DOCUMENTS

| | | | |
|---|---|---|---|
| CN | 203017432 U | 6/2013 | |
| CN | 105412960 A * | 3/2016 | |
| CN | 106421864 A | 2/2017 | |
| CN | 107075478 A | 8/2017 | |
| CN | 107852359 A | 3/2018 | |
| EP | 1181061 B1 | 8/2006 | |
| EP | 3009946 A1 | 4/2016 | |
| JP | 2006501978 A | 1/2006 | |
| JP | 2006505349 A | 2/2006 | |
| JP | 2011036683 A | 2/2011 | |
| JP | 2015042266 A | 3/2015 | |
| JP | 2015171440 A | 10/2015 | |
| JP | 2017029717 A | 2/2017 | |
| JP | 2017077247 A | 4/2017 | |
| JP | 2017153966 A | 9/2017 | |
| JP | 2017184725 A | 10/2017 | |
| WO | 199300005 A1 | 1/1993 | |
| WO | 199317553 A1 | 9/1993 | |
| WO | 199403054 A1 | 2/1994 | |
| WO | 199420090 A1 | 9/1994 | |
| WO | 199427433 A1 | 12/1994 | |
| WO | 199428120 A1 | 12/1994 | |
| WO | 199500141 A1 | 1/1995 | |
| WO | 199512973 A1 | 5/1995 | |
| WO | 199519705 A1 | 7/1995 | |
| WO | 199608965 A1 | 3/1996 | |
| WO | 199614737 A1 | 5/1996 | |
| WO | 199614739 A1 | 5/1996 | |
| WO | 199614740 A1 | 5/1996 | |
| WO | 199639815 A1 | 12/1996 | |
| WO | 199639818 A1 | 12/1996 | |
| WO | 199639820 A1 | 12/1996 | |
| WO | 199640857 A1 | 12/1996 | |
| WO | 199721346 A1 | 6/1997 | |
| WO | 199737536 A1 | 10/1997 | |
| WO | 199818908 A1 | 5/1998 | |
| WO | 199830327 A1 | 7/1998 | |
| WO | 199830545 A1 | 7/1998 | |
| WO | 199903976 A2 | 1/1999 | |
| WO | 199903976 A3 | 5/1999 | |
| WO | 199926476 A1 | 6/1999 | |
| WO | 199934839 A1 | 7/1999 | |
| WO | 199934914 A1 | 7/1999 | |
| WO | 199934915 A1 | 7/1999 | |
| WO | 199959645 A1 | 11/1999 | |
| WO | 199963981 A2 | 12/1999 | |
| WO | 199963981 A3 | 4/2000 | |
| WO | 200074731 A1 | 12/2000 | |
| WO | 200191775 A2 | 12/2001 | |
| WO | 200191775 A3 | 6/2002 | |
| WO | 02053209 A1 | 7/2002 | |
| WO | 2003047650 A2 | 6/2003 | |
| WO | 2003049784 A2 | 6/2003 | |
| WO | 2003049784 A3 | 6/2003 | |
| WO | 2003061379 A2 | 7/2003 | |
| WO | 2003065787 A2 | 8/2003 | |
| WO | 2003078023 A1 | 9/2003 | |
| WO | 2003061379 A3 | 10/2003 | |
| WO | 2003090794 A1 | 11/2003 | |
| WO | 2003065787 A3 | 12/2003 | |
| WO | 2003047650 A3 | 2/2004 | |
| WO | 2004018471 A1 | 3/2004 | |
| WO | WO-2004033081 A2 * | 4/2004 | ............... A61L 2/00 |
| WO | 2004044810 A1 | 5/2004 | |
| WO | 2004033081 A3 | 6/2004 | |
| WO | 2004049914 A2 | 6/2004 | |
| WO | 2004050029 A2 | 6/2004 | |
| WO | 2004050848 A2 | 6/2004 | |
| WO | 2004050897 A2 | 6/2004 | |
| WO | 2004050897 A3 | 8/2004 | |
| WO | 2004050029 A3 | 10/2004 | |
| WO | 2004084936 A2 | 10/2004 | |
| WO | 2004050848 A3 | 12/2004 | |
| WO | 2004110481 A2 | 12/2004 | |
| WO | 2004049914 A3 | 2/2005 | |
| WO | 2005009463 A2 | 2/2005 | |
| WO | 2004110481 A3 | 3/2005 | |
| WO | 2005037233 A2 | 4/2005 | |
| WO | 2004084936 A3 | 6/2005 | |
| WO | 2005009463 A3 | 6/2005 | |
| WO | 2005067460 A2 | 7/2005 | |
| WO | 2005071088 A2 | 8/2005 | |
| WO | 2005092372 A2 | 10/2005 | |
| WO | 2005071088 A3 | 11/2005 | |
| WO | 2005037233 A3 | 1/2006 | |
| WO | 2006021314 A2 | 3/2006 | |
| WO | 2006050328 A1 | 5/2006 | |
| WO | 2005092372 A3 | 6/2006 | |
| WO | 2005067460 A3 | 10/2006 | |
| WO | 2007022511 A2 | 2/2007 | |
| WO | 2007022520 A2 | 2/2007 | |
| WO | 2007022520 A3 | 5/2007 | |
| WO | 2007022511 A3 | 9/2007 | |
| WO | 2007103225 A2 | 9/2007 | |
| WO | 2007103261 A2 | 9/2007 | |
| WO | 2007117371 A2 | 10/2007 | |
| WO | 2007103225 A3 | 5/2008 | |
| WO | 2007103261 A3 | 12/2008 | |
| WO | 2007117371 A3 | 12/2008 | |
| WO | 2008156813 A1 | 12/2008 | |
| WO | 2009126786 A2 | 10/2009 | |
| WO | 2009126786 A3 | 7/2010 | |
| WO | 2011120172 A1 | 10/2011 | |
| WO | 2012018484 A2 | 2/2012 | |
| WO | 2012018484 A3 | 2/2012 | |
| WO | 2012071135 A2 | 5/2012 | |
| WO | 2012071135 A3 | 5/2012 | |
| WO | WO-2014022717 A1 * | 2/2014 | ............... A61L 2/24 |
| WO | 2014051882 A1 | 4/2014 | |
| WO | 2014051906 A1 | 4/2014 | |
| WO | WO-2015168783 A1 * | 11/2015 | ............... A61L 2/10 |
| WO | 2016014854 A1 | 1/2016 | |
| WO | 2016057965 A1 | 4/2016 | |
| WO | 2016115535 A1 | 7/2016 | |

(56) References Cited

FOREIGN PATENT DOCUMENTS

| WO | 2016149055 A2 | 9/2016 |
| --- | --- | --- |
| WO | 2016149055 A3 | 12/2016 |
| WO | 2016210374 A1 | 12/2016 |
| WO | 2017009534 A1 | 1/2017 |
| WO | 2017047119 A1 | 3/2017 |
| WO | 2017062260 A2 | 4/2017 |
| WO | 2017062260 A3 | 4/2017 |
| WO | 2017070619 A1 | 4/2017 |
| WO | 2017120545 A2 | 7/2017 |
| WO | 2017120545 A3 | 8/2017 |
| WO | 2018119462 A1 | 6/2018 |
| WO | 2018125994 A1 | 7/2018 |
| WO | 2018161020 A1 | 9/2018 |
| WO | 2019060610 A1 | 3/2019 |
| WO | 2019133929 A1 | 7/2019 |
| WO | 2020061537 A1 | 3/2020 |
| WO | 2020263759 A2 | 12/2020 |
| WO | 2020264421 A1 | 12/2020 |
| WO | 2020263759 A3 | 1/2021 |
| WO | 2022087580 A1 | 4/2022 |

OTHER PUBLICATIONS

Alhumaidan, H. et al. (2012). "Current Status of Additive Solution for Platelets," J. Clin Apheresis 27:93-98.

International Preliminary Report on Patentability, issued Dec. 28, 2021, for PCT Application No. PCT/US2020/039011, filed Jun. 22, 2020, 13 pages.

International Preliminary Report on Patentability, issued Dec. 28, 2021, for PCT Application No. PCT/US2020/039984, filed Jun. 26, 2020, 8 pages.

International Preliminary Report on Patentability, issued Jun. 30, 2020, for PCT Application No. PCT/US2018/068048, 11 pages.

International Preliminary Report on Patentability, issued mailed Dec. 28, 2021, for PCT Application No. PCT/US2020/038950, filed Jun. 22, 2020, 9 pages.

International Search Report and Written Opinion, mailed Aug. 19, 2002, for PCT Application No. PCT/US2020/038950, filed Jun. 22, 2020, 16 pages.

International Search Report and Written Opinion, mailed Dec. 23, 2020, for PCT Application No. PCT/US2020/039011, filed Jun. 22, 2020, 18 pages.

International Search Report and Written Opinion, mailed Jan. 17, 2022, for PCT Application No. PCT/US2021/0071920, filed Oct. 18, 2021, 14 pages.

International Search Report and Written Opinion, mailed May 3, 2019, for PCT Application No. PCT/US2018/068048, filed on Dec. 28, 2018 18 pages.

International Search Report and Written Opinion, mailed Sep. 29, 2020, for PCT Application No. PCT/US2020/039984, filed Jun. 26, 2020, 14 pages.

Irsch, J. et al. (2011, e-pub. Jan. 27, 2011). "Pathogen Inactivation of Platelet and Plasma Blood Components for Transfusion Using the Intercept Blood System™," Transfus. Med. Hemother. 38:19-31.

Prodouz, K.N. et al. (1992). "Effects of Two Viral Inactivation Methods on Platelets: Laser-UV Radiation and Merocyanie 540-Mediated Photoinactivation," Blood Cells 18(1): 101-116.

Prowse, C.V. (Apr. 2013, e-pub. Nov. 8, 2012). "Component Pathogen Inactivation: A Critical Review," Vox Sanguinis, 104(3):183-199.

Reikvam, H. et al. (2010). "The Mirasol® Pathogen Reduction Technology System and Quality of Platelets Stored in Platelet Additive Solution," Blood Transfus. 8:186-192.

Ringwald, J. et al. (Apr. 2006). "The New Generation of Platelet Additivie Solution for Storage at 22° C.: Development and Current Experience," Transfusion Medicine Reviews, 20(2):158-164.

Schlenke, P. (2014, e-pub. Jul. 21, 2014). "Pathogen Inactivation Technologies for Cellular Blood Components: an Update," Transfus. Med. Hemother. 41:309-325.

Schlenke, P. et al. (2008). "Photochemical Treatment of Plasma With Amotosalen and UVA Light: Process Validation in Three European Blood Centers," Transfusion 48:697-705, 9 pages.

Seltsam, A. et al. (2011, e-pub. Jan. 22, 2011). "UVC Irraditation for Pathogen Reduction of Platelet Concentrates and Plasma," Transfusion Medicine and Hemotherapy 38:43-54.

Sofer, G. (Aug. 2002). "Virus Inactivation in the 1990s—and Into the 21st Century: Part 2, Red Blood Cells and Platelets," BioPharm pp. 42-49.

U.S. Appl. No. 09/238,355, Greenman, W. et al, filed Jan. 27, 1999. (Copy not submitted herewith pursuant to the waiver of 37 C.F.R. § 1.98(a)(2)(iii) issued by the Office on Sep. 21, 2004.).

U.S. Appl. No. 17/451,311, Church, D. et al., filed Oct. 18, 2021. (Copy not submitted herewith pursuant to the waiver of 37 C.F.R. § 1.98(a)(2)(iii) issued by the Office on Sep. 21, 2004.).

Anonymous (2018). "DS9900 Series Corded Hybrid Imager for Labs," Zebra, 4 pages.

Oxford English Dictionary (Date Unknown). "System," located at <https://www.oed.com/search/dictionary/?scope=Entries&q=system&tl=true>, last visited on Sep. 26, 2023, one page.

International Preliminary Report on Patentability, issued Apr. 13, 2023 for PCT Application No. PCT/US2021/071920, filed Oct. 18, 2021, 7 pages.

* cited by examiner

SYSTEMS AND METHODS FOR IMPLEMENTING TREATMENT OF BIOLOGICAL FLUIDS

CROSS REFERENCE TO RELATED APPLICATIONS

This application claims the priority benefit of U.S. Provisional Application No. 62/865,210, filed on Jun. 22, 2019, U.S. Provisional Application No. 62/869,542, filed on Jul. 1, 2019, and U.S. Provisional Application No. 63/035,616, filed on Jun. 5, 2020 the contents of which are incorporated herein by reference in their entirety.

FIELD

This disclosure relates generally to systems, methods, and apparatuses for treating biological fluids, including mixtures of biological fluids and photochemical agents, with light, and more specifically to the implementation of graphical user interfaces that can facilitate efficient and proper interactions between a biological fluid treatment system and a user.

BACKGROUND

Systems and methods for treating biological fluids with light are well known. For example, U.S. Pat. Nos. 7,459,695, 6,986,867, and 5,593,823 describe a system for treating a biological fluid with light to inactivate pathogens in the biological fluid. Light is emitted within a selected range of wavelengths that are effective to inactivate pathogens in the biological fluid, particularly by photochemical inactivation of pathogens with a pathogen inactivation compound. Other systems and methods for treating biological fluids with light may include, for example, systems and methods described in U.S. Pat. Nos. 6,843,961, 7,829,867, 9,320,817 and 8,778,263, and Schlenke, 2014, Transfus. Med. Hemother. 41:309-325.

For biological fluids such as blood products including for example, platelets and plasma components and their derivatives, it is important to ensure that the blood products are free of pathogens to minimize the risk of infecting an individual receiving a blood product. Testing for the presence of a pathogen in blood is limited by the pathogens for which tests are available and assay sensitivity. As an alternative or supplement to testing for pathogens, methods are known in the art for inactivating pathogens using various compound (e.g., chemical, photochemical)-based inactivation methods to reduce the risk of transfusion-transmitted infection (e.g., as disclosed in Schlenke et al., Transfus Med Hemother, 2014, 41, 309-325 and Prowse, Vox Sanguinis, 2013, 104, 183-199). Photochemical pathogen inactivation systems based on psoralens and ultraviolet light for treating blood products include the commercially available INTERCEPT® Blood System (Cerus Corporation), which utilizes multi-container assemblies (e.g., disposable processing sets) and an ultraviolet illumination device (INT-100). Blood products such as plasma or platelets are mixed with amotosalen in a container of the processing sets and then illuminated with ultraviolet A light. Other containers of the processing sets serve other post-illumination purposes, such as for example removal of residual amotosalen and photoproducts thereof and/or storage of treated products, and thus generally do not need to be positioned to be illuminated. Multiple different disposable processing sets are used, depending on the type of blood product to be treated and particular properties of those blood products, such as for example volume and platelet number. Different illumination requirements may impact efficiency of a blood collection center.

While previous systems and methods for treating biological fluids, such as pathogen inactivation of blood and blood products including for example, platelets and plasma and their derivatives, have generally performed satisfactorily, they can benefit from improved efficiencies in user interaction with the device, such as for example in treating large numbers of biological fluids and/or in treating different types of biological fluids. Alternatively or in addition, such systems and methods for treating biological fluids may benefit from improved user interactions with the device that may reduce the potential for process errors.

In light of the opportunities for improvements described above, there can be a need for a system and method of providing a graphical user interface to facilitate interactions between the user and the device that can guide the user to operate the device in an efficient and accurate manner.

BRIEF SUMMARY

Disclosed herein are systems and methods for implementing one or more graphical user interfaces for a biological fluid treatment device that is configured to minimize operator error and provide the user with the information needed to efficiently operate the machine. In one or more examples, a plurality of graphical user interfaces can be provided to the user as they go through the process of treating a biological fluid using the device. Each graphical user interface can include a graphic image or other visual depiction that can provide the user with a visual aid as to the proper handling of the device and the biological fluid at each step in the treatment process. The graphical user interfaces can also provide time information to the user indicating how much time has elapsed since the treatment process has concluded, thereby helping to ensure that the user removes the treated material from the device within a pre-determined time (e.g., for subsequent process step(s)).

In one or more examples, the plurality of graphical user interfaces can be oriented to be substantially identical to the orientation of the device. Thus, the graphical user interfaces can display information about each platform (e.g., and respective treatment chamber) of the device such that the information's position on the screen corresponds to the physical layout of the platforms of the electronic device. In this way, the user can readily ascertain what platform (e.g., and respective treatment chamber) the information presented on the graphical user interface pertains to.

DETAILED DESCRIPTION

Figure 1:
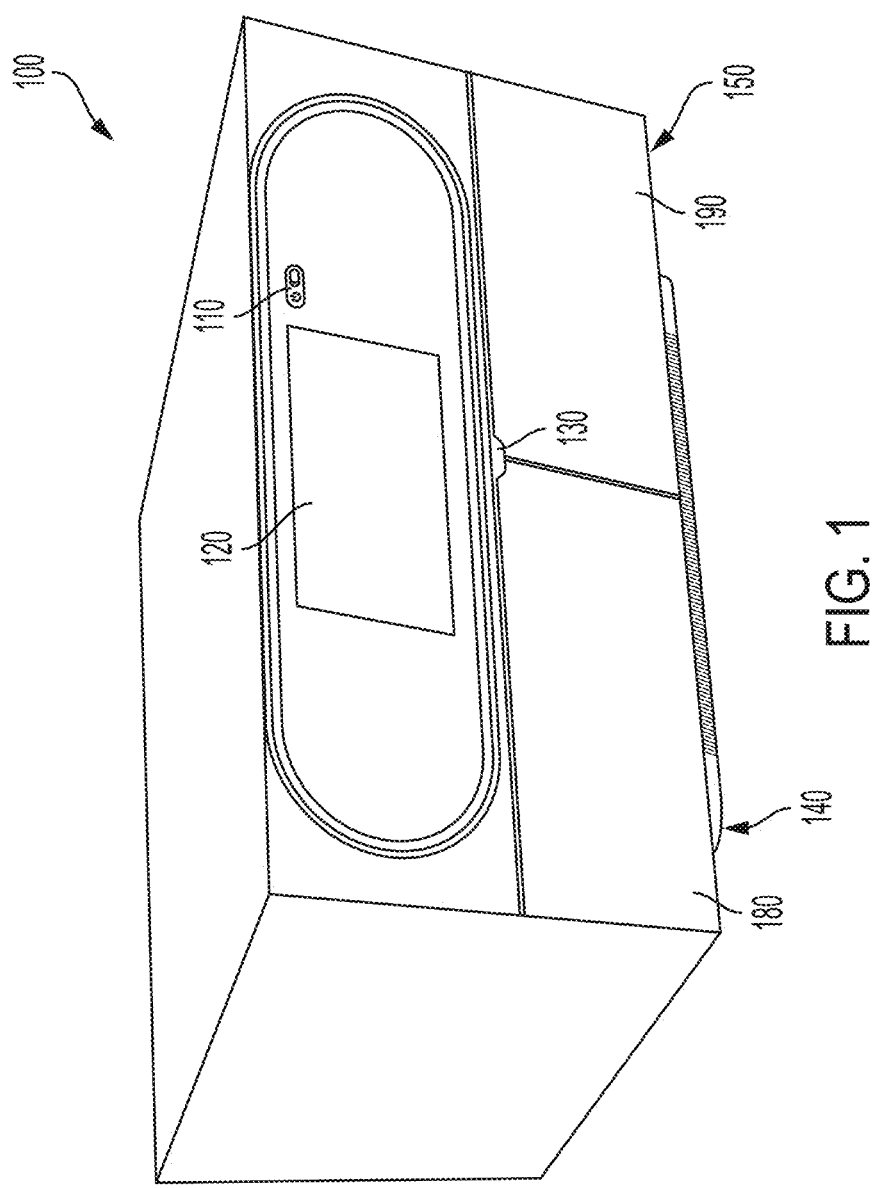
FIG. 1 illustrates an exemplary device for treating biological fluids according to examples of the disclosure.

The following description sets forth exemplary methods, parameters, and the like. It should be recognized, however, that such description is not intended as a limitation on the scope of the present disclosure but is instead provided as a description of exemplary embodiments.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention may include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

FIG. 1 illustrates an exemplary system 100 for treating biological fluids. As used herein, a "biological fluid" refers to any fluid that is found in or derived from an organism (e.g., human, animal, plant, microorganism), or that comprises one or more components (e.g., biologics) found in, isolated from, or derived from an organism, including synthetic versions thereof. Biological fluids may include, but are not limited to, blood and blood products, vaccines, cells (e.g., primary cells, cell lines, cell cultures), natural and recombinant proteins (e.g., therapeutics, antibodies), bacterial cultures, virus suspensions and the like. As used herein, "blood product" refers to blood (e.g., whole blood) or a component or derivative of blood such as, for example, red blood cells, white blood cells, platelets, plasma, cryoprecipitate and cryo-poor (e.g., cryo-reduced) plasma, or a combination of one or more such components that have been separated from blood. In some embodiments, a biological fluid may further comprise a non-biological fluid, such as for example, a physiological solution (e.g., diluent solution), including but not limited to saline, buffered solution, nutrient solution, platelet additive solution (PAS) and/or anticoagulant solution. In some embodiments, when the biological fluid is secured (e.g., the biological fluid is in a container, such as a treatment bag positioned in a platform) in a chamber (not shown) of the biological fluid treatment system, the biological fluid is illuminated by light (e.g., visible light, ultraviolet light) having a certain spectral profile at specified intensities for a determined time period.

Systems and methods of the disclosure may be used for treatment of a biological fluid, such as for example to inactivate pathogen(s) in one or more biological fluids, preferably biological fluids admixed with one or more pathogen inactivation compounds (e.g., photoactive pathogen inactivation compound, psoralen). In some embodiments, systems and methods of the disclosure may be used for treatment of a biological fluid that is not admixed with one or more pathogen inactivation compounds (e.g., treatment by illumination with ultraviolet light). In particular, any of the systems and methods may be used to illuminate a mixture of one or more pathogen inactivation compounds and a biological fluid, such as for example, blood or a blood product (e.g., platelet compositions, plasma compositions and their derivatives), with light (e.g., ultraviolet light) of certain wavelengths to cause a photochemical reaction and inactivate pathogen(s), such as viruses, bacteria, parasites and other contaminants, such as for example, cell contaminants (e.g., leukocytes) and/or nucleic acid contaminants that may be present in the biological fluid. In some embodiments, the pathogen inactivation compound targets nucleic acids to photochemically form adducts and/or cross-links. For example, a system or method of the present disclosure may be used in a method of treating a biological fluid comprising: providing a biological fluid in admixture with a photoactive pathogen inactivation compound (e.g., psoralen, amotosalen), and illuminating the biological fluid with ultraviolet light with a first peak wavelength of from about 315 nm to about 350 nm (e.g., about 315 nm to about 335 nm, about 330 nm to about 350 nm, about 340 nm to about 350 nm, about 340 nm, about 345 nm, 325±5 nm, 335±5 nm, 345±5 nm) emitted by a set of one or more first light sources, wherein illuminating the biological fluid occurs for a duration and at an intensity sufficient to inactivate a pathogen in the biological fluid. In some embodiments, each of the one or more first light sources emits light having a full-width half-maximum (FWHM) spectral bandwidth of less than 20 nanometers. In some embodiments, each of the one or more first light sources is a light-emitting diode (LED).

In some embodiments, each of the one or more light sources (e.g., first light sources) is included in an array of light sources. As described herein, an "array of light sources" means one or more light sources disposed on any two or three dimensional surface (e.g., contiguous surface, non-contiguous surface). In some embodiments, one or more light source channels are included in an array of light sources. In some embodiments, each array of light sources or light source channel may be a set of one or more light sources having the same wavelength (e.g., peak wavelength, maximum peak wavelength). In an exemplary set, one light source may have a peak wavelength. In another exemplary set, two light sources may have the same peak wavelength to each other. In yet another exemplary set, each of a plurality of light sources may have different peak wavelengths from each other. In a further exemplary set, a first subset of one or more light sources may have one peak wavelength, and a second subset of one or more light sources may have a different peak wavelength. Within a light source channel having a plurality of light sources, all of the light sources may have respective peak wavelengths (e.g., maximum peak wavelengths) that all are within a wavelength range (e.g., range of 1-20 nm, 1-10 nm; e.g., 1 nm, 2 nm, 3 nm, 4 nm, 5 nm, or more, greater than and/or less than a particular wavelength) for the light source channel. For example, in some embodiments, within a light source channel having a plurality of light sources, all of the light sources may have peak wavelengths within a range set forth in the present disclosure, such as for example of about 315 nm to about 350 nm (e.g., about 315 nm to about 335 nm, about 330 nm to about 350 nm, about 340 nm to about 350 nm, 325±5 nm, 335±5 nm, 345±5 nm). In a light source channel, each light source may be any light source providing light of a desirable property (e.g., peak wavelength, maximum peak wavelength, spectral bandwidth) including, but not limited to, solid-state lighting (SSL), light-emitting diodes (LEDs), organic light-emitting diodes (OLEDs), polymer light-emitting diodes (PLEDs), and laser diodes.

Each light source channel may be adjusted or set to emit light at different intensities (e.g., adjust the light dosage, adjust the energy dosage) at which light of the one or more peak wavelengths are applied to one or more portions of the biological fluid. For example, each light source channel may emit light at maximum intensity (e.g., 100%), or at less than maximum intensity (e.g., about 90%, about 80%, about 70%, about 60%, about 50%, about 40%, about 30%, about 20%, or less).

Each light source channel may emit various types of light. For example, each light source channel may emit ultraviolet light, ultraviolet A light, ultraviolet B light, ultraviolet C light, and/or visible light. Additionally, each light source channel may emit light of various peak wavelengths. For example, the emitted peak wavelength(s) may be in the ultraviolet A spectrum (e.g., 315-400 nm), the ultraviolet B spectrum (e.g., 280-315 nm), the ultraviolet C spectrum (e.g., 100-280 nm, 200-280 nm, 240-280 nm), or the visible light spectrum (e.g., 400-800 nm). In some embodiments, the emitted peak wavelength(s) may be between about 240 nm and about 250 nm, about 245 nm and about 255 nm, about 250 nm and about 260 nm, about 255 nm and about 265 nm, about 260 nm and about 270 nm, about 265 nm and about 275 nm, about 270 nm and about 280 nm, or about 275 nm and about 285 nm. In some embodiments, the emitted peak wavelength(s) may be between about 280 nm and about 290 nm, about 285 nm and about 295 nm, about 290 nm and about 300 nm, about 300 nm and about 310 nm, about 305 nm and about 315 nm, or about 310 nm and about 320 nm. In some embodiments, the emitted peak wavelength (s) may be between about 315 nm and about 325 nm, about 320 nm and about 330 nm, about 325 nm and about 335 nm, about 330 nm and about 340 nm, about 335 nm and about 345 nm, about 340 nm and about 350 nm, about 345 nm and about 355 nm, about 350 nm and about 360 nm, about 355 nm and about 365 nm, about 360 nm and about 370 nm, about 365 nm and about 375 nm, about 370 nm and about 380 nm, about 375 nm and about 385 nm, about 380 nm and about 390 nm, about 385 nm and about 395 nm, about 390 nm and about 400 nm. In some embodiments, the emitted peak wavelength may be about 240 nm, about 245 nm, about 250 nm, about 255 nm, about 260 nm, about 265 nm, about 270 nm, about 275 nm, about 280 nm, about 285 nm, about 290 nm, about 295 nm, about 300 nm, about 305 nm, about 310 nm, about 315 nm, about 320 nm, about 325 nm, about 330 nm, about 335 nm, about 340 nm, about 345 nm, about 350 nm, about 355 nm, about 360 nm, about 365 nm, about 370 nm, about 375 nm, about 380 nm, about 385 nm, about 390 nm, about 395 nm, or about 400 nm. In some embodiments, the emitted peak wavelength may be between about 255 nm and about 275 nm (e.g., between about 260 nm and about 270 nm, about 265 nm). In some embodiments, the emitted peak wavelength may be between about 275 nm and about 295 nm (e.g., between about 280 nm and about 290 nm, about 285 nm). In some embodiments, the emitted peak wavelength may be between about 300 nm and about 320 nm (e.g., between about 305 nm and about 315 nm, about 310 nm). In some embodiments, the emitted peak wavelength may be between about 315 nm and about 335 nm (e.g., between about 320 nm and about 330 nm, about 325 nm). In some embodiments, the emitted peak wavelength may be between about 330 nm and about 350 nm (e.g., between about 335 nm and about 345 nm, between about 340 nm and about 350 nm, about 340 nm, about 345 nm). In some embodiments, the emitted peak wavelength may be between about 355 nm and about 375 nm (e.g., between about 360 nm and about 370 nm, about 365 nm). In some embodiments, the emitted peak wavelength may be between about 375 nm and about 395 nm (e.g., between about 380 nm and about 390 nm, about 385 nm). In some embodiments, the emitted peak wavelengths may be in the (1) ultraviolet A spectrum (e.g., 315-400 nm); and (2) the ultraviolet B spectrum (e.g., 280-315 nm) or the ultraviolet C spectrum (e.g., 100-280 nm, 200-280 nm, 240-280 nm). In some embodiments, the emitted peak wavelength is in the ultraviolet A spectrum, between about 315 nm and about 350 nm (e.g., between about 320 nm and about 345 nm, between about 315 nm and about 335 nm, between about 330 nm and about 350 nm, between about 340 nm and about 350 nm).

In some embodiments, all light source channels of array of light sources may emit light of about the same (e.g., within variance ±1 nm, ±2 nm, ±3 nm, ±4 nm, ±5 nm, ±6 nm, ±7 nm, ±8 nm, ±9 nm, ±10 nm) peak wavelength (e.g., maximum peak wavelength). Light source channels may include a plurality of light sources with different peak wavelengths (e.g., measured peak wavelengths) within a range of variability. In some embodiments, the average peak wavelength across a plurality of light sources for a single light source channel may be the same as a particular peak wavelength for a particular light source in the single light source channel. In other embodiments, the average peak wavelength across a plurality of light sources of a single light source channel may be different (e.g., about 1 nm, 2 nm, 3 nm, 4 nm, 5 nm or more, greater than or less than) than all particular peak wavelengths of each light source in the single light source channel. In some embodiments, some light source channels may emit light of a first peak wavelength and other light source channels may emit light of a second peak wavelength. The first peak wavelength may differ from the second peak wavelength by at least (e.g., greater than) 5 nm, 10 nm, 15 nm, or 20 nm, or more. For example, in a non-limiting embodiment, a first light source channel may emit light with a peak wavelength in the ultraviolet A spectrum, such as described above (e.g., between about 315 nm and about 335 nm, between about 330 nm and about 350 nm, between about 340 nm and about 350 nm) and a second light source channel may emit light with a peak wavelength in the ultraviolet C spectrum, such as described above (e.g., between about 250 nm and about 260 nm, between about 260 nm and about 270 nm) or the ultraviolet B spectrum, such as described above (e.g., between about 305 nm and about 315 nm). In another non-limiting embodiment, a first light source channel may emit light with a peak wavelength in the ultraviolet A spectrum, such as described above (e.g., between about 330 nm and about 350 nm, between about 340 nm and about 350 nm) and a second light source channel may emit light with a peak wavelength also in the ultraviolet A spectrum, such as described above (e.g., between about 315 nm and about 335 nm, between about 355 nm and about 375 nm). In some embodiments, a first peak wavelength is the average peak wavelength of the one or more light sources of a first light source channel. In some embodiments, the array of light sources may comprise first, second, and third light source channels that each respectively emits light of a first, second, and third peak wavelength. In some embodiments, a first peak wavelength may differ from a second peak wavelength by at least (e.g., greater than) 5 nm, 10 nm, 15 nm, or 20 nm or more, and/or the second peak wavelength may differ from a third peak wavelength by at least (e.g., greater than) 5 nm, 10 nm, 15 nm, or 20 nm or more. Alternatively, each of a first, second, and third peak wavelengths may differ from each another by at least (e.g., greater than) 5 nm, 10 nm, 15 nm, or 20 nm, or more. In some embodiments, an array of light sources may comprise first, second, third, and fourth light source channels that each respectively emits light of a first, second, third, and fourth peak wavelength. In some embodiments, at least two, at least three, or at least four of the first, second, third, and fourth peak wavelengths may differ from each other by at least (e.g., greater than) 5 nm, 10 nm, 15 nm, or 20 nm or more. Alternatively, each of the first second, third, and fourth peak wavelengths may differ from each other by at least (e.g., greater than) 5 nm, 10 nm, 15 nm, or 20 nm, or more. Alternatively, the first peak wavelength may be the about same as (e.g., equal to, within variance +1 nm, +2 nm, +3 nm, +4 nm, +5 nm) the third peak wavelength, the second peak wavelength may be the about same as (e.g., equal to) the fourth peak wavelength, and the first peak wavelength may differ from the second peak wavelength by at least (e.g., greater than) 5 nm, 10 nm, 15 nm, or 20 nm.

In some embodiments, each light source channel may emit light with a narrow spectral bandwidth. For example, the full-width half-maximum (FWHM) spectral bandwidth of light (e.g., spectral bandwidth at the maximum peak intensity) emitted by each light source channel may be less than 20 nm, less than 18 nm, less than 16 nm, less than 14 nm, less than 12 nm, less than 10 nm, less than 9 nm, less than 8 nm, less than 7 nm, less than 6 nm, or less than 5 nm. In some embodiments, the full-width half-maximum (FWHM) spectral bandwidth of light emitted by each light source channel is within 10 nm less than and/or within 10 nm greater than the peak wavelength (e.g., no more than 10 nm greater than, no more than 10 nm less than the peak wavelength). In some embodiments, the full-width half-maximum (FWHM) spectral bandwidth of light emitted by each light source channel may be greater than 1 nm, greater than 2 nm, greater than 3 nm, or greater than 4 nm, or more. In other examples, 50% of the maximum peak intensity of light emitted by each light source channel is within 10 nm, within 9 nm, within 8 nm, within 7 nm, within 6 nm, within 5 nm, within 4 nm, or within 3 nm of the peak wavelength (e.g., no more than 10 nm greater than, no more than 10 nm less than the peak wavelength; within 10 nm less than, within 10 nm more than the peak wavelength). In other examples, the light intensity at 50% of the maximum peak intensity of light emitted by each light source channel is within a spectral width less than 20 nm, less than 18 nm, less than 16 nm, less than 14 nm, less than 12 nm, less than 10 nm, less than 9 nm, less than 8 nm, less than 7 nm, less than 6 nm, or less than 5 nm (e.g., no more than 10 nm greater than, no more than 10 nm less than the peak wavelength; within 10 nm less than, within 10 nm greater than the peak wavelength). Commercially available LEDs and laser diodes are non-limiting examples of light sources that may provide such narrow spectral bandwidth illumination at the peak wavelengths discussed above.

The term "pathogen inactivation compound" means any suitable compound, such as for example a small organic compound, that can be used to inactivate a pathogen that may be present in a biological fluid, such as for example, blood or a blood product. A pathogen inactivation compound that is a "photoactive" or "photoactivated" or "photochemical" or "photosensitizer" compound is a suitable compound that requires some level of light in order to sufficiently inactivate a pathogen. In some embodiments, such compounds are preferred in the inactivation of pathogens in biological products as they provide control over the inactivation process. In some embodiments, the pathogen inactivation compound is a photoactive pathogen inactivation compound selected from the group consisting of a psoralen, an isoalloxazine, an alloxazine, a phthalocyanine, a phenothiazine, a porphyrin, and merocyanine 540. In some embodiments, the pathogen inactivation compound is a psoralen. In some embodiments, the pathogen inactivation compound is amotosalen (e.g., S-59). Such photoactivated or photochemical pathogen inactivation compounds as described herein may include, but are not limited to, psoralens, isoalloxazines, alloxazines, phthalocyanines, phenothiazines, and porphyrins, where these terms are understood to encompass a general class of compounds, i.e. the core compound and suitable derivatives thereof. For example psoralens or a psoralen generally describes the psoralen core compound and any derivative thereof (e.g. amotosalen), isoalloxazines or an isoalloxazine generally describes the isoalloxazine core and any derivative thereof (e.g. riboflavin), and so forth. Such derivatives comprise the core compound structure as well as additional substituents on the core. Descriptions of such compounds include any salts thereof.

The term "amotosalen" means the compound 3-(2-aminoethoxymethyl)-2,5,9-trimethylfuro[3,2-g]chromen-7-one and any salts thereof. The compound may also be referred to as 4'-(4-amino-2-oxa)butyl-4,5',8-trimethyl psoralen. Where the methods of the present disclosure include adding amotosalen HCl (the HCl salt of amotosalen), the removal of this compound from the biological fluid, such as for example, a blood product (e.g., platelet composition, unit of platelets, plasma composition, whole blood composition, plasma composition) is not limited to the removal of amotosalen HCl, as the amotosalen can be present in solution as other salts or as the free base. As used in the methods described herein, removal of amotosalen means removal of the compound in any form, e.g. as the free base or as any salt, as measured by the assays described herein.

In some embodiments, the pathogen inactivation compound is a 4-primaryamino-substituted psoralen, which is a psoralen compound having an NH2 group linked to the 4'-position of the psoralen by a hydrocarbon chain having a total length of 2 to 20 carbons, where 0 to 6 of those carbons are independently replaced by NH or O, and each point of replacement is separated from each other point of replacement by at least two carbons, and is separated from the psoralen by at least one carbon. 4'-primaryamino-substituted psoralens may have additional substitutions on the 4, 5', and 8 positions of the psoralen, said substitutions include, but are not limited to, the following groups: H and (CH2)nCH3, where n=0-6. In some embodiments, the 4'-primaryamino-substituted psoralen comprises: a) a substituent R1 on the 4' carbon atom, selected from the group comprising: —(CH2)u-NH2, —(CH2)w-R2-(CH2)z-NH2, —(CH2)w-R2-(CH2)x-R3-(CH2)z-NH2, and —(CH2)w-R2-(CH2)x-R3-(CH2)y-R4-(CH2)z-NH2; wherein R2, R3, and R4 are independently selected from the group comprising O and NH, in which u is a whole number from 1 to 10, w is a whole number from 1 to 5, x is a whole number from 2 to 5, y is a whole number from 2 to 5, and z is a whole number from 2 to 6; and b) substituents R5, R6, and R7 on the 4, 5', and 8 carbon atoms respectively, independently selected from the group comprising H and (CH2)vCH3, where v is a whole number from 0 to 5; or a salt thereof.

In some embodiments, the pathogen inactivation compound is a 5-primaryamino-substituted psoralen, which is a psoralen compound having an NH2 group linked to the 5'-position of the psoralen by a hydrocarbon chain having a total length of 1 to 20 carbons, where 0 to 6 of those carbons are independently replaced by NH or O, and each point of replacement is separated from each other point of replacement by at least two carbons, and is separated from the psoralen by at least one carbon. 5'-primaryamino-substituted psoralens may have additional substitutions on the 4, 4', and 8 positions of the psoralen, said substitutions include, but are not limited to, the following groups: H and (CH2)nCH3, where n=0-6. In some embodiments, the 5'-primaryamino-substituted psoralen comprises: a) a substituent R1 on the 5' carbon atom, selected from the group comprising: —(CH2)u-NH2, —(CH2)w-R2-(CH2)z-NH2, —(CH2)w-R2-(CH2)x-R3-(CH2)z-NH2, and —(CH2)w-R2-(CH2)x-R3-(CH2)y-R4-(CH2)z-NH2; wherein R2, R3, and R4 are independently selected from the group comprising O and NH, and in which u is a whole number from 1 to 10, w is a whole number from 1 to 5, x is a whole number from 2 to 5, y is a whole number from 2 to 5, and z is a whole number from 2 to 6; and, b) substituents R5, R6, and R7 on the 4, 4', and 8 carbon atoms respectively, independently selected from the group comprising H and (CH2)vCH3, where v is a whole number from 0 to 5, where when R1 is selected from the group comprising —(CH2)u-NH2, R7 is (CH2)vCH3, and where when R5, R6, and R7 are (CH2)vCH3, u is a whole number from 3 to 10; or a salt thereof. Exemplary psoralen compounds are described, e.g., in U.S. Pat. No. 5,593,823.

In some embodiments, the biological fluid (e.g., platelet composition) is in admixture with a pathogen inactivation compound (PIC) in a platelet additive solution (PAS). In some embodiments, the PIC is admixed with the PAS prior to admixing with the biological fluid. Platelet additive solutions are known in the art, for example, as described by Alhumaidan et al. and Ringwald et al. (Alhumaidan, H. and Sweeney, J., J Clin Apheresis, 27: 93-98 (2012); Ringwald et al., Transfusion Medicine Reviews, 20: 158-64 (2006)), which are hereby incorporated by reference in their entirety. In some embodiments, the platelet additive solution (PAS) comprises one or more of chloride, acetate, citrate, potassium, magnesium, phosphate, gluconate, glucose, and bicarbonate. In some embodiments, the platelet additive solution (PAS) is a PAS approved by a regulatory agency or accrediting organization generally accepted in the field.

In some embodiments of any of the systems or methods of the disclosure, a total dose of ultraviolet light illuminating the biological fluid (e.g., emitted by the one or more light sources, emitted by a set of one or more light sources, emitted by an array of light sources) is about 0.5 $J/cm^2$ to about 50 $J/cm^2$, such as any of about 0.5 $J/cm^2$ to about 10 $J/cm^2$, about 0.5 $J/cm^2$ to about 15 $J/cm^2$, about 0.5 $J/cm^2$ to about 25 $J/cm^2$, about 1 $J/cm^2$ to about 10 $J/cm^2$, about 1 $J/cm^2$ to about 15 $J/cm^2$, about 1 $J/cm^2$ to about 25 $J/cm^2$, about 3 $J/cm^2$ to about 10 $J/cm^2$, about 3 $J/cm^2$ to about 15 $J/cm^2$, about 3 $J/cm^2$ to about 25 $J/cm^2$, about 5 $J/cm^2$ to about 10 $J/cm^2$, about 5 $J/cm^2$ to about 15 $J/cm^2$, about 5 $J/cm^2$ to about 25 $J/cm^2$, about 10 $J/cm^2$ to about 30 $J/cm^2$, about 10 $J/cm^2$ to about 20 $J/cm^2$, about 15 $J/cm^2$ to about 50 $J/cm^2$, about 15 $J/cm^2$ to about 35 $J/cm^2$, about 20 $J/cm^2$ to about 30 $J/cm^2$, about 25 $J/cm^2$ to about 50 $J/cm^2$, about 30 $J/cm^2$ to about 40 $J/cm^2$, or about 40 $J/cm^2$ to about 50 $J/cm^2$. In some embodiments, the total dose of ultraviolet light illuminating the biological fluid is about 0.5 $J/cm^2$ or more, such as about any of 1 $J/cm^2$ or more, 2 $J/cm^2$ or more, 3 $J/cm^2$ or more, 4 $J/cm^2$ or more, 5 $J/cm^2$ or more, 6 $J/cm^2$ or more, 7 $J/cm^2$ or more, 8 $J/cm^2$ or more, 9 $J/cm^2$ or more, 10 $J/cm^2$ or more, 15 $J/cm^2$ or more, 20 $J/cm^2$ or more, 25 $J/cm^2$ or more, 30 $J/cm^2$ or more, 35 $J/cm^2$ or more, 40 $J/cm^2$ or more, 45 $J/cm^2$ or more, or 50 $J/cm^2$ or more. In some embodiments, the total dose of ultraviolet light illuminating the biological fluid is less than about 50 $J/cm^2$, less than about 40 $J/cm^2$, less than about 30 $J/cm^2$, less than about 25 $J/cm^2$, less than about 20 $J/cm^2$, less than about 15 $J/cm^2$, or less than about 10 $J/cm^2$. In some embodiments, illuminating the biological fluid occurs for a duration and at an intensity sufficient to provide a total dose (e.g., aforementioned total dose) of ultraviolet light illuminating the biological fluid (e.g., any suitable combination of duration and intensity sufficient to provide the total dose of ultraviolet light). In some embodiments, the intensity is between 1 and 1000 $mW/cm^2$ (e.g., between 1 and 100 $mW/cm^2$). In some embodiments, the duration is between 1 second and 2 hours (e.g., between 1 minute and 60 minutes).

It should be understood that treatment of a biological fluid to inactivate pathogen(s) that may be present does not necessarily inactivate completely all pathogens that may be present, but substantially reduces the amount of one or more pathogens to significantly reduce the risk arising from the presence of a pathogen (e.g., transfusion associated disease from a blood product, transfusion transmitted infection from a blood product). The inactivation of a pathogen may be assayed by measuring the number of infective pathogens (e.g., viral particles, bacteria) in a certain volume, and the level of inactivation is typically represented in the log reduction in the infectivity of the pathogen, or log reduction in titer. Methods of assaying log reduction in titer, and measurements thereof to assess levels of pathogen inactivation are well known in the art. In some embodiments, the systems, devices and/or methods for treating are sufficient to inactivate at least 1 log (e.g., at least 2 logs, at least 3 logs, at least 4 logs, or more) of a pathogen in the biological fluid when present. In some embodiments, the biological fluid after illuminating is suitable for infusion into a subject without further processing to remove residual pathogen inactivation compound or photoproduct(s) thereof. In some embodiments, the systems, devices and/or methods for treating are sufficient to inactivate at least 1 log (e.g., at least 2 logs, at least 3 logs, at least 4 logs, or more) of a pathogen in the biological fluid when present, and the biological fluid comprises 5 μM or less (e.g., 4 μM or less, 3 μM or less, 2 μM or less, 1 μM or less, 0.5 μM or less) of the pathogen inactivation compound after illuminating. In some embodiments, a concentration of the pathogen inactivation compound in admixture with the biological fluid prior to illuminating is at least about 10 μM (e.g., at least about 30 μM, at least about 60 μM, at least at least about 90 μM, at least about 110 μM). In some embodiments, a concentration of the pathogen inactivation compound in admixture with the biological fluid prior to illuminating is about 15 μM to about 150 μM (e.g., about 30 μM to about 110 μM, about 60 μM to about 90 μM, about 75 μM). In some embodiments, a concentration of the pathogen inactivation compound in admixture with the biological fluid after illuminating is at least 3-fold less than the concentration of pathogen inactivation compound in admixture with the biological fluid prior to illuminating. In some embodiments, the biological fluid after illuminating maintains sufficient biological activity so that the biological fluid is suitable for infusion into a subject (e.g., as set forth by one or more regulatory agencies).

System 100 includes a power switch 110, display 120, scanner 130, platform 140, and platform 150. Although system 100 in FIG. 1 includes the described elements, examples of system 100 can include different combinations of the described elements or additional elements without departing from the scope of the disclosure. In some examples, the system 100 can couple, via a wired or a wireless connection, to a computing device (e.g., computer, mobile device) (not shown).

In some embodiments, in response to an input to the power switch 110, power is provided to the system 100. For example, the power switch 110 can be mechanical button. When the system 100 is off, in response to a push of the power switch 110, power is provided to the system 100 (e.g., the system 100 turns on). When the system 100 is on, in response to a push of the power switch 110, the provided power to the system 100 ceases (e.g., the system 100 turns off). In some examples, during treatment, the system 100 stays on and does not turn off in response to a push of the power switch.

As another example, the power switch 110 can be a capacitive switch that can be activated with a touch input (e.g., by placing a user's finger on the power switch). As yet another example, the power switch can be a button having two or more states. The power switch can be at an "off" state when the power switch is at a first position (e.g., unpressed, flipped to a first side). The power switch can be at an "on" state when the power switch is at a second position (e.g., pressed, flipped to a second side).

In some embodiments, the display 120 is a touchscreen. For example, the display 120 can be a capacitive touchscreen or a resistive touchscreen. In some examples, the display 120 is configured to display a graphical user interface (GUI) for operating the system 100. In some embodiments, the display 120 is configured to receive input on the GUI. For example, a GUI object of a plurality of GUI objects displayed on the GUI can be selected by providing a touch input on the touchscreen. In response to receiving the input, the system 100 can perform an operation associated with the selected GUI object. For example, a GUI object may be associated with initiation of a biological fluid treatment, and in response to receiving an input selecting the GUI object, the system 100 initiates a process to treat a biological fluid. In some embodiments, the display 120 is configured to display instructions to a user operator (e.g., operator instructions) on the GUI. In some embodiments, the display 120 is configured to receive input from sound that is detected, such as for example a user's voice command. In some embodiments, the display 120 is configured to receive input from motion that is detected, such as for example from a user's hand motion (e.g., swiping motion). Although one display 120 is illustrated in FIG. 1, the system 100 can include more than one display in some examples.

By using a touchscreen (or voice command or motion) as an input component, the user interface of system 100 can be simplified. For example, the use of a touchscreen can reduce the need for physical buttons corresponding to features that can be similarly performed using the touch screen. Biological fluid treatment using system 100 can be more efficient using the simplified user interface.

Although the power switch 110 and display 120 are described as elements of the system 100 that can be configured to receive user input, other elements or means of input can be included in the system 100 without departing from the scope of the disclosure. For example, the system 100 can include directional input keys, a mouse pad, or a scroll wheel configured for navigating a GUI displayed on the display 120. Alternatively or in addition, system 100 can be configured to receive input other than user input, such as for example, from one or more sensors implemented for system 100. Non-limiting examples of various sensors that may be implemented (e.g., in a treatment chamber) include one or more light sensors configured to measure the light intensity at various portions of the treatment chamber and/or the light intensity incident on various portions of one or more biological fluids, one or more air flow sensors, one or more heat sensors for measuring the temperature of treatment chamber and/or the temperature of one or more biological fluids, one or more sensors for detecting the presence and/or type of one or more biological fluids (e.g. pressure sensors, optical retro-reflective sensors, optical transmissive sensors, label readers, scanners, barcode scanners, RFID sensors, etc.), one or more sensors for detecting a property (e.g., transmissivity) of the biological fluid (e.g., optical sensors, spectroscopic sensors), one or more sensors for detecting a photochemical compound in the biological fluid (e.g., fluorescence spectrometry), and one or more sensors (e.g., ultrasonic sensors) positioned to detect the fluid depth of a portion (e.g., various portions) of one or more biological fluids.

In some embodiments, the scanner 130 is configured to obtain information relating to biological fluids. In some examples, the scanner 130 can be configured to obtain identifying information related to the biological fluids to be treated. For example, the biological fluid may be stored in a container (e.g., hemocompatible bag, treatment bag) (not shown), and the container or other containers in a multi-container assembly (e.g., disposable fluid processing set) can include a tag or label or designated area containing the identifying information in some form, such as a visible form (e.g., a barcode, a QR code, etc.) or in the form of a radio wave (e.g., an RFID tag). In some embodiments, the identifying information can represent information about the biological fluid product, such as biological or other parameters (e.g., type of biological fluid, volume of biological fluid, content of biological fluid, for example platelet number) and treatment parameter(s). In some embodiments, the biological or other parameters, optionally in combination with input from one or more sensors may determine a treatment parameter (e.g., treatment profile). In some examples, multiple sets of identifying information can be obtained. For example, multiple sets of identifying information may be located on one or more respective containers associated with (e.g., containing) the biological fluid, and the sets of identifying information can be obtained from the respective containers by scanner 130. In some embodiments, the scanner may be a multi-scan scanner (e.g., camera, multiplex scanner) configured to simultaneously capture multiple sets of identifying information (e.g., multiple barcodes) located on one or more containers.

In some embodiments, the identifying information can enter a field of view of the scanner 130, and the scanner 130 can obtain the identifying information when the information is in the field of view. For example, a user can hold a biological fluid treatment container (e.g., bag) with a barcode facing the scanner 130, and the scanner 130 can image-capture, scan, or read the barcode; based on the obtained barcode, the system 100 can determine information about the biological fluid product. In some embodiments, the identifying information can enter a detection range of the scanner 130, and the scanner 130 can obtain the identifying information when the information is in the detection range. For example, a user can hold a biological fluid treatment bag with an RFID tag near the scanner 130, and the scanner 130 can detect the RFID tag; based on information obtained from the detected RFID tag, the system 100 can determine information about the biological fluid product.

Although the scanner 130 is illustrated as being located on an exterior of the system 100 in FIG. 1, the scanner 130 can be located at different locations of the system 100. In some embodiments, the scanner 130 is located inside the system 100. For example, the scanner 130 can be located at a top of a treatment chamber of system 100. The scanner 130 can obtain information related to the biological fluid after the biological fluid is placed on a platform and/or in the chamber.

In some examples, the scanner 130 can be included in a device coupled to system 100. For example, a barcode scanner 130 can be included in a scanner (e.g., barcode scanner, QR code scanner) coupled to system 100. In some examples, a scanner 130 couples to system 100 via a wired connection. In some examples, a scanner 130 couples to system 100 via a wireless connection.

Although one barcode scanner 130 is illustrated in FIG. 1, system 100 can include more than one scanner 130. For example, system 100 can include a plurality of treatment chambers, and each treatment chamber may have a corresponding scanner (e.g., internal scanner). As another example, system 100 can include a plurality of platforms and each platform may have a corresponding scanner (e.g., external scanner) located near or at an opening of a respective platform. As the platform moves through the opening, a container (e.g., treatment bag) containing the biological fluid can traverse a field of view of a respective scanner, and information, associated with the biological fluid, in visible form on the container or an associated container of a multi-container assembly can be obtained by the respective scanner.

In some embodiments, the platform 140 (e.g., tray, well, plate, stage) is configured to carry the biological fluid (e.g., a container containing the biological fluid) during treatment. In some embodiments, the platform is moveable (e.g., slideably moveable, configured to translate from inside the treatment chamber to outside the treatment chamber) between the interior and exterior of the treatment chamber (e.g., partially out of the treatment chamber). In some embodiments, the platform further comprises a first panel 180 movable between a closed position and an open position, wherein the first panel 180 covers a first opening to the first treatment chamber in the closed position, wherein the first panel 180 uncovers the first opening to the first treatment chamber in the open position. In some embodiments, the first panel 180 is a separate structure from the platform 140 (e.g., a separate hinged door that covers and uncovers the first opening to the first treatment chamber), and the platform 140 can slide in and out of the first treatment chamber separately from the first panel 180.

In some examples, the platform and/or first panel can be locked to remain in the closed position during treatment. The system 100 can prevent a user from prematurely accessing the content of the platform 140 (e.g., accessing the treatment chamber) during treatment by locking the first panel to remain in the closed position. In some embodiments, the first panel can be locked by a pin (e.g., solenoid and pin) or magnetic lock mechanism. The system 100 can permit a user to access, by unlocking the first panel, the content of the platform 140 before and after treatment (e.g., to load the biological fluid on the platform 140, to unload the biological fluid from the platform 140) or after an input (e.g., an input on the GUI, an input to open latch, an input to a button switch).

As illustrated in FIG. 1, the structure of the platform 150 symmetrically mirrors structure of the platform 140 about a vertical axis. In some embodiments, the platform 150 is substantially similar to platform 140 in size, shape, or orientation. As illustrated, the platforms 140 and 150 are arranged horizontally, such that the first biological fluid and the second biological fluid, when positioned on the first platform and on the second platform, respectively, are within a same plane. As the first panel 180 may be associated with the platform 140, as discussed above, a second panel 190 may be associated with the platform 150.

Although two platforms are illustrated in FIG. 1 as being a part of system 100, the system 100 can include one platform or more than two platforms that are substantially similar to platform 140 or platform 150 without departing from the scope of the disclosure. In general, the number of illustrated platforms and treatment chambers associated with systems 100-300 are exemplary; embodiments of systems 100-300 may include different numbers and combinations of platforms, treatment chambers, and their associated elements (e.g., scanners, light arrays, compartments) without departing from the scope of the disclosure. For example, in some embodiments, a system can include only one chamber with only one platform. In some embodiments, a system can include only one chamber with two or more platforms.

In some embodiments, the platform comprises a first compartment and a second compartment separated from the first compartment. In some embodiments, the first compartment is configured to hold a container (e.g., container of a multi-container assembly) containing a biological fluid in a position for illumination. In some embodiments, the second compartment is configured to hold a container (e.g., container of a multi-container assembly) (e.g., not containing a biological fluid) in a position not for illumination. In some embodiments, the platform is configured to separately carry at least a first container with a first biological fluid and a second container with a second biological fluid. In some embodiments, the platform is transparent (e.g., substantially transparent, >95% transparent, >90% transparent, >80% transparent, >80% transparent) to light with a wavelength within 100 nm (e.g., 75 nm, 50 nm, 40 nm, 30 nm, 20 nm) of the peak wavelength of light used for illumination. In some embodiments, the platform is transparent (e.g., substantially transparent, >95% transparent, >90% transparent, >80% transparent, >80% transparent) to ultraviolet light (e.g., UV-A, UV-B, and/or UV-C).

Figure 2:
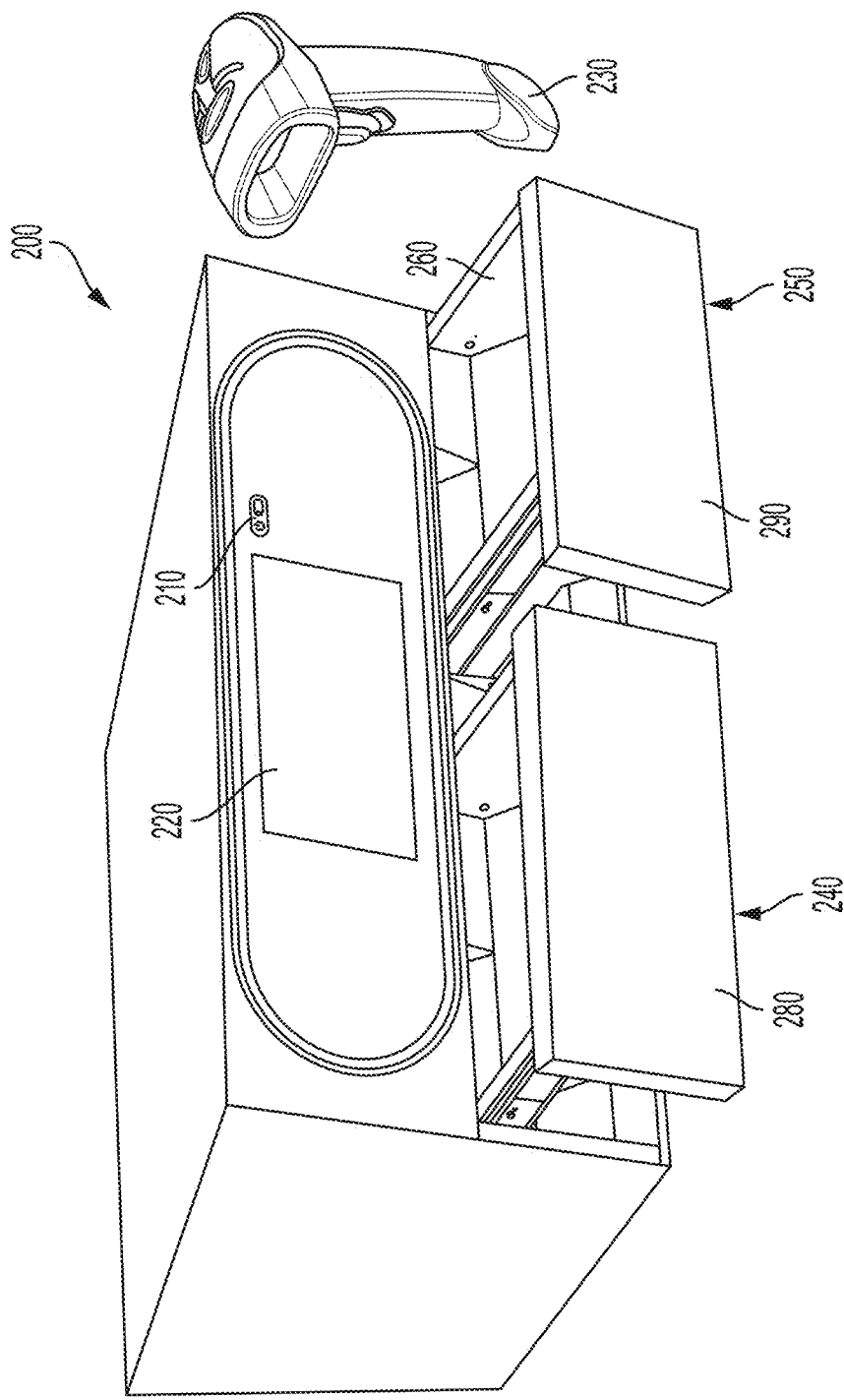
FIG. 2 illustrates another exemplary view of the device described with respect to FIG. 1 for treating biological fluids according to examples of the disclosure.

FIG. 2 illustrates an exemplary system 200 for treating biological fluids. In some embodiments, the system 200 is substantially similar to system 100, as illustrated in FIG. 1. Power switch 210 can correspond to power switch 110. Display 220 can correspond to display 120. Platforms 240 and 250 can respectively correspond to platforms 140 and 150. Panels 280 and 290 can respectively correspond to panels 180 and 190.

In some embodiments, the system 200 includes an external scanner 230. As illustrated, the external scanner 230 is external to a housing that houses the other elements and can be operatively coupled to a processor of the system 200. In some embodiments, the external scanner 230 is a handheld scanner. Although the external scanner 230 is illustrated with a wireless connection in FIG. 2A, the external scanner 230 can be operatively coupled using a wired connection.

As illustrated in FIG. 2, platforms 240 and 250 are in drawer configurations at an open position, in contrast with platforms 140 and 150 being at a closed position in FIG. 1. Although both platforms 240 and 250 are illustrated as in drawer configurations being open in FIG. 2, one platform in a drawer configuration can also open at a time (e.g., with the other remaining closed).

In some embodiments, the platforms include a compartment 260 substantially similar to the compartments described herein. Although FIG. 2 illustrates a platform as having one compartment visible (e.g., for a platform in a drawer configuration at an open position), each of the platforms in system 200 can include any number of compartments without departing from the scope of the application.

Figure 3:
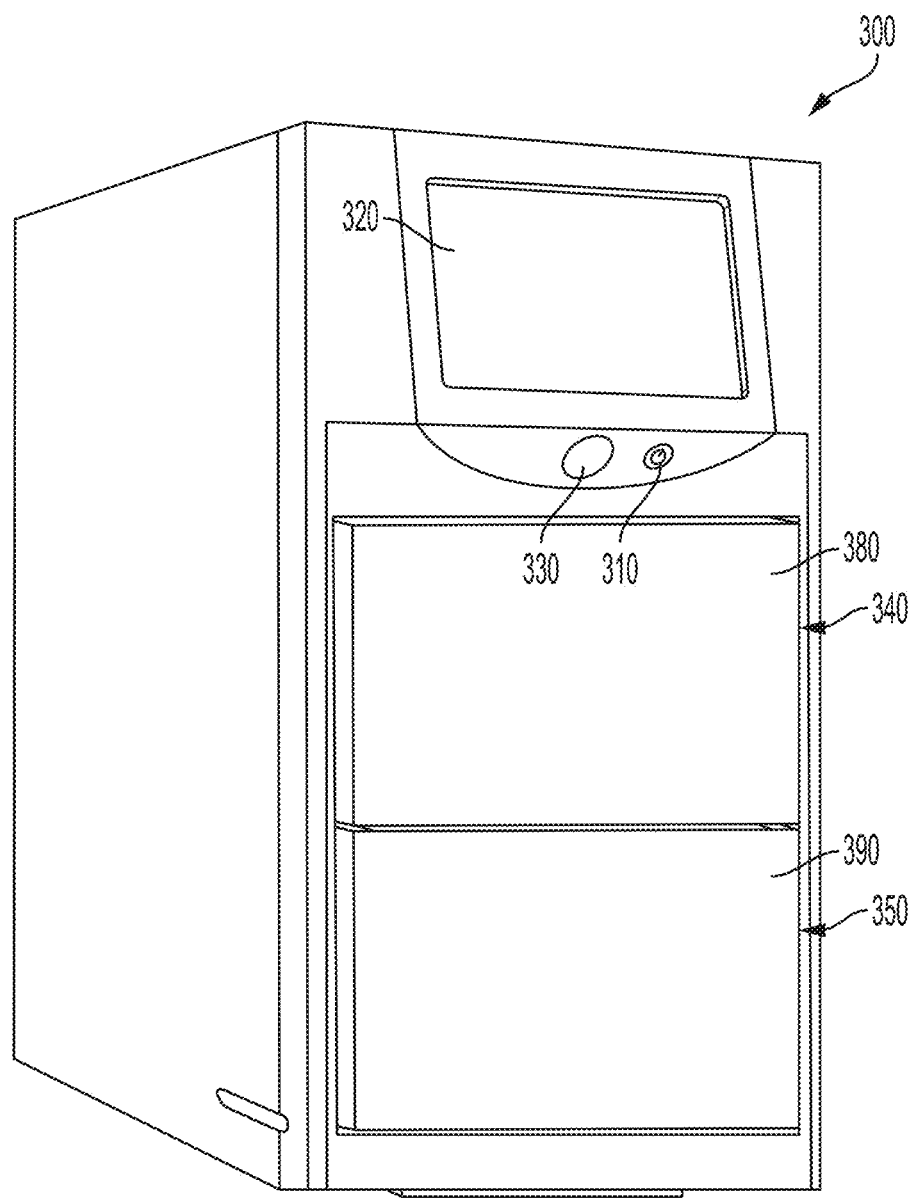
FIG. 3 illustrates another exemplary device for treating biological fluids according to examples of the disclosure.

FIG. 3 illustrates an exemplary system 300 for treating biological fluids. In some embodiments, the system 300 is substantially similar to system 100, with a difference that the treatment chambers and platforms are arranged vertically. Power switch 310 can correspond to power switch 110. Display 320 can correspond to display 120. Scanner 330 can correspond to scanner 130. In contrast to system 100, in which the platforms 140 and 150 are arranged horizontally, platforms 340 and 350 are arranged vertically such that the first biological fluid and the second biological fluid, when positioned on the first platform and on the second platform, respectively, are in parallel planes. Also in contrast to system 300, in which panels 180 and 190 are arranged horizontally, panels 380 and 390 are arranged vertically.

The examples of FIGS. 1-3 are meant to provide an exemplary context for the graphical user interfaces described in detail below, and are not meant to be limiting to the graphical user interfaces in any way. The graphical user interfaces can be utilized on a variety of biological fluid treatment apparatuses not described above with respect to FIGS. 1-3.

Figure 4:
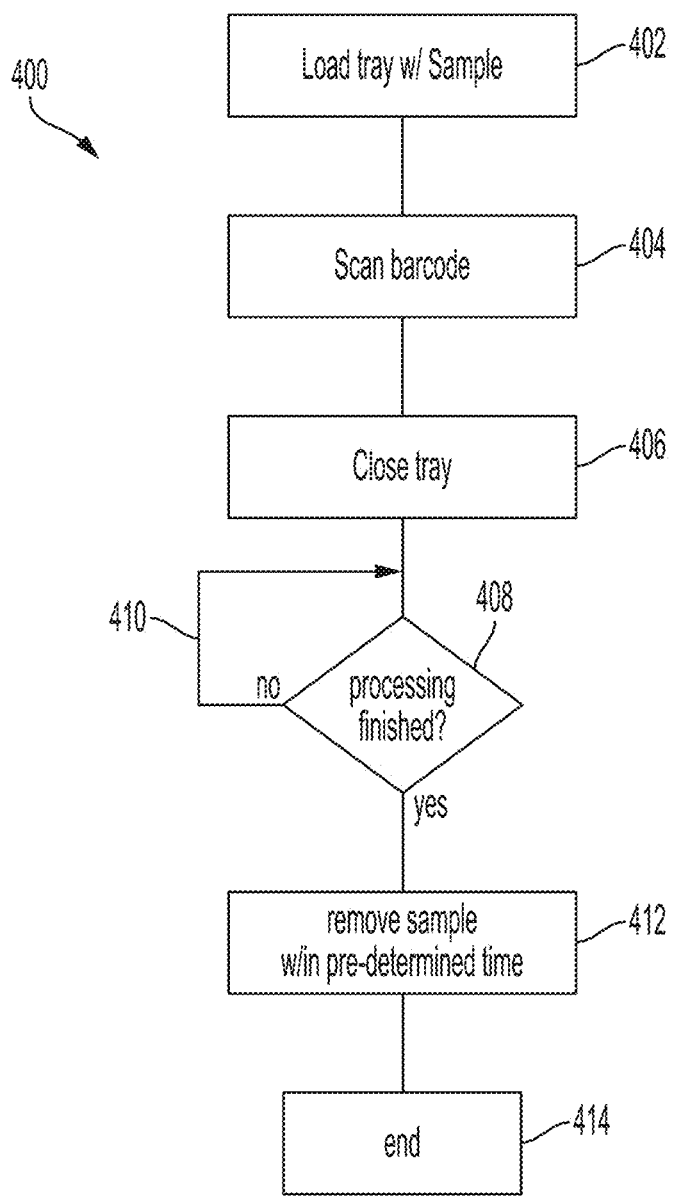
FIG. 4 illustrates an exemplary process for using a device for treating biological fluids according to examples of the disclosure.

FIG. 4 illustrates an exemplary process for using a device for treating biological fluids according to examples of the disclosure. The process 400 can provide an example of a process that a user would undertake when operating a device as described above with respect to FIGS. 1-3. Process 400 can begin at step 402, wherein a user of the device loads a platform (e.g., tray) with a biological fluid (e.g., sample), such as for example, a blood component, into (e.g., on) a platform of the device. As discussed above, the biological fluid can be in a container (e.g., bag) specifically configured to hold biological fluids, such as a blood component.

Once the user has placed the biological fluid (e.g., container containing the biological fluid) in (e.g., on) a platform of the device at step 402, the process can move to step 404 wherein a scanner (e.g., scanner that detects visual information, scanner such as scanner 130) can be used to scan identifying information (e.g., one or more barcodes) located on the container (i.e., bag) containing the biological fluid or an associated container of a multi-container assembly containing the biological fluid (e.g., disposable processing set). The identifying information (e.g., barcodes) can be used by the device to trace which biological fluid is processed by providing a unique identifier contained in the identifying information (e.g., bar code) that can be used to identify a particular biological fluid or to provide one or more parameters (e.g., type of biological fluid, volume of biological fluid, content of biological fluid, for example platelet number, product number) that may be useful to ensure the treatment conditions are in accordance with a treatment profiles of the one or more biological fluids.

Once all identifying information (e.g., each and every barcode) on the container(s) of the biological fluid has been scanned at step 404, the process can move to step 406, wherein the user ensures that the biological fluid (e.g., biological fluid container(s)) is completely and properly inserted into the platform, and then proceeds to close the platform. Once the platform has been closed, processing of the biological fluid can be initiated. For example, the user can then initiate processing (e.g., treatment) of the biological fluid. Alternatively, in some embodiments, the device can initiate processing without further input from the user.

Once the platform has been closed and processing (e.g., illumination) has been initialized at step 406, the process can move to step 408, wherein a determination is made as to whether the processing (e.g., illumination) initiated at step 406 has been completed. If at step 408 it is determined that the processing (e.g., illumination) has not yet been completed, the process 400 can move to step 410 wherein the process reverts back to step 408 to check if it has been completed. The loop created between steps 408 and 410 can be repeated for as many times necessary until the processing (e.g., illumination) of the biological fluid has been completed. Once the processing (e.g., illumination) has been completed as determined at step 408, the process can move to step 412 wherein the biological fluid can be removed, such as for example within a pre-determined amount of time. In some embodiments, when processing biological fluids, once processing has been completed, the biological fluids must be removed from the device, for example to initiate one or more additional processing steps separate from the system or to place the treated biological fluid into proper storage conditions or facilities (i.e., a refrigerator, freezer, etc.) within a pre-determined amount of time, otherwise the biological fluid may become no longer useful due to potential or actual spoilage, failure to meet a specification, or failure to meet further processing requirements. Thus, at step 412, the biological fluid can be removed by the user within a pre-determined amount of time (e.g., to prevent spoilage). Once the biological fluid is removed at step 412, the process 400 can then move to step 414 wherein the process is terminated.

As can be seen by the example process 400 of FIG. 4, proper operation of the device depends on the proper user interaction with the device. In other words, even though the device can be configured to treat biological fluids properly, if the user does not follow a particular protocol when operating the device, the processing may not achieve its intended goal. For instance, if a user doesn't load the platform properly, or process the biological fluid under defined treatment parameter, or takes out a biological fluid from the platform prematurely before the processing has finished, or fails to remove a treated biological fluid from the device in a required period of time after processing is finished, then even though the device may be configured properly, the biological fluid still may not be processed properly.

Thus, in order to ensure proper user interaction with the device, the device can utilize a display that implements a graphical user interface that is configured to ensure that the device is properly operated by the user thereby ensuring that biological fluids are processed (e.g., treated) correctly. The graphical user interface can provide a platform to facilitate proper and efficient user interaction with the device thereby minimizing operator error as the cause of improper processing of biological fluids. As discussed in detail below, the graphical user interface can provide the user with a series of instructions, opportunities for user input, and displays so as to guide the user as to the proper interaction with the device.

Figure 5:
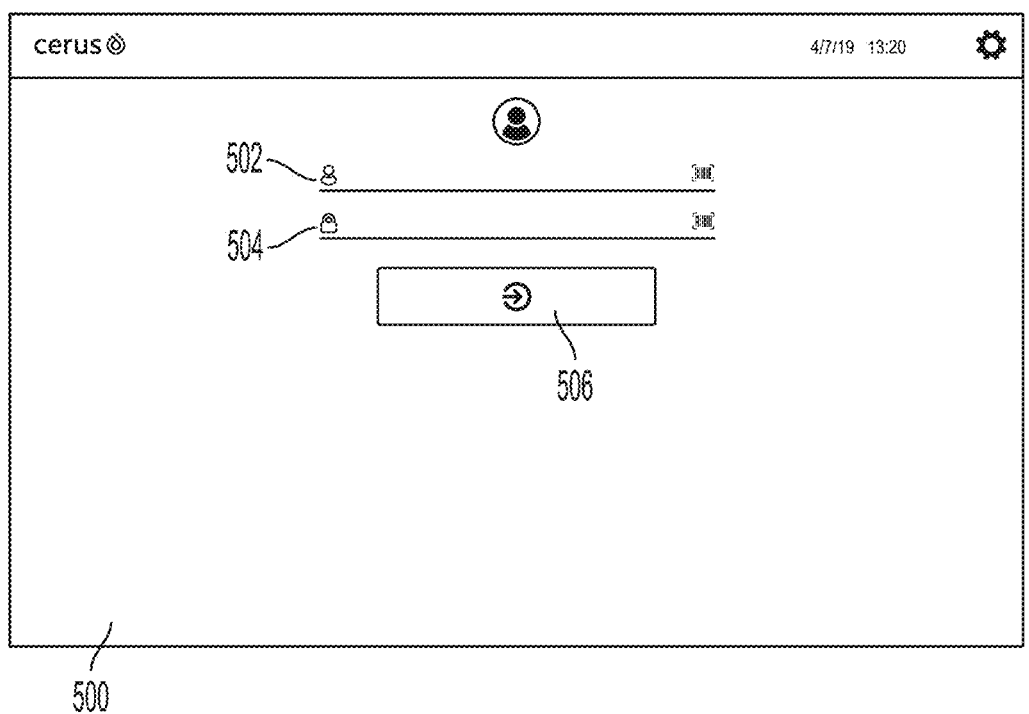
FIG. 5 illustrates an exemplary log-in screen for access to the graphical user interface according to examples of the disclosure.

FIG. 5 illustrates an exemplary log-in screen for access to the graphical user interface or initiating one or more steps or processes according to examples of the disclosure and/or generating a treatment record associating a user with a particular treatment performed. In the example of FIG. 5, the user can be presented with an interactive display 500 that allows them to enter their credentials so as to access the other various features of the graphical user interface described in detail below. In one or more examples, the interactive display can include a user id field 502, as well as a password field 504.

In one or more examples, the interactive display 500 can be configured so as to allow the user to touch the login field 502 and can then allow them to type in their login either through an external keyboard, or through a touch keyboard that can be displayed on the interactive display 500, or to select their login from a prepopulated list of logins (not shown). The user can also touch password field 504 so as to type in their password. Once the user has filled in both the login field 502 and the password field 504, the user can then click on button 506 so that the credentials they entered can be verified by the device.

Figure 6:
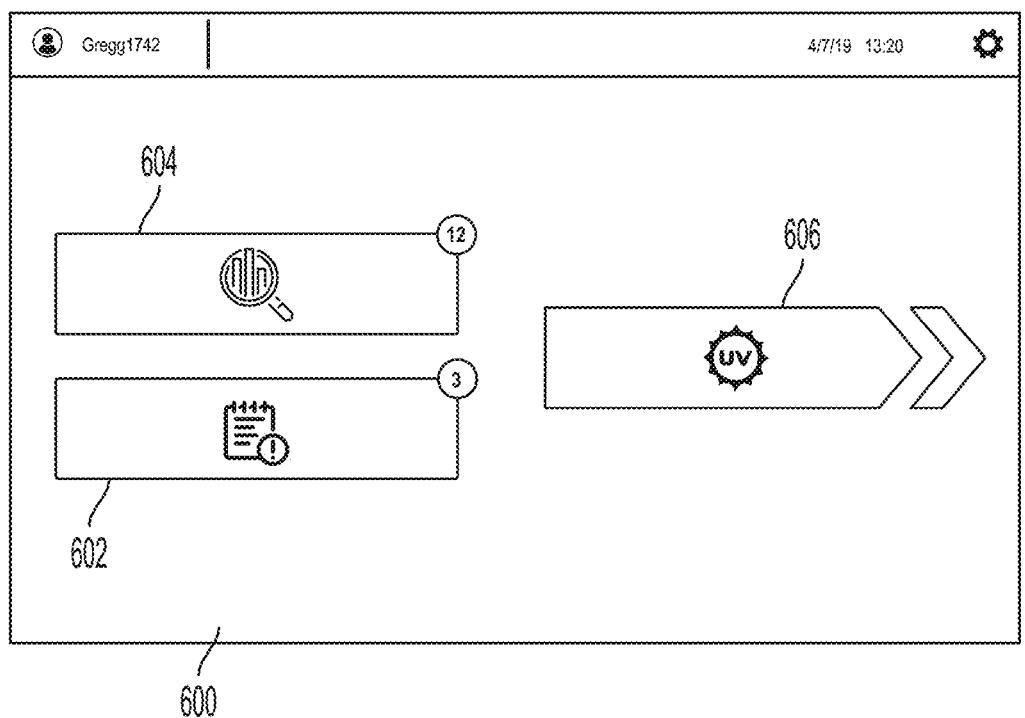
FIG. 6 illustrates an exemplary welcome screen according to examples of the disclosure.

FIG. 6 illustrates an exemplary welcome (e.g., home) screen according to examples of the disclosure. The welcome screen 600 can be presented to the user on the display, once the user has successfully entered their credentials and those credentials have been verified as described above with respect to FIG. 5. In one or more examples, the welcome screen 600 can be presented to the user prior to the user entering their credentials. The welcome screen 600, in one or more examples, can include 3 buttons (602, 604, 606) that the user can click. In one or more examples of the disclosure, the term button can refer to an area of the display that can be manipulated by the user by touching it or clicking on it if using a mouse. Alternatively, or in addition, in one or more examples of the disclosure, the term button can refer to an area of the display comprising an image that visually depicts (e.g., when highlighted) one or more steps that a user is to engage in to perform a process of the disclosure. Button 604 can be pushed or touched by a user so that they can search and view available data, such as for example, event history and/or prior reports generated by the device in response to prior processing of biological fluids. In one or more examples, the reports could include information such as date (e.g., time) a biological fluid was processed, whether the process was completed successfully, the identifying information (e.g., barcodes) of the biological fluids that were previously processed, one or more attributes (e.g., properties) of the biological fluids, treatment profiles for the biological fluids, the operator associated with a particular treatment process event, etc. Button 602 can be touched or clicked by a user to access an event history of the device, such as an event history within a certain time period (e.g., current day, past 24 hours). In some embodiments, an "event" can refer to an instance when an error occurred (e.g., either through the fault of the device, or the user). Thus, by pushing button 602, the user can access a history of the device errors. The history access by pushing button 602 can include information about failures or errors including the time the error occurred, what type of error occurred, and what biological fluids were affected by the error.

Figure 7:
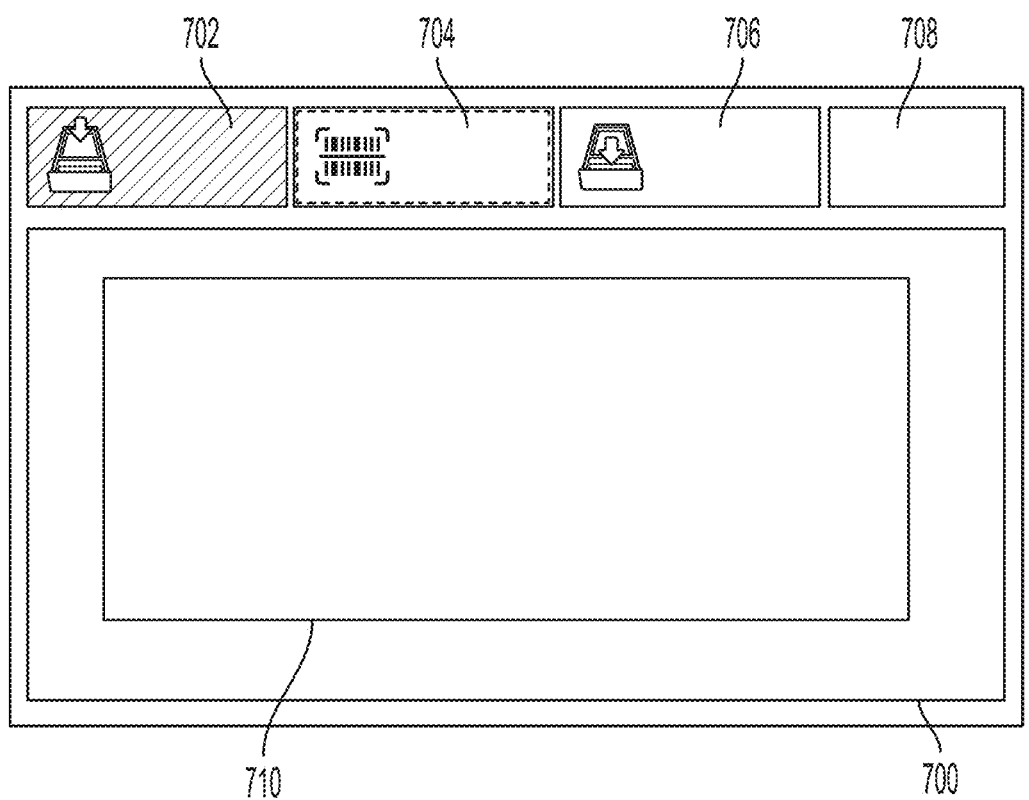
FIG. 7 illustrates an exemplary platform-loading graphical user interface according to examples of the disclosure.

Once the user pushes button 606, the graphical user interface depicted in FIG. 7 can then be presented to the user. FIG. 7 illustrates an exemplary platform-loading (e.g., platform placement) graphical user interface according to examples of the disclosure. In the examples of FIG. 7, interactive display 700 can include buttons 702, 704, 706, and 708. Button 702 can indicate (e.g., by being highlighted) that the process is at a first loading phase, wherein the platform is to be loaded by the user (e.g., in a first compartment of the platform) with the biological fluid (e.g., a container containing the biological fluid to be illuminated). Button 704 can indicate (e.g., by being highlighted) that the process is in the scanning (e.g., barcode scanning) phase as described above. Alternatively, in some embodiments, button 704 can be selected by a user to indicate that the process is in the scanning phase. Button 706 can indicate (e.g., by being highlighted) that the process is at a second loading phase, wherein the platform is to be loaded by the user (e.g., in a second compartment of the platform) with one or more additional containers associated with the container containing the biological fluid (e.g., containers of multi-container assembly), and in some embodiments, closing the platform panel or door. Button 708 can indicate (e.g., by being highlighted, by becoming active) that the device is ready for initiation of the processing phase of the process, for example, in some embodiments, to be selected by a user and used to indicate the initiation of or to initiate the processing phase of the process described above, including for example the platform closing.

In the example of graphical user interface 700, button 704 can indicate (e.g., by being highlighted) that the process is in or ready for the scanning (e.g., barcode scanning) phase in the process of processing a biological fluid. In some embodiments, button 704 can be selectable by the user to initiate the next step in the process of processing a biological fluid. One or both of buttons 706 and 708 while displayed may not be highlighted or selectable (e.g., active) at this point, since the user still has not completed the requisite step 704 before moving to the processes indicated by buttons 706 and 708. In this way, the graphical user interface 700 can ensure that each and every step needed to correctly process a biological fluid is followed by the user. Once the user has placed the biological fluid into the platform per graphical image 710, the user can move on to the next phase of the process.

Figure 8A:
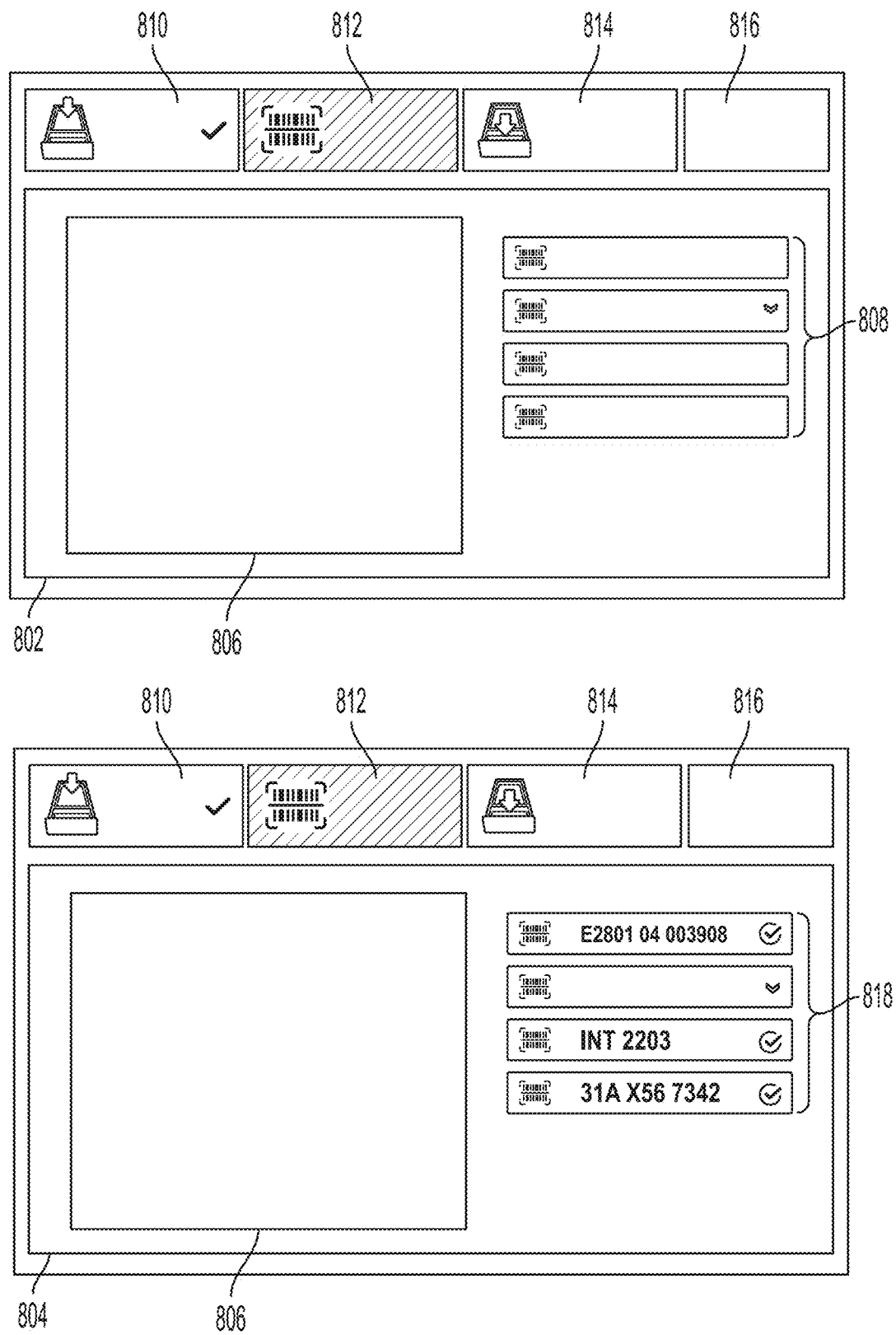
FIG. 8a illustrates an exemplary scanning graphical user interface according to examples of the disclosure.

Once button 704 indicates the scanning phase (e.g., the user clicks on button 704), the user can then be presented graphical user interface 802 depicted in FIG. 8a. FIG. 8a illustrates an exemplary scanning (e.g., barcode scanning) graphical user interface according to examples of the disclosure. In the example of FIG. 8a, buttons 810, 812, 814, and 816 can correspond to the same buttons 702, 704, 706, and 708 respectively and described above with respect to FIG. 7. In the example of graphical user interface 802, button 810 can be de-highlighted and instead can include an indicator (e.g., check mark as shown) to indicate that the step associated with button 810 has already been completed. Instead, in the example of graphical user interface 802, the scanning phase button 812 can be highlighted to indicate that the use is now in the phase of operation wherein the identifying information (e.g., barcodes) associated with the biological fluid can be scanned. At the point in time depicted by graphical user interface 802, since no identifying information has been scanned, buttons 814 and 816 can be configured to not be highlighted and/or selectable by a user since the identifying information must be acquired or input before moving on to the phases associated with those buttons.

Similar to the example of FIG. 7, the graphical user interface 802 can also include a graphical image 806 that visually depicts the process the user is to engage in to scan in the identifying information (e.g., barcodes) associated with the biological fluid. As in the example of FIG. 7, the graphical image 806 can also be in the form of an animation that visually depicts what the user should be doing. Graphical user interface 802 can also include a identifying information display (e.g., barcode display) 808 that visually depicts the various identifying information (e.g., barcodes) associated with a biological fluid (e.g., donation ID, product code, set code, lot number). In the example of graphical user interface 802, the fields associated with identifying information display 808 can be blank as no identifying information has yet been scanned. However, as the user or device scans the identifying information associated with the biological fluid, the barcode field 808 can become populated as depicted in example graphical user interface 804 at field 818.

Figure 8B:
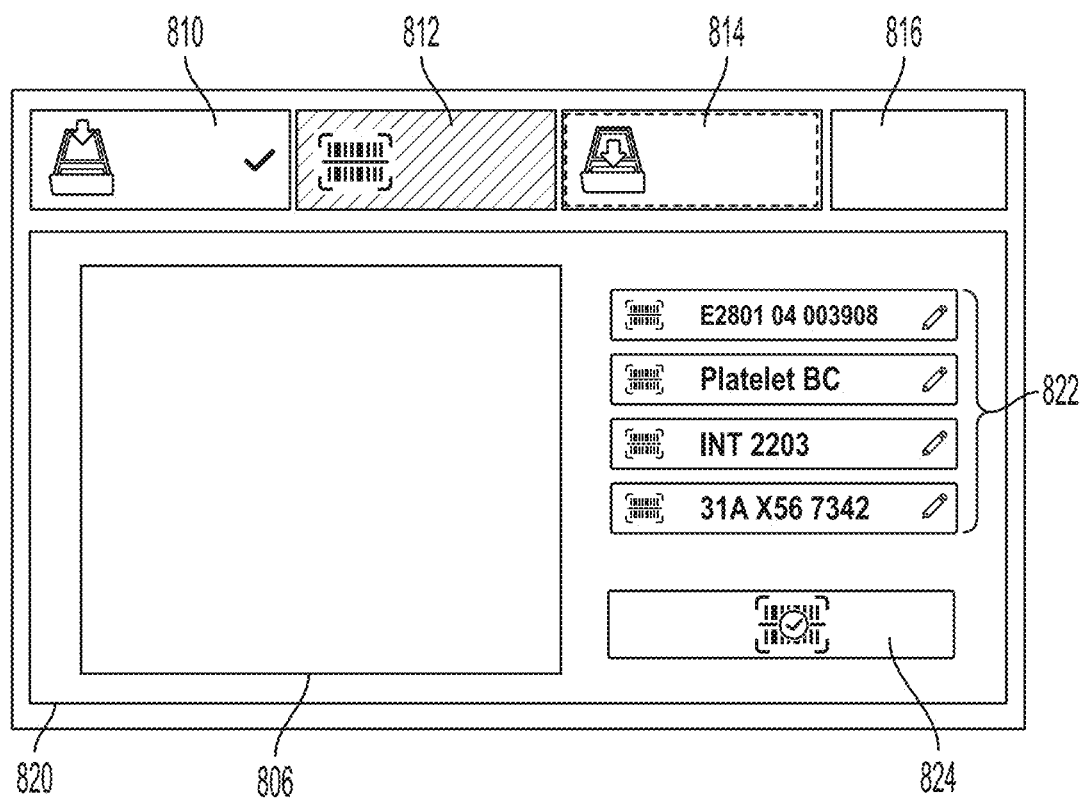
FIG. 8b illustrates another exemplary scanning graphical user interface according to examples of the disclosure.

In one or more examples identifying information fields 802 and 818 can include a user selectable field which a user can click on and pick an option from a drop-down menu. For example, as indicated in graphical user interface 818, the blank field can include a drop-down menu that the user can use to indicate a type of biological fluid (e.g., product code), such as for example, whether a given biological fluid is plasma or platelets, and the type of platelets (e.g., type of platelet donation). As shown in FIG. 8b, the identifying information field 822 of graphical user interface 820 can now indicate that the biological fluid is BC (e.g., buffy coat) platelets.

Once all identifying information (e.g., each and every barcode) field has been filled in, an indicator 824 can pop up in the graphical user interface 820 of FIG. 8b indicating to the user that all of the identifying information (e.g., every barcode) field 822 has been filled out. In addition to providing indicator 824, button 814 can now be made selectable by the graphical user interface 820, thus allowing the user to move to the next phase (e.g., processing initiation phase, second loading phase) of the process.

Figure 9:
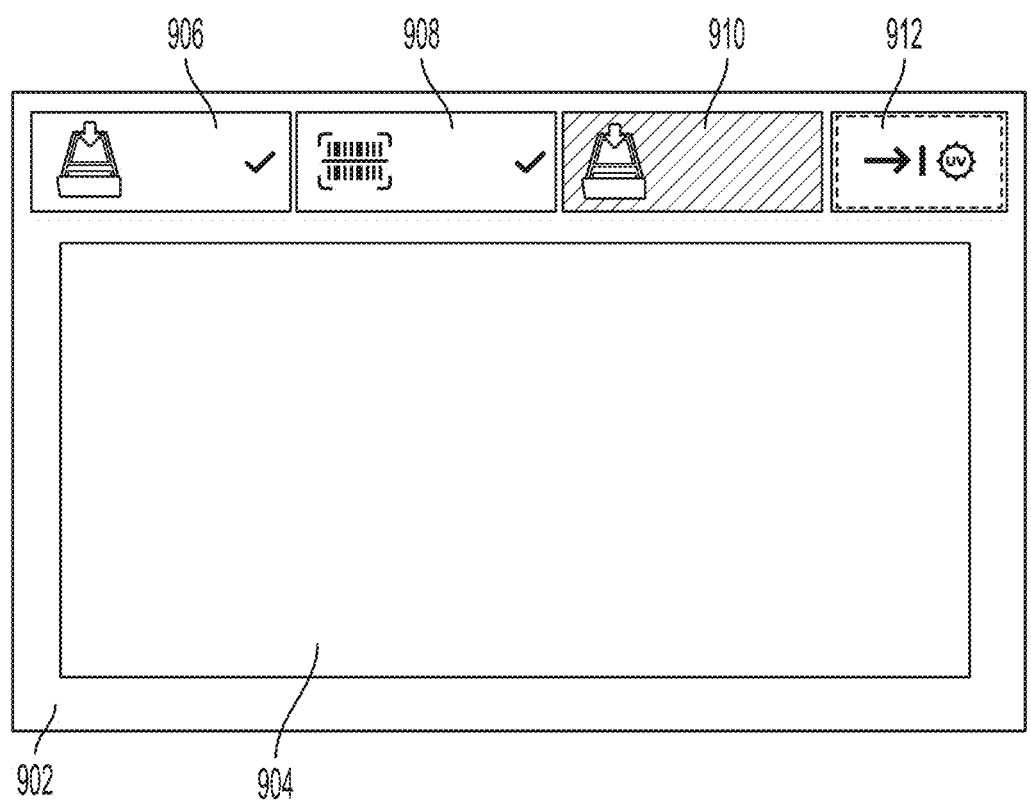
FIG. 9 illustrates an exemplary platform-loading graphical user interface according to examples of the disclosure.

FIG. 9 illustrates an exemplary graphical user interface for the user to initialize processing of the biological fluid already loaded in the first treatment chamber and/or initiate a series of graphical user interfaces that can be used to facilitate a second platform loading phase graphical user interface according to examples of the disclosure. In the example of FIG. 9, the graphical user interface 902 can be associated with the phase of the user process in which the user loads (e.g., in a second compartment of the platform) one or more additional containers associated with the container containing the biological fluid (e.g., containers of multi-container assembly) and in some embodiments closes the platform for processing. The graphical user interface 902 can include buttons 906, 908, 910, and 912 that can correspond to buttons 702, 704, 706, and 708 respectively. However, in this phase, button 906 and 908 can have indicators (e.g., check marks) on them indicating that those phases have been completed, while button 910 can be highlighted to indicate the current phase of operation. Graphical user interface 902, like the examples of FIGS. 7, 8a, and 8b, can also include a graphical image 904 that can illustrate the procedure that the user is to carry out in this phase of operation. Once the user has loaded the platform and in some embodiments closed it, the user can then select button 912 that can indicate the initiation of the processing phase, including for example the platform closing.

Figure 10:
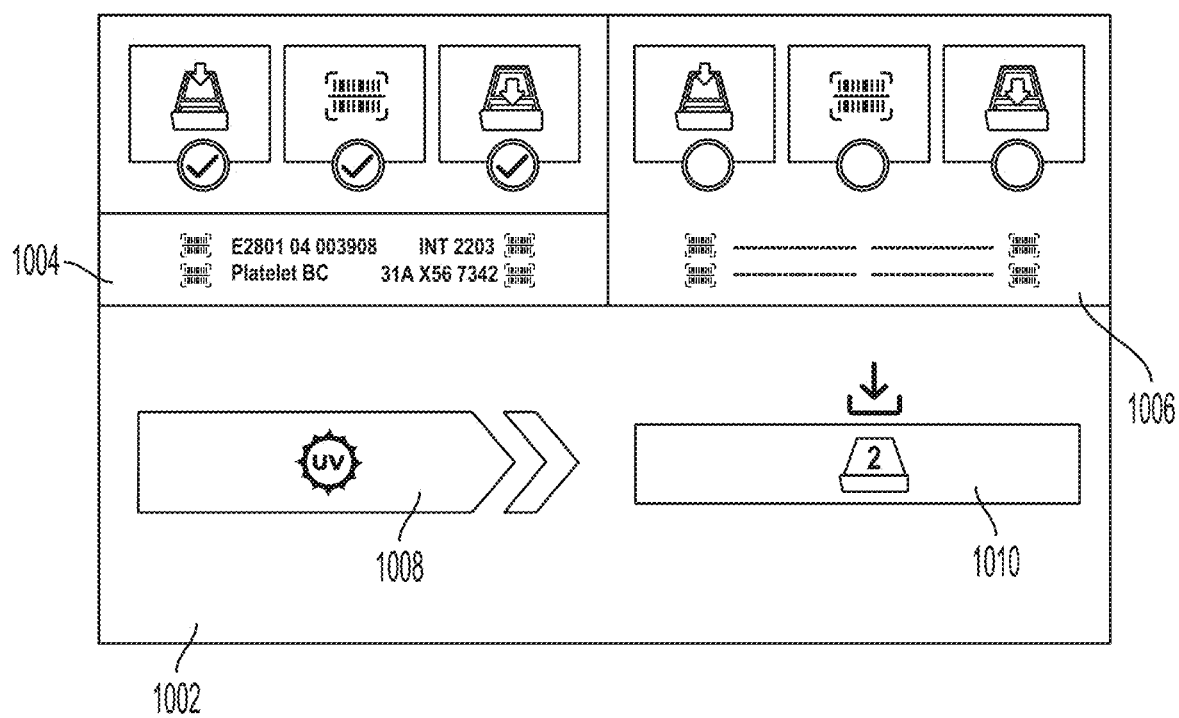
FIG. 10 illustrates an exemplary processing initialization graphical user interface according to examples of the disclosure.

Once button 912 has been clicked by the user, the graphical user interface depicted in FIG. 10 can be presented to the user. FIG. 10 illustrates an exemplary processing initialization graphical user interface according to examples of the disclosure. In the example of FIG. 10, graphical user interface 1002 can be presented to the user, that includes two separate visuals 1004 and 1006. Visual 1004 can correspond to processing in a first treatment chamber of the device while visual 1006 can correspond to processing in a second treatment chamber of the device. As discussed above with respects to FIGS. 1-3, the device can include two separate and independent treatment chambers (e.g., and respective platforms) that can be used for processing (e.g., independently processing) separate biological fluids. In the examples of FIGS. 1-2, the treatment chambers (e.g., and respective platforms) can be arranged horizontally. In other words, the treatment chambers (e.g., and respective platforms) can be disposed side-by-side on the device. Thus, in the example of graphical user interface 1002, the visual indicators 1004 and 1006 corresponding to each treatment chamber (e.g., and respective platform) can also be disposed side-by-side so as to correspond with the layout of the treatment chambers (e.g., and respective platforms) on the device. As discussed in further detail below, in one or more examples, the visuals can be oriented one on top of the other so as to correspond to a device that has the treatment chambers (e.g., and respective platforms) vertically oriented as depicted with respect to the examples of FIG. 3. Each visual indicator 1004 and 1006 can include information about the past processing steps completed in each treatment chamber. Thus, in the example of FIG. 10, graphical user interface 1002 can indicate at visual indicator 1004 what steps have been completed and the identifying information (e.g., barcodes) that have been scanned with respect to processing steps of that treatment chamber. Visual indicator 1006 can have blanks for each phase indicating that none of the steps have been completed, and no identifying information (e.g., barcodes) have been scanned.

In one or more examples, graphical user interface 1002 can include two separate buttons 1008 and 1010. Button 1008 can be selectable by the user to initiate illumination of the biological fluid in the corresponding treatment chamber. Button 1010 can be selectable by the user to initiate the process of loading and preparing treatment chamber (e.g., and respective platform) 2 with a biological fluid, and the user can then be presented with the series of graphical user interfaces depicted in FIGS. 7-9 so as to properly load treatment chamber (e.g., and respective platform) 2 with a separate biological fluid. Thus, if button 1008 is selected the illumination of the biological fluid in the first treatment chamber can commence, and if the user selects button 1010, the loading of the second treatment chamber (e.g., and respective platform) can commence.

Figure 11:
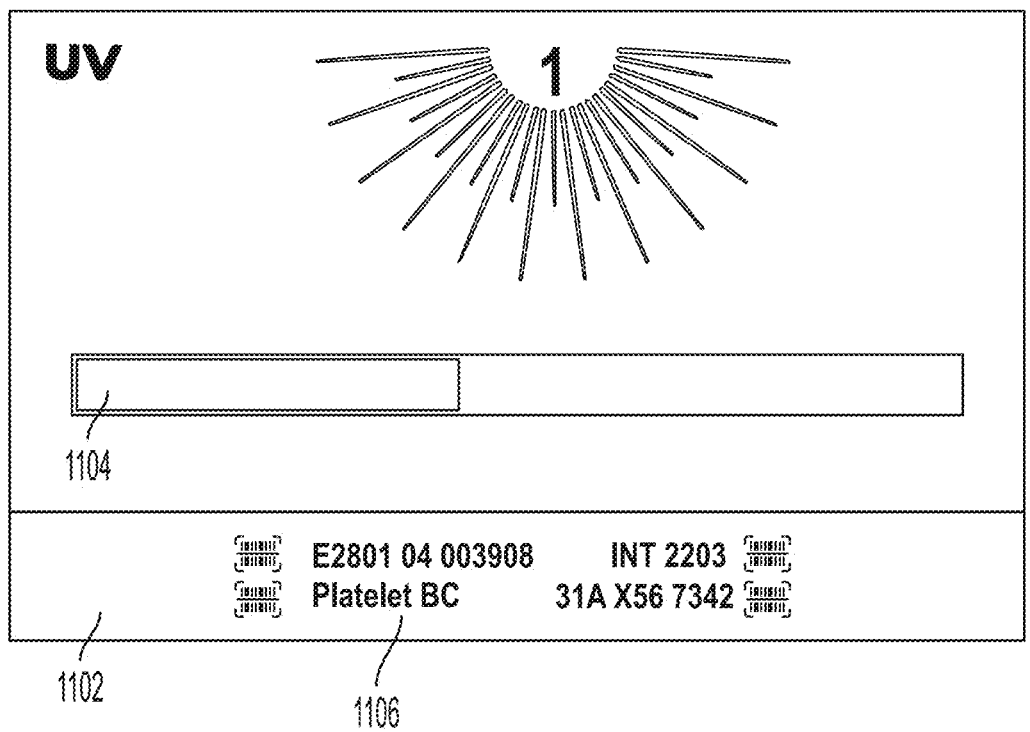
FIG. 11 illustrates an exemplary processing visualization graphical user interface according to examples of the disclosure.

Once the user selects button 1008, the graphical user interface of FIG. 11 can be displayed by the device. FIG. 11 illustrates an exemplary processing visualization according to examples of the disclosure. In the example of FIG. 11, the visualization 1102 can include an indicator bar 1104 that indicates the progress of the illumination of the biological fluid and can give the user a sense of how far along the illumination has progressed and how much illumination remains to be completed. For instance if indicator bar 1104 is half filled and half empty, this can indicate that the illumination of the biological fluid is only half-way complete.

In one or more examples, in addition to the show the progress of the illumination via indicator bar 1104, the visualization 1102 can also provide a identifying information (e.g., barcode information) visualization 1106 that can show the identifying information (e.g., barcode information) of the biological fluid that is currently being illuminated.

Figure 12:
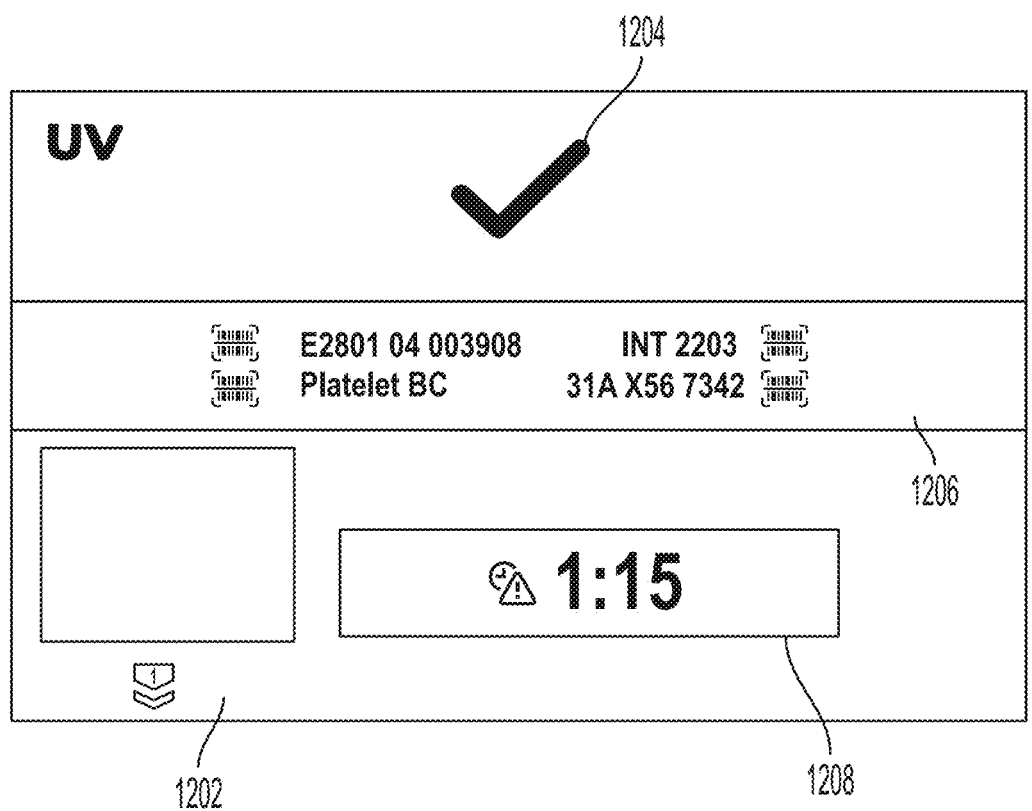
FIG. 12 illustrates an exemplary post-processing visualization according to examples of the disclosure.

Once the illumination has been completed, the user can be presented with the visualization depicted in FIG. 12. FIG. 12 illustrates an exemplary post-processing (e.g., post-illumination) visualization according to examples of the disclosure. In the example of FIG. 12, the visualization 1202 can include an indicator (e.g., check mark) 1204 that can indicate that the processing (e.g., illumination) is completed. The visualization 1202 can also include identifying information (e.g., barcode information) 1206 that allows the user to visualize which biological fluid has been processed.

Finally, visualization 1202 can include a time indicator 1208 that can indicate how much time elapsed since the processing (e.g., illumination) was completed. As discussed above with respect to FIG. 4, in some embodiments the treated biological fluid should be removed within a pre-determined time from the device, for example to initiate one or more additional processing steps separate from the system or to place the treated biological fluid into an appropriate storage environment within a pre-determined amount of time. Time indicator 1208 can help the user to visually keep track of how much time has elapsed since processing (e.g., illumination) has been completed while the treated biological fluid still remains in the device. In one or more examples, time indicator 1208 can change its color to indicate when the pre-determined time discussed above has elapsed thus indicating that the biological fluid may no longer meet a specification (e.g., may not be suitable for intended use).

Figure 13:
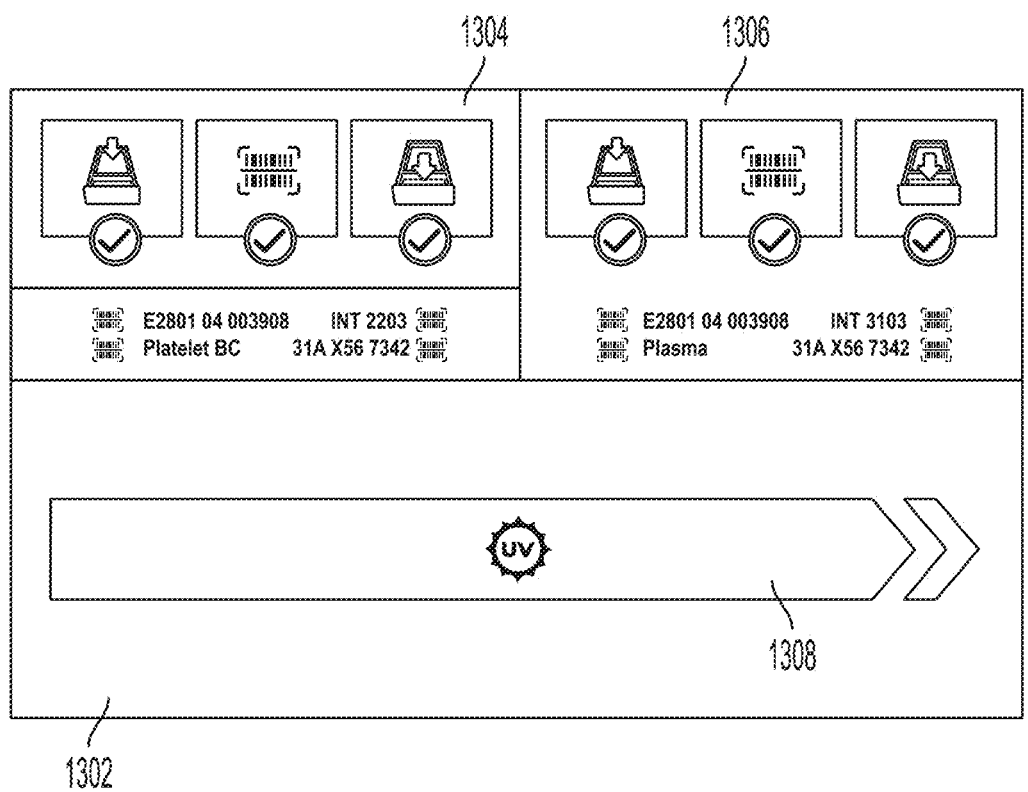
FIG. 13 illustrates another exemplary processing initialization graphical user interface according to examples of the disclosure.

Returning back to the example of FIG. 10, if the user clicks on button 1010 and then goes through the series of graphical user interfaces depicted in FIGS. 7-9, the user can be provided with a visualization similar to the one shown in the example of FIG. 13. FIG. 13 illustrates another exemplary processing initialization graphical user interface according to examples of the disclosure. In the example of FIG. 13, graphical user interface 1302 can include two visuals 1304 and 1306 that can correspond to visuals 1004 and 1006 of FIG. 10 respectively. However, in this example, since both treatment chambers (e.g., and respective platforms) have been loaded, both visuals 1304 and 1306 can indicate that both treatment chambers (e.g., and respective platforms) corresponding to those visuals have been properly loaded by the user.

Figure 14:
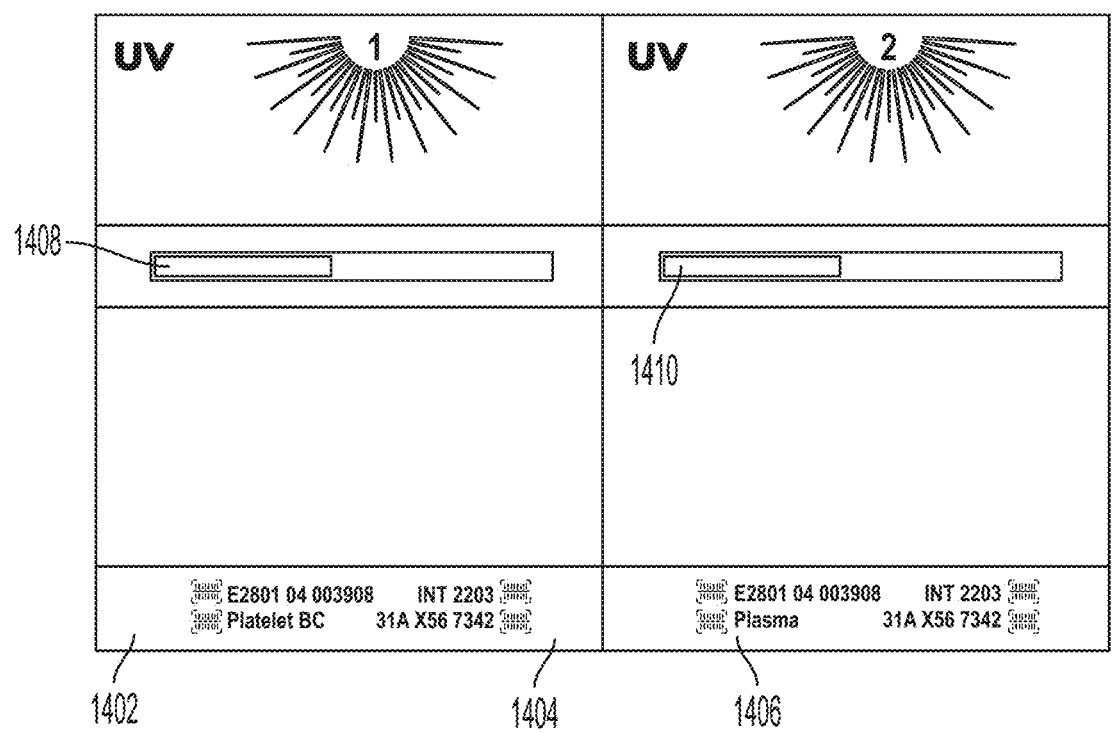
FIG. 14 illustrates another exemplary processing visualization according to examples of the disclosure.

In this instance, in graphical user interface 1302, the user can be presented with a single button 1308 that can be pressed by the user to initiate processing (e.g., illumination) in both treatment chambers or the remaining treatment chamber if the other treatment chamber is already illuminating. If the user clicks on button 1308, the user can then be presented with the visualization depicted in FIG. 14. FIG. 14 illustrates another exemplary processing visualization according to examples of the disclosure. In the example of FIG. 14, visualization 1402 can include two separate panels 1404 and 1406 that can correspond to the two separate treatment chambers of the device. In the example of FIG. 14, the panels 1404 and 1406 can be oriented side-by-side to correspond to the horizontal layout of the treatment chambers (e.g., and respective platforms) as depicted in the device described above with respect to FIGS. 1-2. As discussed in further detail below, panels 1404 and 1406 can also be oriented vertically so as to correspond to the layout of the treatment chambers (e.g., and respective platforms) in the device depicted in FIG. 3. In one or more examples of the disclosure, each panel 1404 and 1406 can include an indicator bar 1408 and 1410 respectively that can show the progress of the processing (e.g., illumination) for each treatment chamber.

Figure 15:
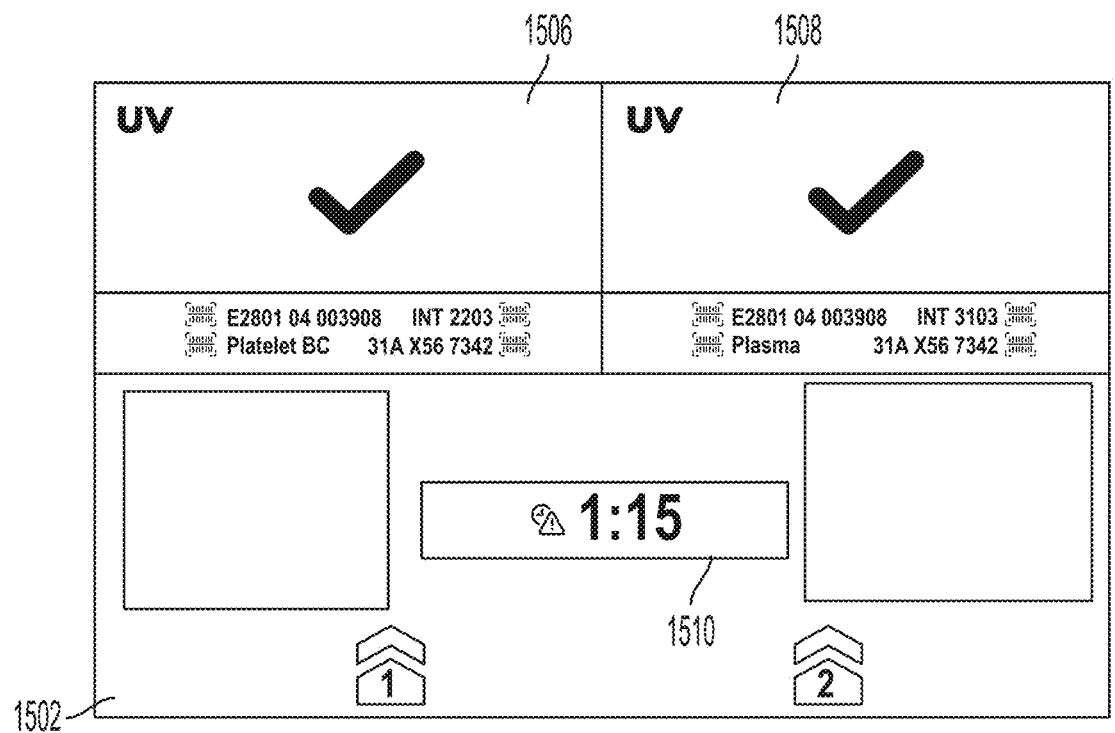
FIG. 15 illustrates another exemplary post-processing visualization according to examples of the disclosure.
Figure 15:
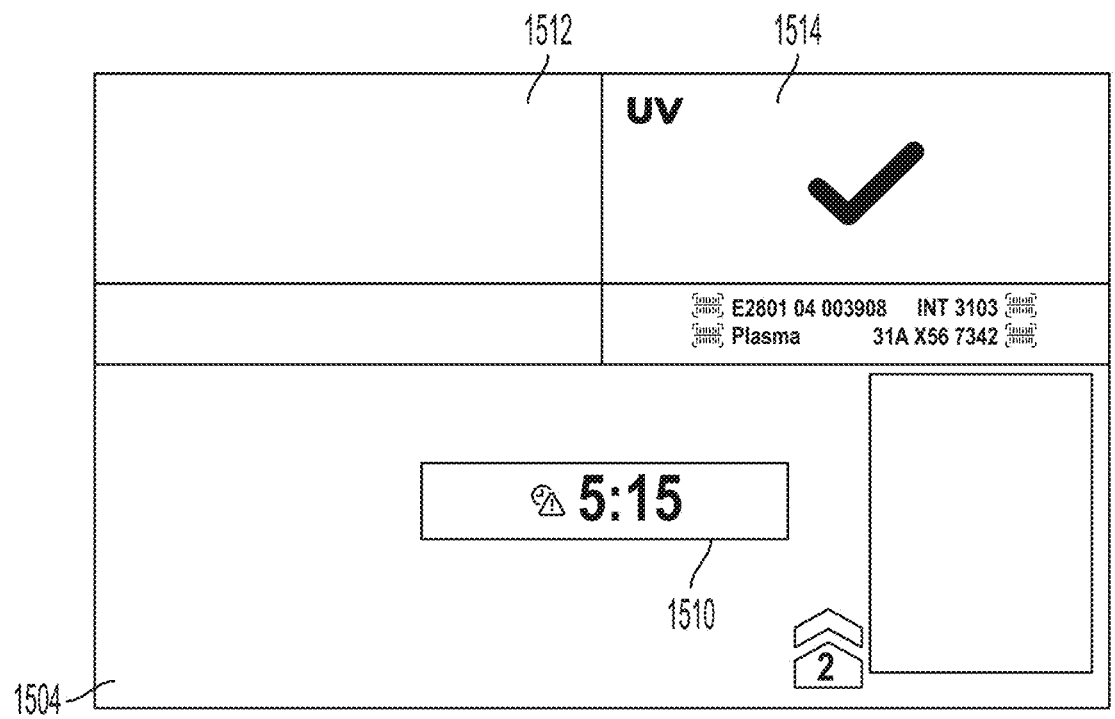

FIG. 15 illustrates another exemplary post-processing (e.g., post-illumination) visualization according to examples of the disclosure. The example of FIG. 15 can illustrate a post-processing (e.g., post-illumination) visualization in which two platforms have been processed simultaneously. In the example of FIG. 15, the visualization 1502 can include two separate panels 1506 and 1508 that correspond to the two treatment chambers of the system depicted in FIGS. 1-2. Like the treatment chambers (e.g., and respective platforms) in FIGS. 1-2, the panels 1506 can be arranged side-by-side so as to correspond with the layout of the treatment chambers (e.g., and respective platforms). Like the example of FIG. 12, each panel can include a check mark or some other visual indicator to show that the processing (e.g., illumination) has been completed. Also like FIG. 12, each panel 1506 and 1508 can also include the identifying information (e.g., bar code information) for the biological fluid processed in each panel.

In one or more examples, the graphical user interface 1502 can include a time indicator 1510 that displays the amount of time that has elapsed since the processing (e.g., illumination) has been completed. The time indicator 1510 can operate in substantially the same manner as the time indicator 1208 discussed above with respect to FIG. 12.

In one or more examples, if processing occurred in only one treatment chamber and another treatment chamber was left empty, the visualization depicted in 1504 can be presented to the user. In the visualization 1504, panel 1512 corresponding to the left most treatment chamber can be left substantially blank, while panel 1514 can display the identical information displayed in panel 1508. In this way, the user can visually see which treatment chamber is empty and which treatment chamber was used for processing. In the event that only one treatment chamber was used for processing, then the time indicator 1510 can correspond to the amount of time since the processing (e.g., illumination) in the single treatment chamber was completed.

Figure 16:
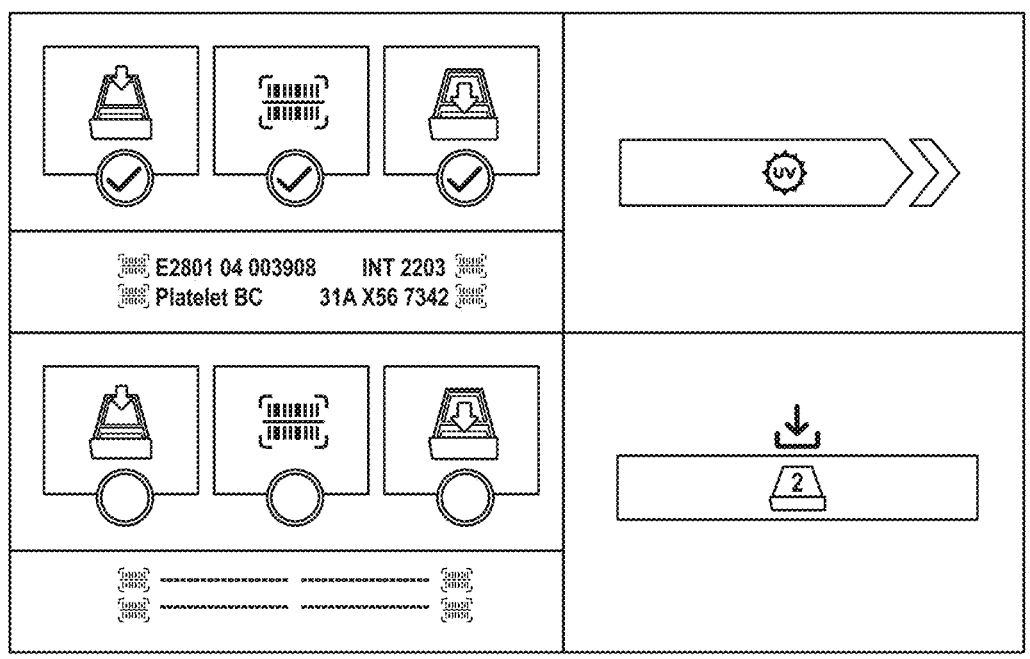
FIG. 16 illustrates another exemplary processing initialization graphical user interface according to examples of the disclosure

FIG. 16 illustrates another exemplary processing initialization graphical user interface according to examples of the disclosure. The example of FIG. 16 can operate in substantially the same manner as FIG. 10 except that the graphical user interface can be oriented vertically to correspond with the example of FIG. 3 wherein the treatment chambers (e.g., and respective platforms) are oriented vertically with one another.

Figure 17:
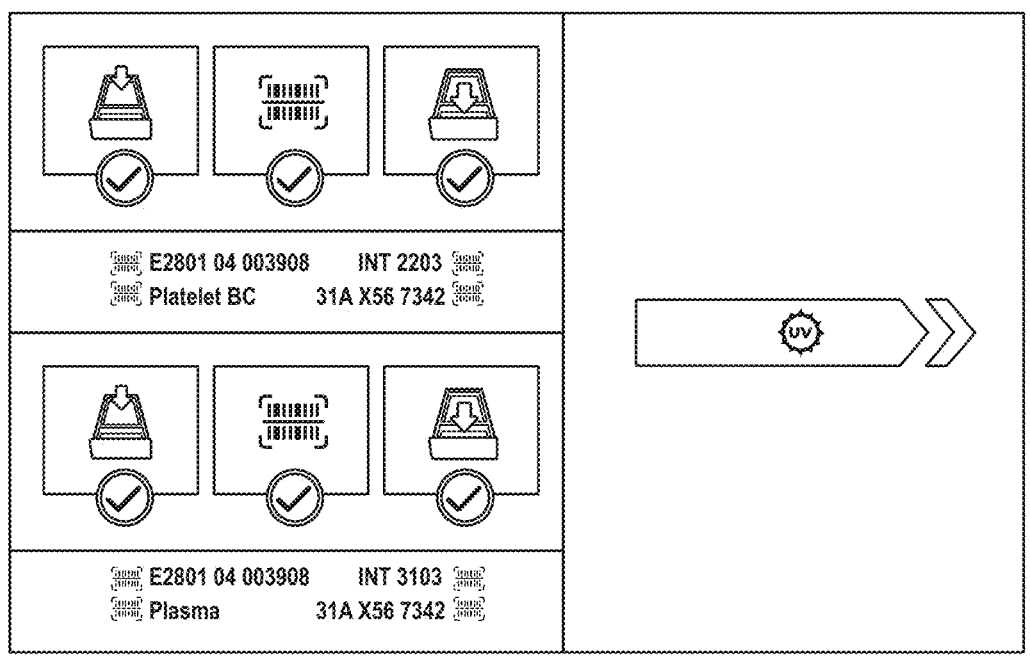
FIG. 17 illustrates another exemplary processing initialization graphical user interface according to examples of the disclosure.

FIG. 17 illustrates another exemplary processing initialization graphical user interface according to examples of the disclosure. The example of FIG. 17 can operate in substantially the same manner as FIG. 13 except that the graphical user interface can be oriented vertically to correspond with the example of FIG. 3 wherein the treatment chambers (e.g., and respective platforms) are oriented vertically with one another.

Figure 18:
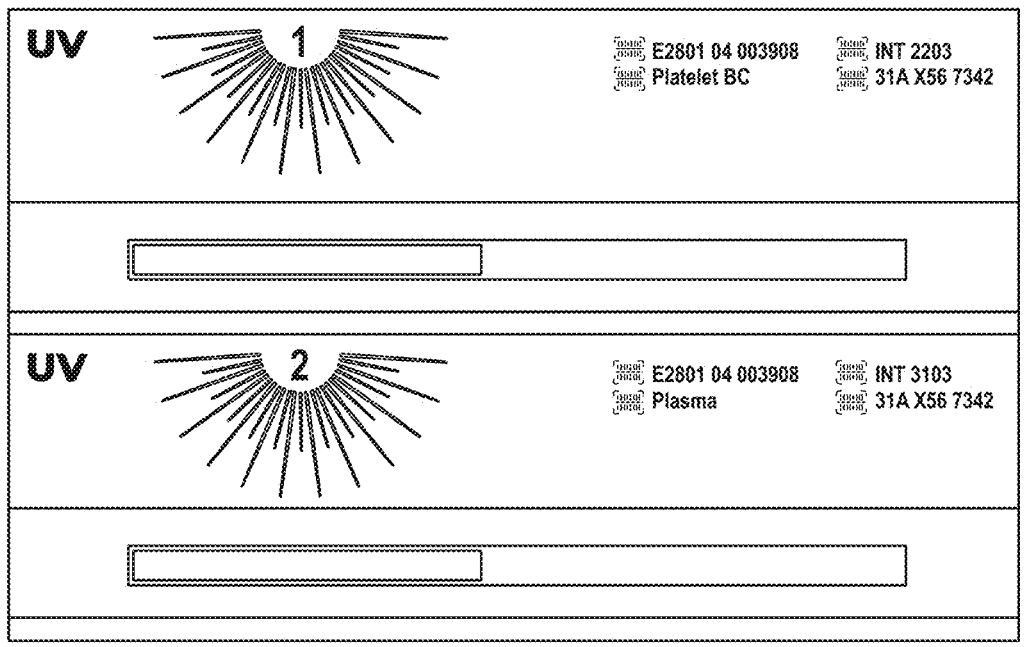
FIG. 18 illustrates another exemplary processing visualization according to examples of the disclosure.

FIG. 18 illustrates another exemplary processing visualization according to examples of the disclosure. The example of FIG. 18 can operate in substantially the same manner as FIG. 14 except that the graphical user interface can be oriented vertically to correspond with the example of FIG. 3 wherein the treatment chambers (e.g., and respective platforms) are oriented vertically with one another.

Figure 19:
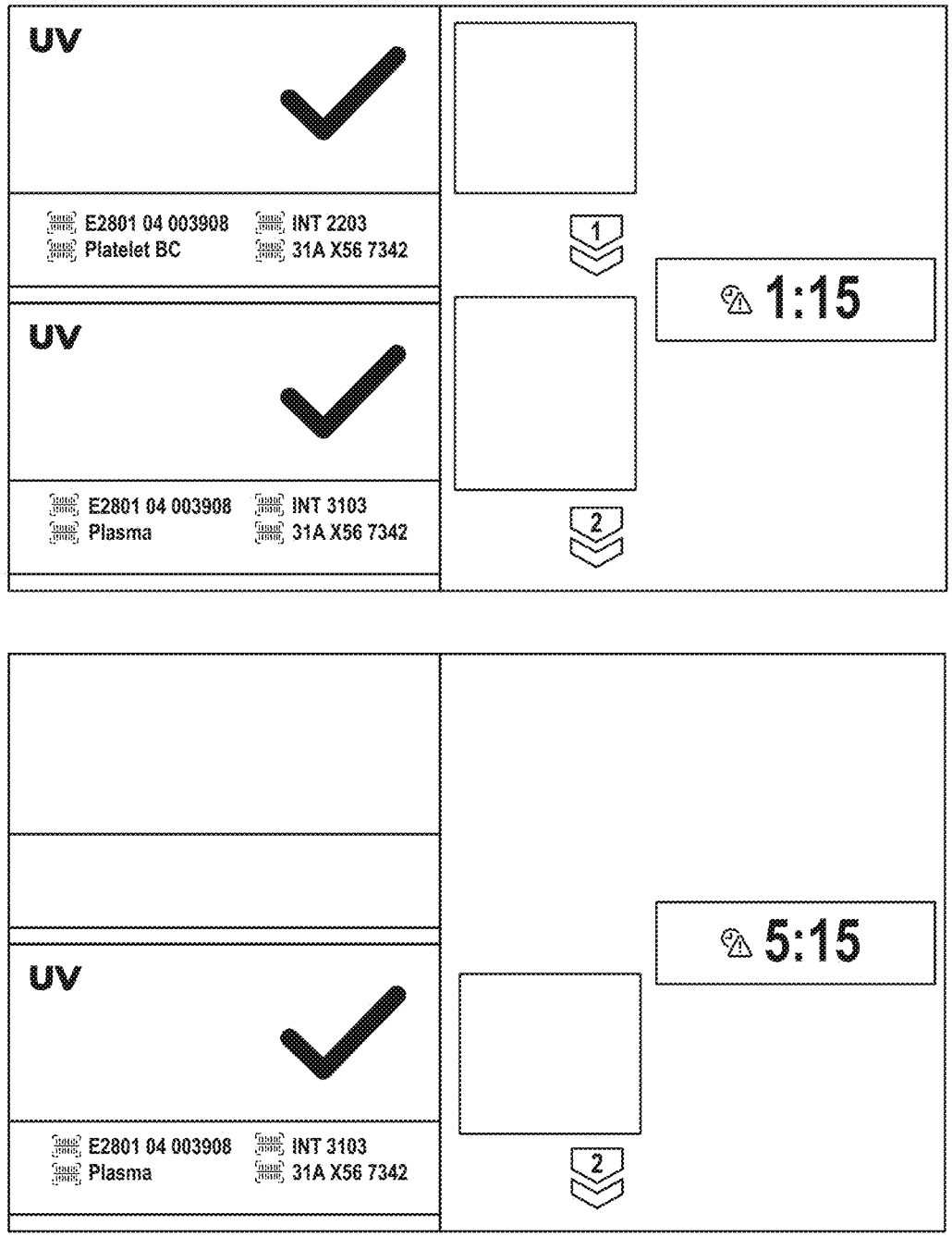
FIG. 19 illustrates another exemplary post-processing visualization according to examples of the disclosure.

FIG. 19 illustrates another exemplary post-processing visualization according to examples of the disclosure. The example of FIG. 19 can operate in substantially the same manner as FIG. 15 except that the graphical user interface can be oriented vertically to correspond with the example of FIG. 3 wherein the treatment chambers (e.g., and respective platforms) are oriented vertically with one another.

The example graphical user interfaces presented above can allow for closely guided interaction between the electronic device and a user so as to ensure proper handling and processing of biological fluids. However, there can be a balance between closely guiding a user's action with an array of graphical user interfaces and not including too many graphical user interfaces that require the user to spend time walking through the steps and interactions dictated by the graphical user interfaces. In one or more examples, the above graphical user interfaces can be configured to collectively provide visual guidance (e.g., visual guidance without corresponding text) to the user when operating the electronic device so as to improve efficiency and/or to minimize error during operation.

Thus in one or more examples, a graphical user interface scheme for a biological fluid treatment device can seek to maximize guidance to a user's interaction with the device, while simultaneously minimizing the number of different graphical user interfaces presented to a user and/or minimizing required user input during operation of the device so as to improve the efficiency of the operation of the device and/or reduce the likelihood of error. Presented below, is another exemplary sequence of graphical user interfaces presented to a user that can ensure proper operation of the device, while minimizing the number of graphical user interfaces provided to the user and/or requiring user input during operation of the device. The one or more graphical user interfaces presented below, like the graphical user interfaces described above, can be configured to collectively provide visual guidance (e.g., visual guidance without corresponding text) to the user when operating the electronic device so as to improve efficiency and/or to minimize error during operation.

Figure 20:
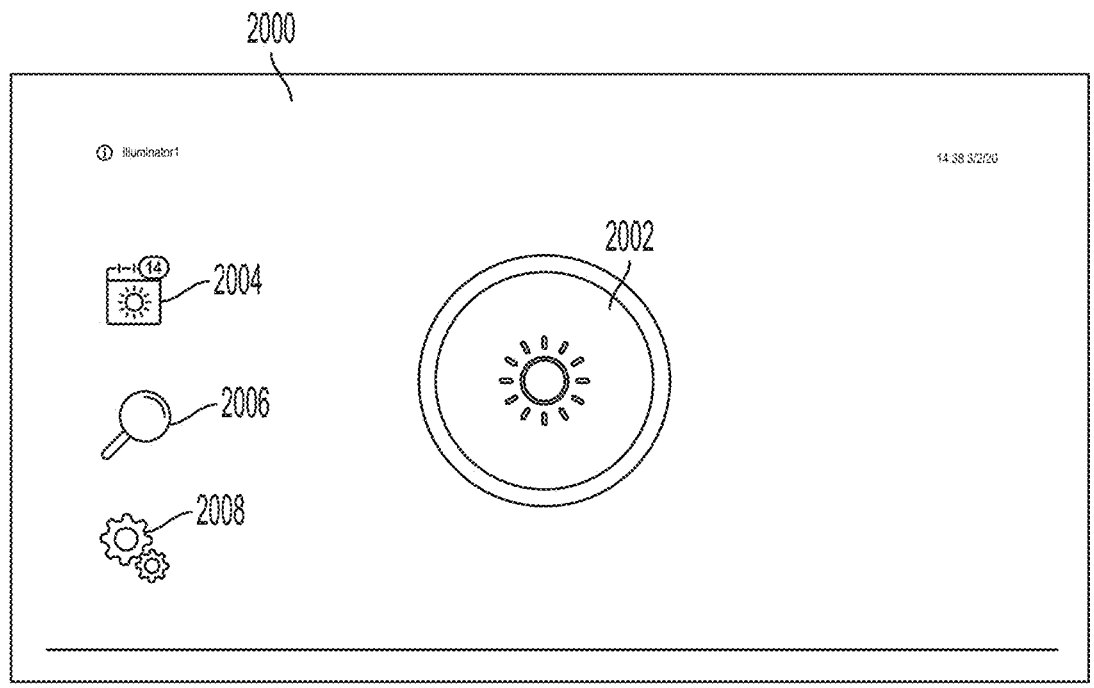
FIG. 20 illustrates an exemplary welcome screen according to examples of the disclosure.

FIG. 20 illustrates an exemplary welcome screen according to examples of the disclosure. The example graphical user interface 2000 of FIG. 20 can include a plurality of user selectable buttons, that when selected allow the user to access various functionalities of the device. In one or more examples, the graphical user interface 2000 can include a user selectable button 2002 that when selected can allow the user to initiate the process of treating a biological fluid as described above. As will be described in further detail below, selecting button 2002 can initiate a process in which the user is presented with a plurality of graphical user interfaces that can be collectively configured to guide the user through a treatment process and ensure that user properly interacts with the device so as to properly process the biological fluids being treated.

In one or more examples, the graphical user interface 2000 can include a user selectable button 2004 that when selected by a user can allow the user to view the history of recent treatment events performed on the device. In one or more examples, and as described in further detail below, when a user selects button 2004 the user can be presented with an additional graphical user interface that displays the treatment events that took place on the device during the current calendar day. For example if the user is accessing the graphical user interface 2000 on Jan. 15, 2020, then when button 2004 is selected, the user can be presented with a history of all treatment events that occurred on that same day (i.e., Jan. 15, 2020.)

In one or more examples, the graphical user interface 2000 can include a user selectable button 2006 that when selected can allow the user to search the history of some or all of the treatment events performed on the device. In one or more examples, and as described in further detail below, when a user selects button 2006, the user can be presented with an additional graphical user interface that allows the user to search for one or more treatment events based on one or more parameters, such as for example one or more parameters provided by the user.

In one or more examples, the graphical user interface 2000 can include a user selectable button 2008 that when selected by the user can allow for the user to access one or more graphical user interfaces that are collectively configured to allow the user to configure one or more settings of the electronic device (as will be described in further detail below.)

In one or more examples of the disclosure when the user selects button 2002 of graphical user interface 2000, the electronic device can initiate a series of graphical user interfaces that are collectively configured to guide the user through the process of treating a biological fluid. As will be illustrated by the examples provided below, the series of graphical user interfaces can be configured to ensure proper interaction with the device thereby maximizing the likelihood of a successful treatment process while at the same time minimizing the number of interactions between the user and the device so as to make the process more efficient, less time consuming, and/or reducing likelihood of error.

Figure 21:
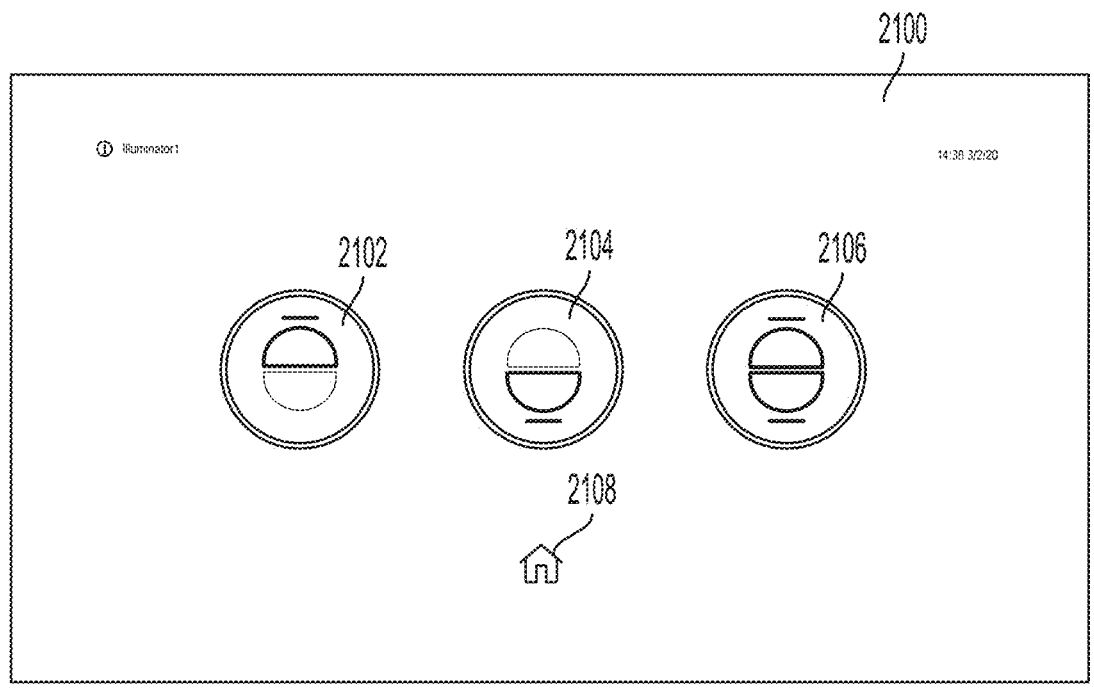
FIG. 21 illustrates an exemplary platform-loading graphical user interface according to examples of the disclosure.

FIG. 21 illustrates an exemplary platform-loading process graphical user interface according to examples of the disclosure. In one or more examples, the graphical user interface 2100 can be presented to the user when button 2002 of graphical user interface 2000 described above with respect to FIG. 20 is selected by the user. In one or more examples, graphical user interface 2100 can include a plurality of user selectable buttons 2102, 2104, and 2106, that are configured to allow the user to indicate to the device which treatment chamber the user desires to use for treating one or more biological fluids. Referring back to FIG. 3 of the disclosure, the device 300 can include multiple platforms, each for carrying a biological fluid in a treatment chamber of the device. For instance, with respect to the example of FIG. 3, the device 300 can include a first treatment platform 340 for carrying a biological fluid in a first treatment chamber and a second treatment platform 350 for carrying a biological fluid in a second treatment chamber. As discussed above, the user can choose to process a biological fluid with either platform 340 or 350 (e.g., in first or second treatment chamber, respectively), and in some examples can even process biological fluids with both platforms (e.g., in both treatment chambers) simultaneously. Thus, in the example of FIG. 21, the buttons 2102, 2104, and 2106 can be configured to allow the user to indicate which treatment chambers of the device to perform the treatment process in.

In one or more examples, button 2102 can be selected by the user to indicate that they will be processing the biological fluid in a first treatment chamber (e.g., an upper chamber) of the device (i.e., platform 340 of FIG. 3). In one or more examples, button 2104 can be selected by the user to indicate that they will be processing the biological fluid in a second treatment chamber (e.g., lower chamber) of the device (i.e., platform 350 of FIG. 3). In one or more examples, button 2106 can be selected by the user to indicate that they will be processing biological fluids simultaneously in both treatment chambers (e.g., upper chamber and lower chamber) (i.e., platforms 340 and 350 of FIG. 3.) In one or more examples, buttons 2102 and 2104 can combined into a single graphical button with two selectable portions (not shown). In this example, the user can select either the first half (e.g., the top half) of the button to initiate treatment in the first treatment chamber (e.g., upper chamber) or could select the second half (e.g., lower half) of the button to initiate treatment in the second treatment chamber (e.g., lower chamber) of the device. Thus, although visually appearing as a single button, the visual single button can include two selectable buttons.

While the example of FIG. 21 shows that the chambers are oriented vertically, in or more examples, the buttons can display images that correspond to a device in which the platforms and respective treatment chambers are oriented horizontally such as in the example of FIG. 2. In one or more examples of the disclosure, the graphical user interface 2100 can include a user selectable button 2108 that when selected can allow the user to abandon the initiated treatment process and revert back to the graphical user interface 2000 of FIG. 20.

Figure 22:
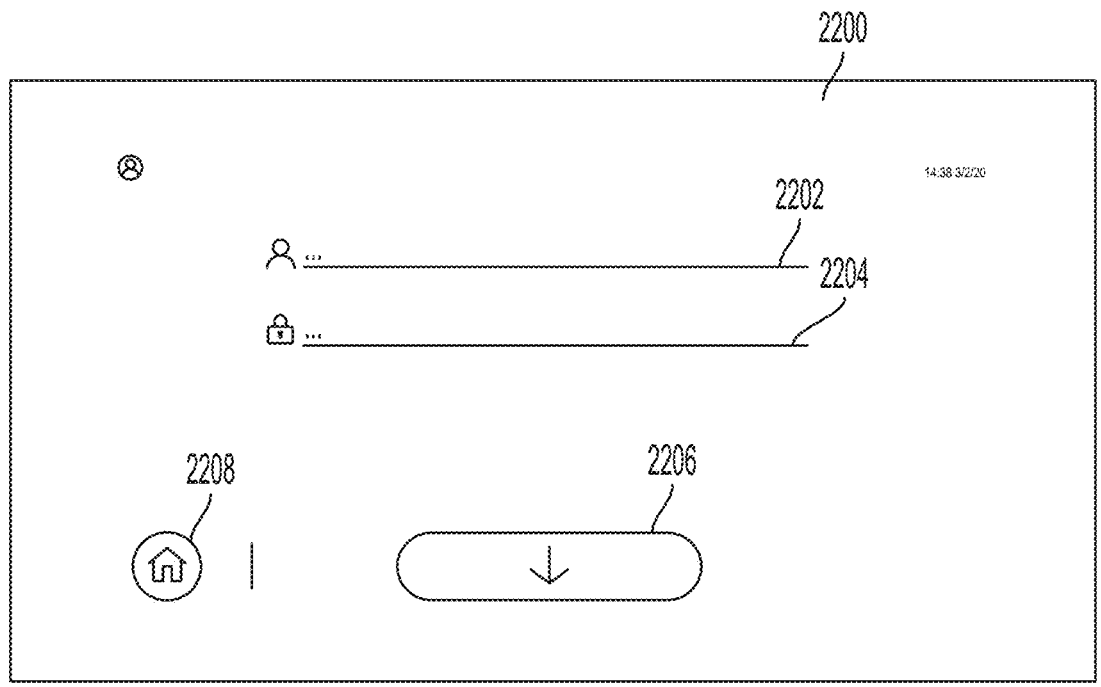
FIG. 22 illustrates an exemplary login graphical user interface according to examples of the disclosure.

In one or more examples of the disclosure, the user may be prompted to authenticate their identity to the electronic device, for example to ensure that the user is authorized to perform treatments with the device and/or to generate a user record associated with a treatment process performed by the user with the device. In some embodiments, once the user selects a button 2102, 2104, or 2106, the user can then be prompted to authenticate their identity to the electronic device. In some embodiments, once the user selects a button 2002, 2004, 2006 or 2008, the user can then be prompted to authenticate their identity to the electronic device. FIG. 22 illustrates another exemplary login graphical user interface according to examples of the disclosure. The example graphical user interface 2200 of FIG. 22 can be substantially identical to the example of FIG. 5 discussed in detail above. Thus, a description of the operation of elements 2202, 2204, and 2206 can be referenced above with their counterparts from FIG. 5, elements 502, 504, and 506 respectively. In one or more examples of the disclosure, the graphical user interface 2200 can include a user selectable button 2208 that when selected can allow the user to abandon the initiated treatment process and revert back to the graphical user interface 2000 of FIG. 20.

Figure 23A:
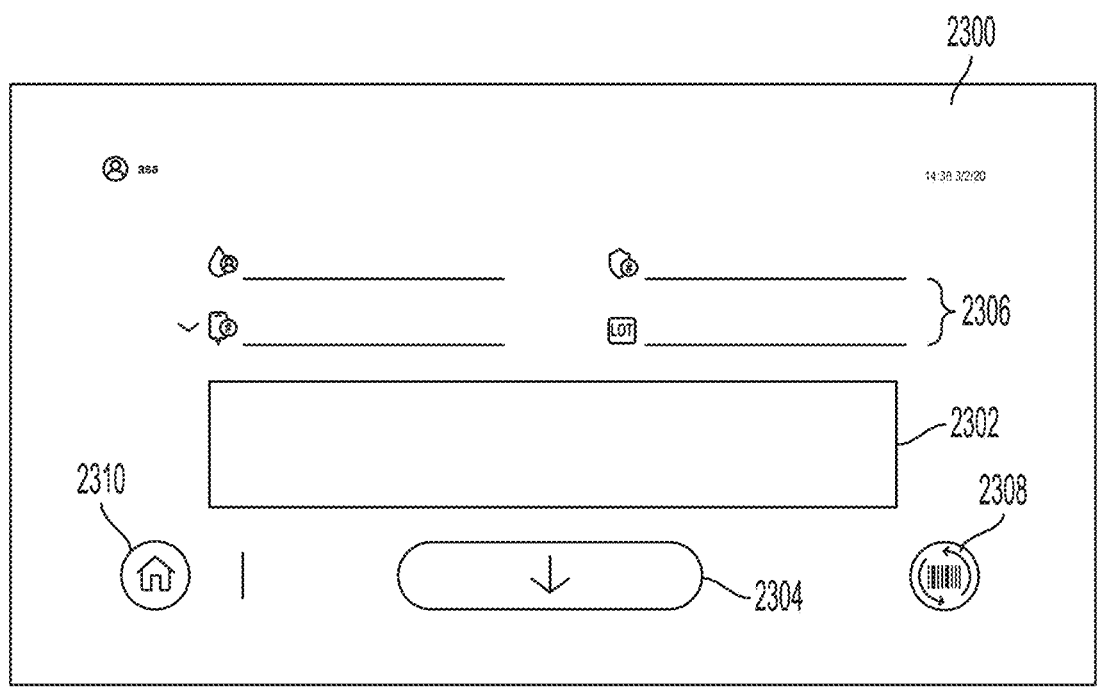
FIG. 23a illustrates an exemplary identifying information graphical user interface according to examples of the disclosure.

Once the user clicks on button 2206 (and assuming the users credentials are accepted by the device), the user can then be presented graphical user interface 2300 depicted in FIG. 23*a*. FIG. 23*a* illustrates an exemplary platform loading process graphical user interface according to examples of the disclosure. In one or more examples, a "platform loading process" can refer to the process of placing a treatment container (e.g., treatment bag) containing the biological fluid into the device (e.g., on a platform of the device) and scanning the treatment container or container associated with the treatment container (e.g., part of a multi-container processing set) so as to collect identifying information associated with the biological fluid.

In one or more examples, the graphical user interface 2300 can include a graphical image 2302 that visually depicts one or more processes the user is to engage in to load a biological fluid container in the device (e.g., on a platform) and/or scan in the identifying information (e.g., barcodes scan) associated with the biological fluid. In one or more examples, the graphical image 2302 can also be in the form of an animation that visually depicts what the user should be doing. In one or more examples, the graphical image 2302 can instruct the user to perform a scanning process in which the user is actively involved in performing the scanning process (e.g., by positioning a container to be scanned, by using a handheld scanner), or in one or more examples can perform the scanning process by simply loading the platform and/or moving the loaded platform into the treatment chamber (in which case the one or more scanners integrated or embedded in the electronic device can acquire the bar codes using a built-in scanner.) Graphical user interface 2300 can also include an identifying information display 2306 that visually depicts the various identifying information associated with a biological fluid (e.g., information from scanning, donation ID, product code, set code, lot number). In the example of graphical user interface 2300, the fields associated with identifying information display 2306 can be blank as no identifying information has yet been scanned. However, as the identifying information associated with the biological fluid is scanned, the barcode field 2306 can become populated as depicted in examples provided below.

In one or more examples, the graphical user interface 2300 can include a user selectable button 2308 that when selected by the user can cause a scanner of the device to activate so as to scan one or more barcodes associated with the biological fluid(s) being treated. In one or more examples, the user can engage in a multi-scanning process such that the one or more barcodes associated with a biological fluid are scanned in a specific order (e.g., sequentially) and the fields 2306 are thus populated in a particular order. Alternatively, and in one or more examples, the user can engage in a "smart-scanning" process in which the system can acquire multiple fields of identifying information (e.g., substantially simultaneously) and/or recognize which field of the fields 2306 to populate based on the received scan, thus not requiring that the barcodes be scanned in any particular order. As discussed above, barcodes are only used an example of a method used to extract identifying information associated with a biological fluid, and should not be seen as limiting. In one or more examples, the device can also utilize RF tags or QR codes or any other method for scanning data known to those of skill in the art.

Figure 23B:
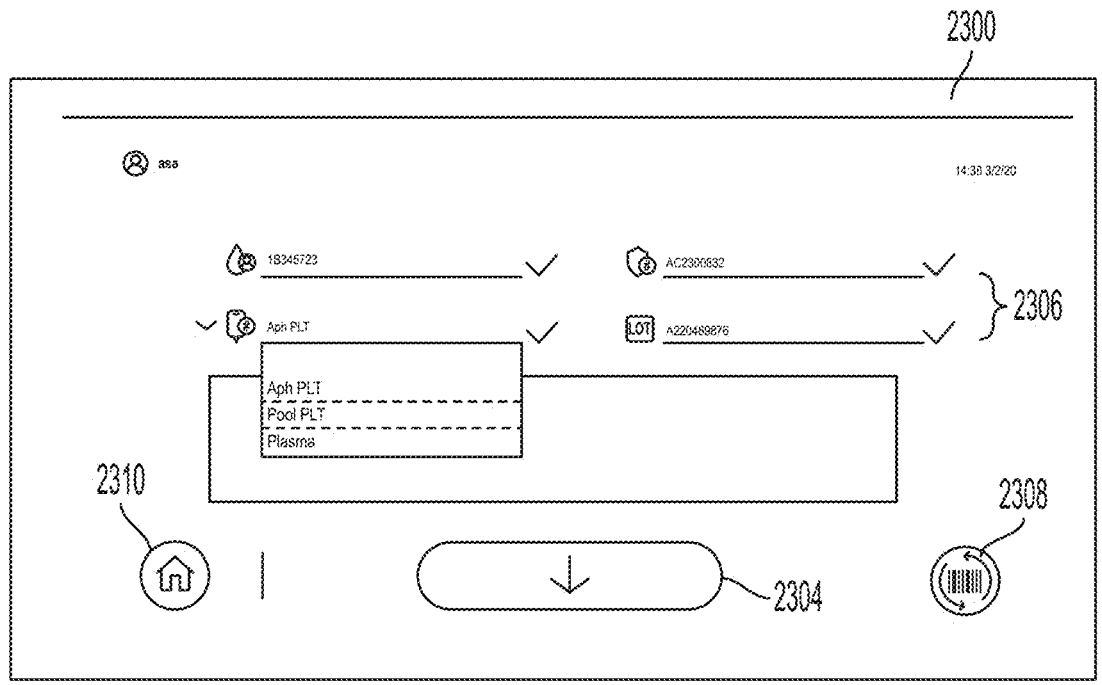
FIG. 23b illustrates an exemplary identifying information graphical user interface according to examples of the disclosure.

FIG. 23B illustrates the same graphical user interface 2300 after the barcodes of the biological fluid have been scanned. In one or more examples identifying information fields 2306 can include a user selectable field that a user can click on and pick an option from a drop-down menu. For example, as indicated in graphical user interface 2306 of FIG. 23B, the blank field can include a drop-down menu that the user can use to indicate a type of biological fluid (e.g., product code), such as for example, whether a given biological fluid is plasma or platelets, and the type of platelets. As shown in FIG. 23*b*, the identifying information field 2306 of graphical user interface 2300 can now indicate that the biological fluid is Aph platelets (e.g., apheresis collected platelets).

Figure 23C:
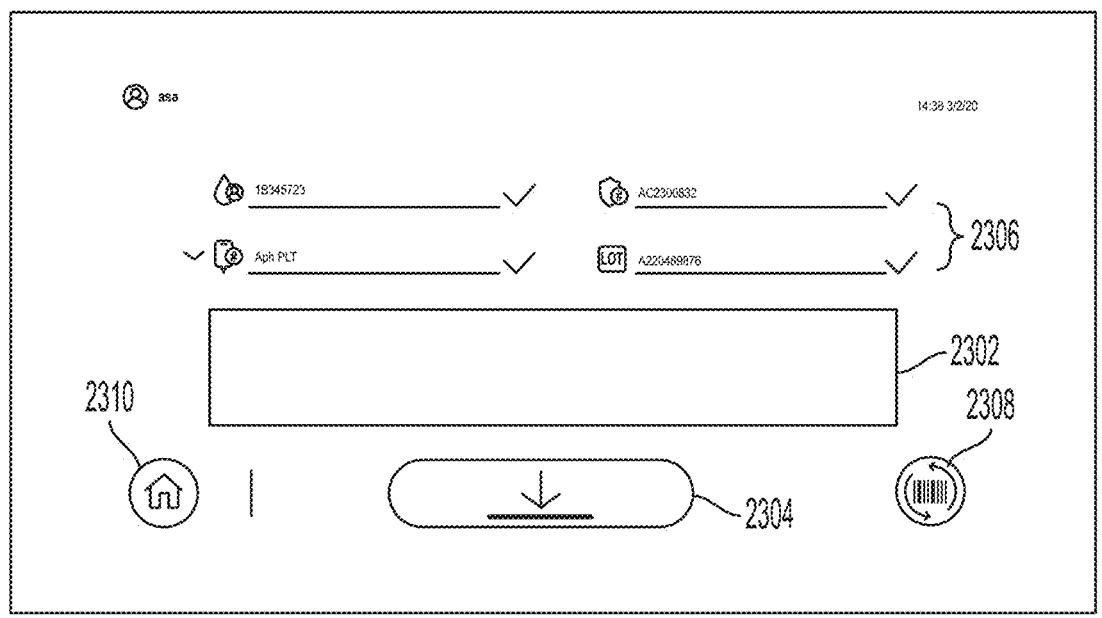
FIG. 23c illustrates an exemplary identifying information graphical user interface according to examples of the disclosure.

Once the biological fluid (e.g., container with the biological fluid) has been placed in the device (e.g., on platform of treatment chamber) and all identifying information (e.g., each and every barcode) field has been acquired, a user selectable indicator 2304 can be made selectable in the graphical user interface 2300, as shown in FIG. 23C, indicating to the user that the biological fluid has been properly placed in the device and all of the identifying information (e.g., every barcode) field 2306 has been acquired. In one or more examples, user selectable button 2304 may only be selectable by the user when each of the fields 2306 are populated and when the device detects that the treatment container (e.g., treatment bag) and the treatment chamber (e.g., platform within treatment chamber) are in a proper position for treatment to proceed (e.g., treatment chamber is closed). In one or more examples, rather than the user selecting button 2304, button 2304 can be automatically selected by the electronic device in response to the fields 2306 being completely filled in and a determination by the device that the treatment container and the treatment chamber are in their proper positions for the treatment to proceed. In one or more examples of the disclosure, the graphical user interface 2300 can include a user selectable button 2310 that when selected can allow the user to abandon the initiated treatment process and revert back to the graphical user interface 2000 of FIG. 20.

Figure 24:
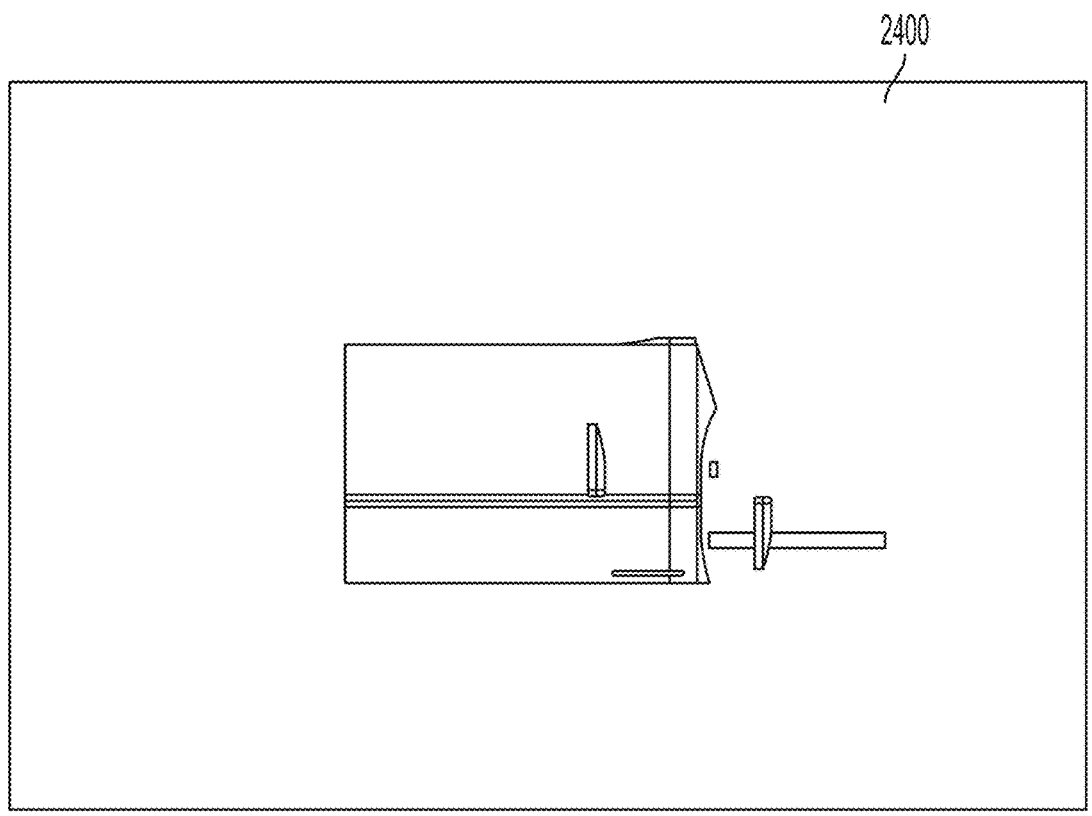
FIG. 24 illustrates an exemplary platform-loading graphical user interface according to examples of the disclosure.

In one or more examples, if the user attempts to select button 2304 when the treatment container (e.g., bag) and/or treatment chamber are not in a proper position (i.e., the chamber is open) then in one or more examples, the visual depiction 2302 can change to illustrate a treatment container placement animation prompting the user to position the container and/or a chamber closing animation prompting the user to close the chamber. Alternatively, in one or more examples, if the user attempts to select button 2304 without the chamber being in the proper position (e.g., closed), the device can provide a separate graphical user interface such as the one illustrated in FIG. 24 that directs the user to close the chamber.

Figure 25:
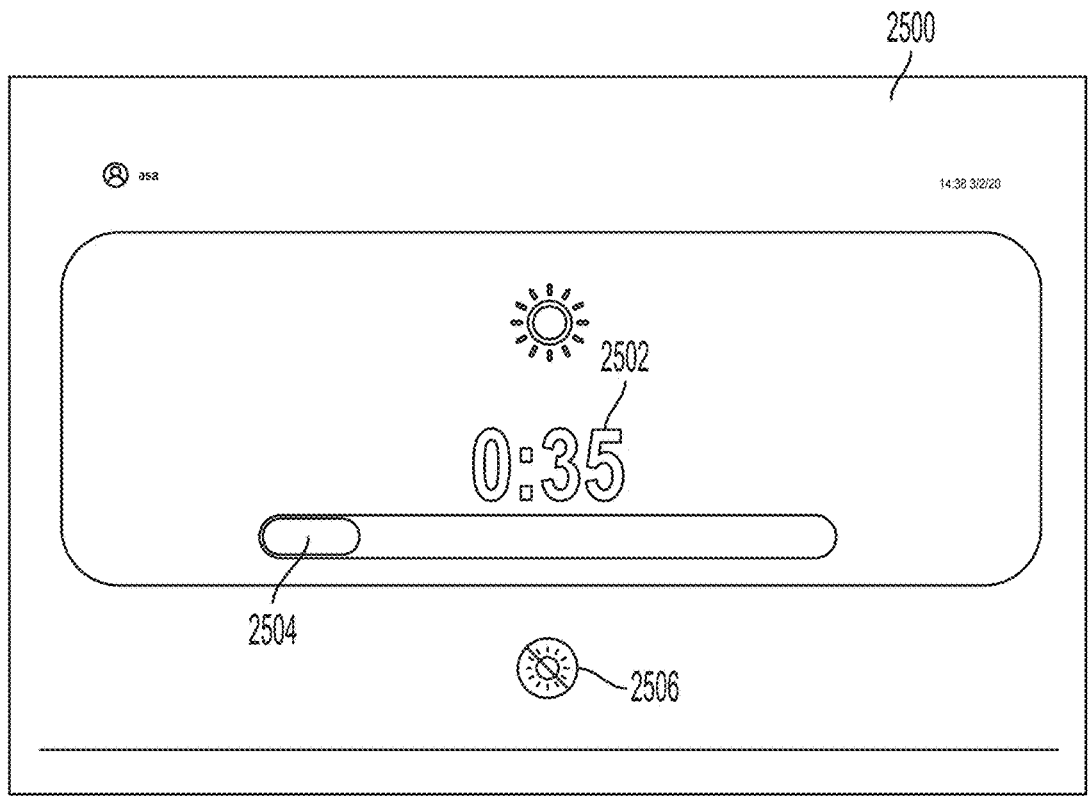
FIG. 25 illustrates an exemplary processing visualization graphical user interface according to examples of the disclosure.

In one or more examples, once button 2304 has been selected by a user, the treatment device can begin treating (e.g., illuminating) the biological fluid material. FIG. 25 illustrates an exemplary processing visualization graphical user interface according to examples of the disclosure. In the example of FIG. 25, graphical user interface 2500 can be configured to provide the user of the device information regarding the status of the treatment process (e.g., illumination, ultraviolet light dosing) including how much time has elapsed in the process, and/or how much time is left to go before the process has completed. In one or more examples, the graphical user interface 2500 can include a timer 2502 that can inform the user as to how much time has elapsed since the processing of the biological treatment began. In one or more examples, timer 2502 can be implemented as a "count-up" timer, in which the time displayed on the timer can represent that amount of time that has elapsed since the treatment process started. Alternatively, and in one or more examples of the disclosure, the timer 2502 can be implemented as a "count-down" timer, wherein the timer counts down from a pre-determined starting point to indicate to the user how much time is left in the treatment process.

In one or more examples, graphical user interface 2500 can includes a visual indicator bar 2504 that can inform the user as to what percentage or portion of the treatment process has been completed. In one or more examples, the amount of time or percentage of the process completed can be displayed in a first color, while the amount of time or percentage of the process still left to be completed can be displayed in a second color. As the treatment process progresses, the portion of the visual indicator 2504 in the first color can increase, while the portion of the of visual indicator in the second color can decrease, thereby showing the user what percentage of the process has been completed and what percentage of the process still remains.

In one or more examples, the graphical user interface 2500 can also include a user selectable termination button, that when selected by a user can terminate the treatment process. In one or more examples, when the user selects button 2506, the electronic treatment device can instantly terminate the processing of the biological fluid no matter what stage of the processing procedure the device is engaged in.

The example of FIG. 25 and graphical interface 2500 can be configured to provide the use with information about the status of the treatment process in each of the treatment chambers of the device (e.g., first treatment chamber, second treatment chamber). In one or more examples, a first timer and/or first visual indicator bar can inform the user about the status of a treatment process in the first treatment chamber of the device, and a second timer and/or second visual indicator bar can inform the user about the status of a treatment process in the second treatment chamber of the device.

Figure 26:
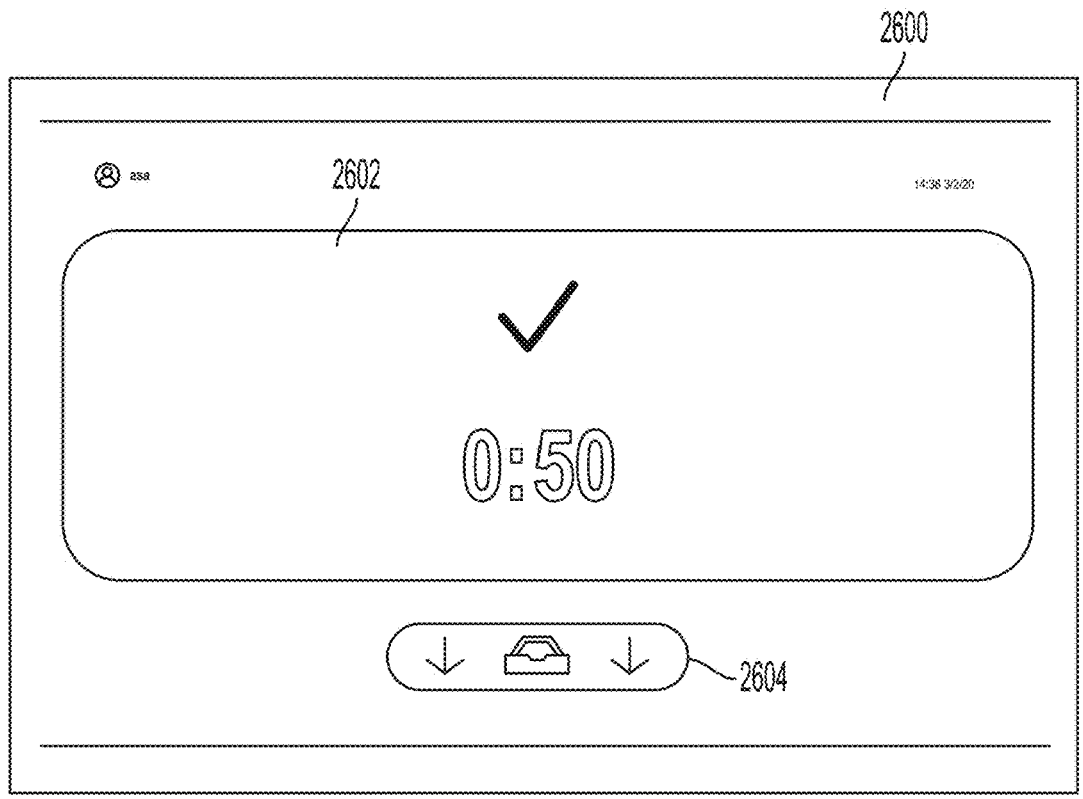
FIG. 26 illustrates an exemplary post-processing visualization according to examples of the disclosure.

The example of FIG. 25 and graphical user interface 2500 can be configured to provide the user with information during the treatment process. In one or more examples, when the treatment process has concluded, the system can also notify the user using a graphical user interface that the process is complete and provide additional information to the user. In one or more examples, the system can be notify the user by either modifying the graphical user interface such as the one shown in FIG. 25, or providing a new and separate graphical user interface to indicate that the process has been completed. FIG. 26 illustrates an exemplary post-processing visualization according to examples of the disclosure. The example of FIG. 26, in one or more examples, can be implemented as a separate GUI, or can be implemented on the same GUI used to indicate the status of the treatment process such as the example described above with respect to FIG. 25. In the example of FIG. 26, graphical user interface 2600 can include a visual indicator 2602 that can provide a visual indication to the user that the treatment process has concluded. As illustrated in FIG. 26, graphical user interface 2600 can include a visual mark, such as a check mark, to indicate that the process is completed. In one or more examples of the disclosure, the color of the visual indicator 2602 can be different from the color of the visual indicator 2502 of FIG. 25 so that that user can quickly and efficiently identify that the process has completed.

In one or more examples, visual indicator 2602 can include a time indicator that can indicate how much time elapsed since the processing (e.g., illumination) was completed. As discussed above with respect to FIG. 4, in some embodiments the treated biological fluid should be removed within a pre-determined time from the device, for example to initiate one or more additional processing steps separate from the system or to place the treated biological fluid into an appropriate storage environment within a pre-determined amount of time. The time indicator of visual indicator 2602 can help the user to visually keep track of how much time has elapsed since processing (e.g., illumination) while the treated biological fluid still remains in the device. In one or more examples, visual indicator 2602 can change its color to indicate when the pre-determined time discussed above has elapsed thus indicating that the biological fluid may no longer meet a specification (e.g., may not be suitable for use).

Figure 27:
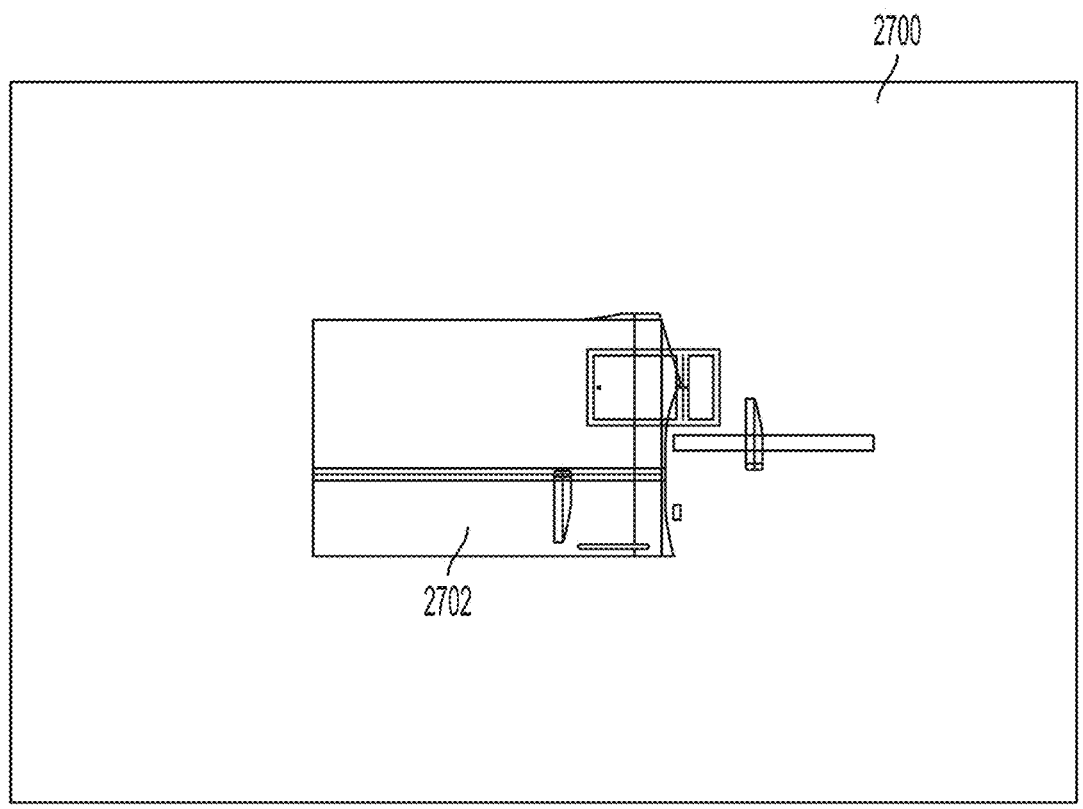
FIG. 27 illustrates an exemplary platform-unloading graphical user interface according to examples of the disclosure.

In one or more examples, graphical user interface 2600 can also include a user selectable button 2604 that a user can select to cause the chamber of the electronic device, in which the treatment was being applied, to open so that the user can access the treated biological fluid. In one or more examples, upon selecting button 2604, the device can generate another graphical user interface to guide the user in unloading a treatment chamber (e.g., treatment platform). FIG. 27 illustrates an exemplary platform-unloading graphical user interface according to examples of the disclosure. In one or more examples, the graphical user interface 2700 of FIG. 27 can include an animation 2702 that can visually depict the process of unloading the treatment container (e.g., treatment bag) from the treatment chamber. In one or more examples, the animation can direct the user to access a first chamber and then a second chamber in the event that both chambers are being used to conduct treatments. In one or more examples, the animation can begin by guiding the user to open and remove the bag from the top drawer first, and then proceed to remove the treatment bag from the second drawer so as to ensure that only one drawer is open at a time. In one or more examples, the drawers can be shown to be opened in the order in which the chambers finish treatment. Thus, in one example, if the treatment in the lower chamber finishes first, then the animation can be configured to guide the user to access the lower chamber first, before directing the user to open the upper chamber.

Figure 28:
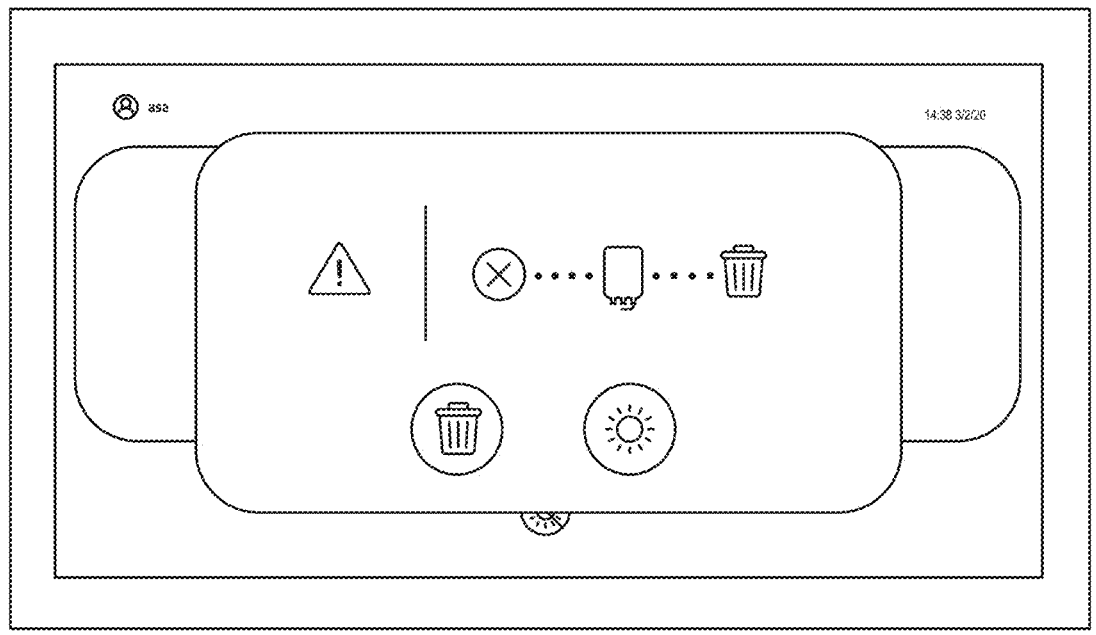
FIG. 28 illustrates an exemplary error graphical user interface according to examples of the disclosure.

Returning to the examples of FIGS. 25 and 26, and in one or more examples, if the treatment process rather than completing properly encounters an error (e.g., insufficient light dosing) or the treated biological fluid is not removed within a specified time period post-processing, then in one or more examples, the system can present the user with an additional graphical user interface to indicate to the user that the biological fluid was not treated properly or that the biological fluid is compromised in some way and thus may not meet specifications (e.g., should be discarded). FIG. 28 illustrates an exemplary error graphical user interface according to examples of the disclosure. In one or more examples, the graphical user interface 2800 of FIG. 28 can be configured to provide the user with an indication that there was a treatment/processing or other process error and that the biological fluid being treated may not meet a specification (e.g., is no longer suitable for use) and thus should be discarded. In one or more examples, the term discarded can include not using the biological fluid post-treatment.

Referring back to the example of FIG. 20, if a user selects button 2004, then in one or more examples the electronic device can present with an additional graphical user interface that displays to the user an event history of the device.

Figure 29:
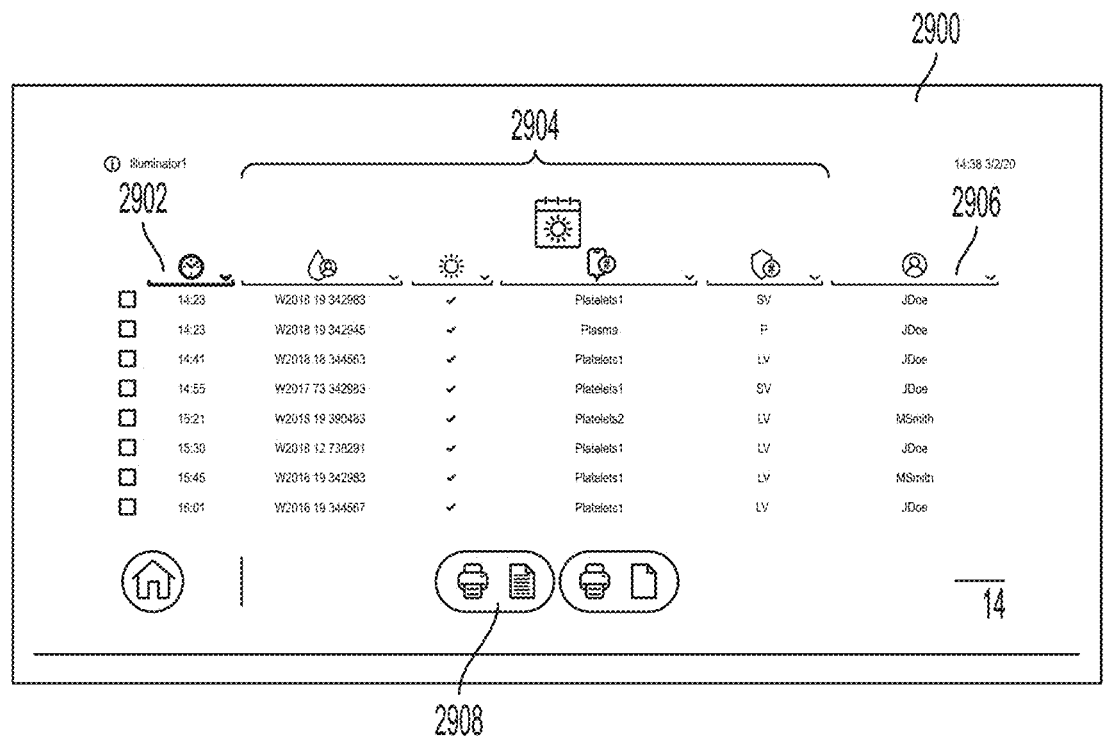
FIG. 29 illustrates an exemplary event history graphical user interface according to examples of the disclosure.

FIG. 29 illustrates an exemplary event history graphical user interface according to examples of the disclosure. In the example of FIG. 29, the graphical user interface 2900 can include a display of the event history of the device over a pre-determined time period. As an example, graphical user interface 2900 can display the event history for the present calendar day in which the user is accessing the history. In one or more examples, the graphical user interface 2900 can include multiple entries (one for each recorded event). Each event can include multiple fields of data. For instance, in one or more examples, each entry can include a time field 2902 that indicates the time of day at which the event occurred. In one or more examples, each entry can also include identifying information fields 2904 which can provide the information about the biological fluid treated that was obtained when the one of more barcodes of the biological fluid was scanned during the treatment process. In one or more examples, the identifying information fields can be substantially similar to the fields described above at element 2306 of FIGS. 23A-C.

In one or more examples, each event can also include a user ID field 2906 that can identify the user that generated the event. In one or more examples, and as described above with respect to FIG. 22, a user can authenticate their identify to the device. Graphical user interface 2900 can use the user ID obtained during the authentication process to populated user ID field 2906, thereby informing the user accessing the event history as to which user was using the machine when a particular event was recorded by the electronic device.

Figure 30:
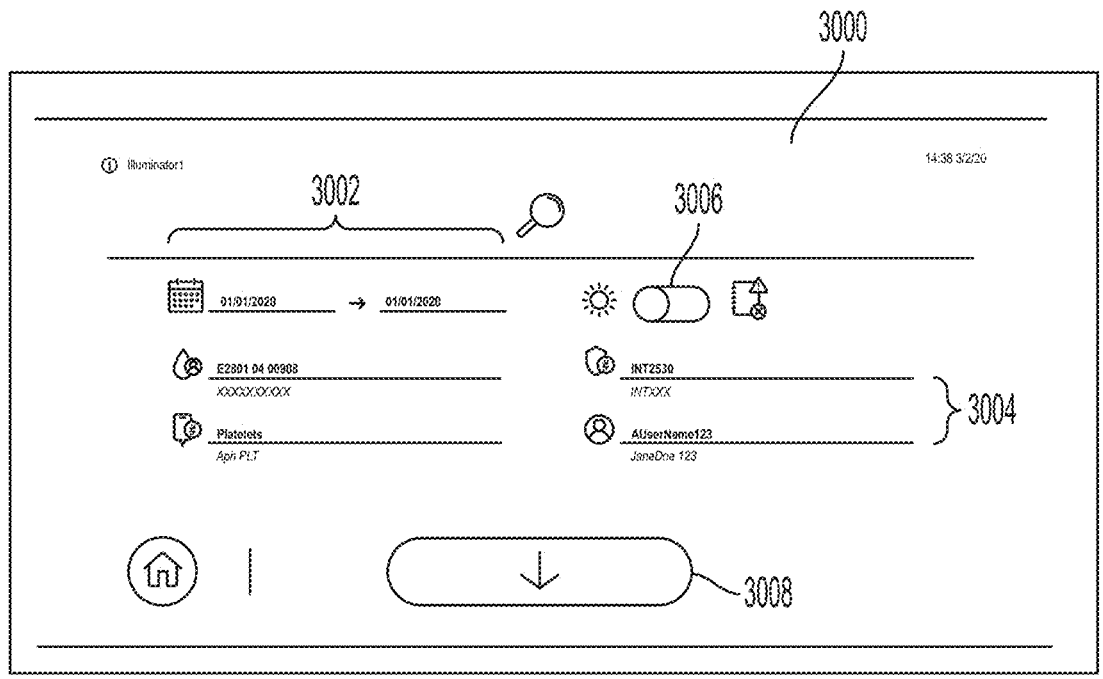
FIG. 30 illustrates an exemplary event history search graphical user interface according to examples of the disclosure.

Referring back to the example of FIG. 20, if a user selects button 2006, then in one or more examples the electronic device can present the user with an additional graphical user interface that allows the user to search data (e.g., the event histories) stored in a memory of the device. FIG. 30 illustrates an exemplary event history search graphical user interface according to examples of the disclosure. In one or more examples, the graphical user interface 3000 of FIG. 30 can include a time period field 3002, in which the user can enter or select a specific time period (i.e., start date and end date) over which they want to search the event history of the device. In one or more example, the user can also choose to search the event history of the device using one or more identifying field parameters 3004 that can be part of the graphical user interface 3000. In one or more examples, the identifying field parameters can be substantially the same as the parameters that are obtained during a scanning process of the treatment process described above with respect to FIGS. 23A-C. In one or more examples, the user can search the event history of identifying field parameters 3004 to locate events in which a biological fluid was treated with the same parameter or parameters as indicated by the user in field 3004. In one or more examples, the user can also chose to search the event history of the device using a user ID that can identify events associated with the selected user.

In one or more examples, the graphical user interface 3000 can include an interactive button 3006 that the user can interact with so as to indicate whether the user wants to search the event history of the device (i.e., successful treatment events that occurred on the device) or if the user wants to search the error history of the device (i.e., treatment events that did not complete successfully due to an error). Finally, the graphical user interface 3000 can include a user selectable button 3008 that can allow the user to initiate the search once they are satisfied that the parameters they wish to search over have been entered into graphical user interface 3000.

Figure 31:
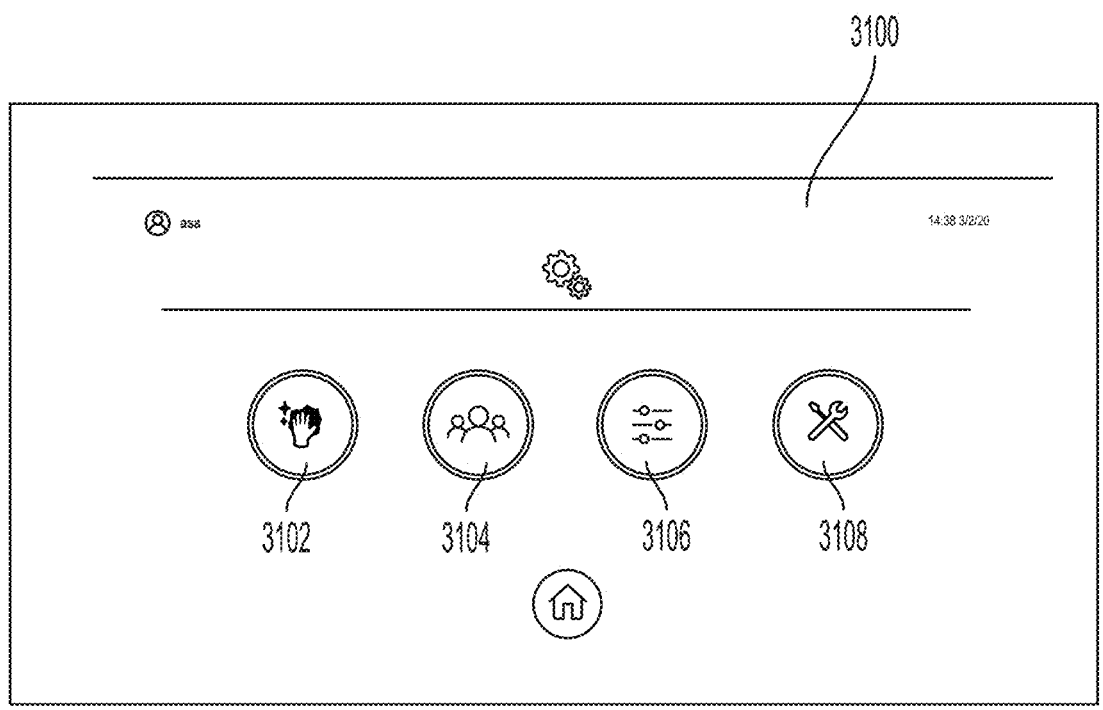
FIG. 31 illustrates an exemplary device configuration graphical user interface according to examples of the disclosure.

Referring back to the example of FIG. 20, if a user selects button 2008, then in one or more examples the electronic device can present the user with an additional graphical user interface that allows the user to configure one or more aspects of the device. FIG. 31 illustrates an exemplary device configuration graphical user interface according to examples of the disclosure. In one or more examples, graphical user interface 3100 includes one or more user selectable buttons that can allow for the user to configure various aspects of the device. As an example, graphical user interface can include a user selectable button 3102 that allows for the user to access the device so as to clean the device. In one or more examples, upon selecting button 3102, the drawers of the devices can open so as to allow the user to access parts of the device for cleaning.

In one or more examples, the graphical user interface 3100 can include a user selectable button 3104 that can allow the user (if they are authorized to do so) to add or edit a list of authorized users of the device. In one or more examples, the graphical user interface 3100 can also include a user selectable button 3106 that when selected by the user can allow the user to access one or more settings of the device. In one or more examples, graphical user interface 3100 can include a user selectable button 3108 that when selected by a user who is duly authorized, can allow the user to have service personnel access (e.g., in which they can configure and/or service the machine). In one or more examples, the device is configured to permit a user who is duly authorized (e.g., to have service personnel access) to access the device either remotely or by accessing a graphical user interface at the device itself.

Figure 32:
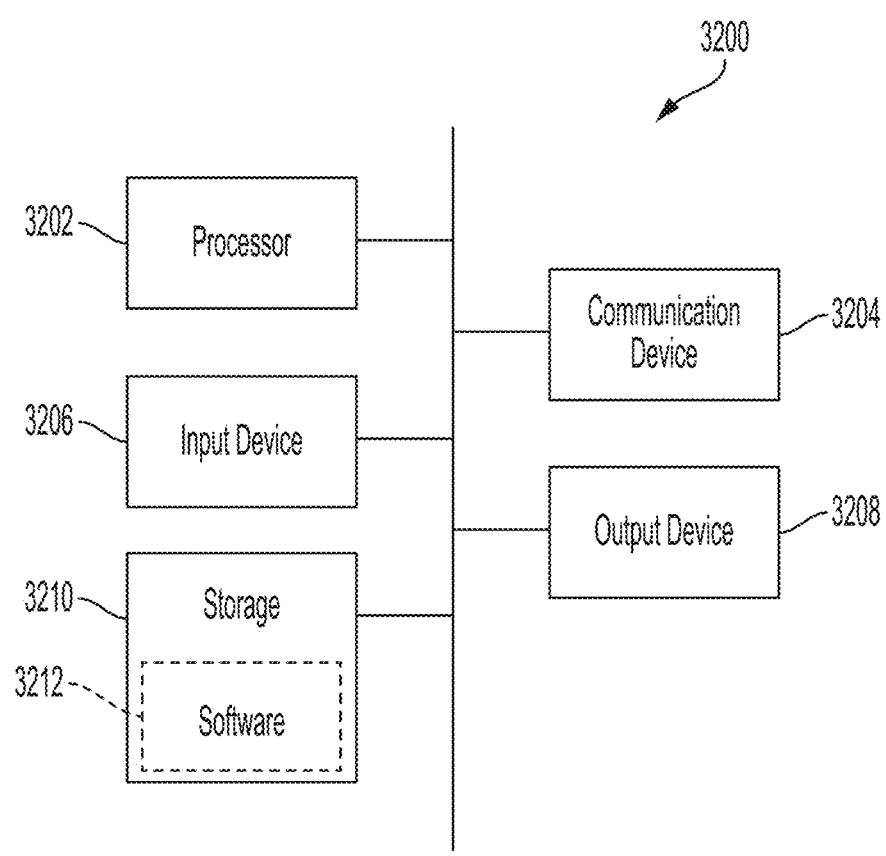
FIG. 32 illustrates an example of a computing device in accordance with one embodiment of the disclosure.

FIG. 32 illustrates an example of a computing device in accordance with one embodiment. Device 3200 can be a host computer connected to a network. Device 3200 can be a client computer or a server. As shown in FIG. 32, device 3200 can be any suitable type of microprocessor-based device, such as any of systems 100-300, a personal computer, work station, server, or handheld computing device (portable electronic device) such as a phone or tablet. The device can include, for example, one or more of processors 3202 input device 3206, output device 3208, storage 3210, and communication device 3204. Input device 3206 and output device 3208 can generally correspond to those described above and can either be connectable or integrated with the computer.

Input device 3206 can be any suitable device that provides input, such as a touchscreen, keyboard or keypad, mouse, or voice-recognition device. Output device 3208 can be any suitable device that provides output, such as a touchscreen, haptics device, or speaker.

Storage 3210 can be any suitable device that provides storage, such as an electrical, magnetic, or optical memory including a RAM, cache, hard drive, or removable storage disk. Communication device 3204 can include any suitable device capable of transmitting and receiving signals over a network, such as a network interface chip or device. The components of the computer can be connected in any suitable manner, such as via a physical bus, or wirelessly.

Software 3212, which can be stored in storage 3210 and executed by processor 3202, can include, for example, the programming that embodies the functionality of the present disclosure (e.g., as embodied in the devices described above).

Software 3212 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 3210, that can contain or store programming for use by or in connection with an instruction-execution system, apparatus, or device.

Software 3212 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 3200 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 3200 can implement any operating system suitable for operating on the network. Software 3212 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

In one aspect, a method comprises, at an electronic device configured to treat one or more biological fluids, wherein the electronic device includes a display and an interface configured to accept one or more inputs from a user of the electronic device, displaying a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device, when either the first button, or second button of the first graphical user interface is selected by the user, displaying a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid, and when the first button of the second graphical user interface is selected by the user, displaying a third graphical user interface, wherein the third graphical user interface includes a first visual panel that is configured to visually represent a status of the treatment process of the biological fluid.

In some aspects of the above method, the first graphical user interface includes a third button, wherein the third button corresponds to the platform loading process applied to both the first treatment chamber and second treatment chamber for operating the electronic device.

In some aspects of the above methods, the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids, and when the first button of the second graphical user interface is selected by the user, displaying a third graphical user interface, wherein the third graphical user interface includes a first visual panel that is configured to visually represent a status of the treatment process of the biological fluid.

In some aspects of the above methods, the first button of the second graphical user interface can only be selected by the user when a container with a biological fluid to be treated is detected in the first or second treatment chamber, and the electronic device detects that the first and second treatment chambers are in a closed position.

In some aspects of the above methods, the first visual panel of the third graphical user interface includes a first time indicator, and wherein the first time indicator visually depicts an elapsed time since the processing step has started.

In some aspects of the above methods, the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

In some aspects of the above methods, the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

In some aspects of the above methods, the method further comprising directing the user to discard the one or more biological fluids.

In some aspects of the above methods, the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

In some aspects of the above methods, the sixth graphical interface includes a fourth button that when selected allows the user to view an event history of the electronic device.

In some aspects of the above methods, if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

In some aspects of the above methods, the electronic device is configured to treat the one or more biological fluids by illumination with an ultraviolet light, and wherein when the user selects the first button of the second graphical user interface, the electronic device initiates the illumination of the one or more biological fluids.

In some aspects of the above methods, the electronic device is configured to treat the one or more biological fluids by pathogen inactivation with an ultraviolet light and a pathogen inactivation compound in admixture with the one or more biological fluids.

In some aspects of the above methods, a treatment profile for the treatment of the one or more biological fluids is determined, at least in part, by the identifying information of the one or more identifying information fields of the second graphical user interface.

In another aspect, a computing system with an electronic device configured to treat one or more biological fluids, comprises, a display, a user interface configured to receive inputs from a user of the system, a memory, and one or more processors, wherein one or more programs are stored in the memory and configured to be executed by the one or more processors, the one or more programs when executed by the one or more processors cause the processor to, display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device, when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid, and when the first button of the second graphical user interface is selected by the user, display a third graphical user interface, wherein the third graphical user interface includes a first visual panel that is configured to visually represent a status of the treatment process of the biological fluid.

In some aspects of the above system, the first graphical user interface includes a third button, wherein the third button corresponds to the platform loading process applied to both the first treatment chamber and second treatment chamber for operating the electronic device.

In some aspects of the above systems, the method further comprises, when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids, and when the first button of the second graphical user interface is selected by the user, displaying a third graphical user interface, wherein the third graphical user interface includes a first visual panel that is configured to visually represent a status of the treatment process of the biological fluid.

In some aspects of the above systems, the first button of the second graphical user interface can only be selected by the user when a container with a biological fluid to be treated is detected in the first or second treatment chamber, and the electronic device detects that the first and second treatment chambers are in a closed position.

In some aspects of the above systems, the first visual panel of the third graphical user interface includes a first time indicator, and wherein the first time indicator visually depicts an elapsed time since the processing step has started.

In some aspects of the above systems, the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

In some aspects of the above systems, the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

In some aspects of the above systems, the system further comprises directing the user to discard the one or more biological fluids.

In some aspects of the above systems, the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

In some aspects of the above systems, the sixth graphical interface includes a fourth button that when selected allows the user to view an event history of the electronic device.

In some aspects of the above systems, if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

In some aspects of the above systems, the electronic device is configured to treat the one or more biological fluids by illumination with an ultraviolet light, and wherein when the user selects the first button of the second graphical user interface, the electronic device initiates the illumination of the one or more biological fluids.

In some aspects of the above systems, the electronic device is configured to treat the one or more biological fluids by pathogen inactivation with an ultraviolet light and a pathogen inactivation compound in admixture with the one or more biological fluids.

In some aspects of the above systems, a treatment profile for the treatment of the one or more biological fluids is determined, at least in part, by the identifying information of the one or more identifying information fields of the second graphical user interface.

In another aspect, a computer readable storage medium stores one or more programs, the one or more programs comprising instructions, which when executed by an electronic device configured to treat one or more biological fluids with a display and a user input interface, cause the device to display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device, when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid, and when the first button of the second graphical user interface is selected by the user, display a third graphical user interface, wherein the third graphical user interface includes a first visual panel that is configured to visually represent a status of the treatment process of the biological fluid.

In some aspects of the above computer readable storage medium, the first graphical user interface includes a third button, wherein the third button corresponds to the platform loading process applied to both the first treatment chamber and second treatment chamber for operating the electronic device.

In some aspects of the above computer readable storage media, the device is further caused to, when the third button of the first graphical user interface is selected by the user, display a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids, and when the first button of the second graphical user interface is selected by the user, display a third graphical user interface, wherein the third graphical user interface includes a first visual panel that is configured to visually represent a status of the treatment process of the biological fluid.

In some aspects of the above computer readable storage media, the first button of the second graphical user interface can only be selected by the user when a container with a biological fluid to be treated is detected in the first or second treatment chamber, and the electronic device detects that the first and second treatment chambers are in a closed position.

In some aspects of the above computer readable storage media, the first visual panel of the third graphical user interface includes a first time indicator, and wherein the first time indicator visually depicts an elapsed time since the processing step has started.

In some aspects of the above computer readable storage media, the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

In some aspects of the above computer readable storage media, the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

In some aspects of the above computer readable storage media, the method further comprises directing the user to discard the one or more biological fluids.

In some aspects of the above computer readable storage media, the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

In some aspects of the above computer readable storage media, the sixth graphical interface includes a fourth button that when selected allows the user to view an event history of the electronic device.

In some aspects of the above computer readable storage media, if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

In some aspects of the above computer readable storage media, the electronic device is configured to treat the one or more biological fluids by illumination with an ultraviolet light, and wherein when the user selects the first button of the second graphical user interface, the electronic device initiates the illumination of the one or more biological fluids.

In some aspects of the above computer readable storage media, the electronic device is configured to treat the one or more biological fluids by pathogen inactivation with an ultraviolet light and a pathogen inactivation compound in admixture with the one or more biological fluids.

In some aspects of the above computer readable storage media, a treatment profile for the treatment of the one or more biological fluids is determined, at least in part, by the identifying information of the one or more identifying information fields of the second graphical user interface.

In another aspect, a method comprises, at an electronic device configured to treat one or more biological fluids, wherein the electronic device includes a display and an interface configured to accept one or more inputs from a user of the electronic device, displaying a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device, when the first button is active, displaying a second graphical user interface, wherein the second graphical user interface includes an image that visually depicts one or more steps that the user is to engage in so as to perform the first platform-loading process of the first chamber at the electronic device, when the second button is active, displaying a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids, and when the third button is active, displaying a fourth graphical user interface, wherein the fourth graphical user interface includes an image that visually depicts one or more steps that the user is to engage in so as to perform the second platform-loading process of the first treatment chamber at the electronic device, and when the fourth button is active, displaying a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

In some aspects of the above method, the electronic device is configured to treat the one or more biological fluids by illumination with an ultraviolet light, and wherein when the user selects the first button of the fifth graphical user interface, the electronic device initiates the illumination of the one or more biological fluids by the first chamber of the device.

In some aspects of the above methods, the electronic device is configured to treat the one or more biological fluids by pathogen inactivation with an ultraviolet light and a pathogen inactivation compound in admixture with the one or more biological fluids.

In some aspects of the above methods, a treatment profile for the treatment of the one or more biological fluids is determined, at least in part, by the identifying information of the one or more identifying information fields of the third graphical user interface.

In some aspects of the above methods, when the first button of the fifth graphical user interface is active, the method further comprises displaying a sixth graphical user interface, wherein the sixth graphical user interface includes a first indicator bar, and wherein the first indicator bar is configured to provide the user with a visual depiction of a status of a processing step associated with electronic device.

In some aspects of the above methods, a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

In some aspects of the above methods, the fifth graphical user interface includes a second button that when active is configured to provide a plurality of graphical user interfaces that are configured to guide the user on preparing a biological fluid for processing using the second treatment chamber of the device.

In some aspects of the above methods, the method further includes displaying a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

In some aspects of the above methods, when the user selects the first button of the ninth graphical user interface, the method further comprises displaying a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

In some aspects of the above methods, the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

In some aspects of the above methods, the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

In some aspects of the above methods, the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

In some aspects of the above methods, the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

In another aspect, a computing system with an electronic device configured to treat one or more biological fluids, comprises, a display, a user interface configured to receive inputs from a user of the system, a memory, and one or more processors, wherein one or more programs are stored in the memory and configured to be executed by the one or more processors, the one or more programs when executed by the one or more processors cause the processor to, display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device, when the first button is active, display a second graphical user interface, wherein the second graphical user interface includes an image that visually depicts one or more steps that the user is to engage in so as to perform the first platform-loading process of the first chamber at the electronic device, when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids, and when the third button is active, display a fourth graphical user interface, wherein the fourth graphical user interface includes an image that visually depicts one or more steps that the user is to engage in so as to perform the second platform-loading process of the first treatment chamber at the electronic device, and when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

In some aspects of the above system, the electronic device is configured to treat the one or more biological fluids by illumination with an ultraviolet light, and wherein when the user selects the first button of the fifth graphical user interface, the electronic device initiates the illumination of the one or more biological fluids by the first chamber of the device.

In some aspects of the above systems, the electronic device is configured to treat the one or more biological fluids by pathogen inactivation with an ultraviolet light and a pathogen inactivation compound in admixture with the one or more biological fluids.

In some aspects of the above systems, a treatment profile for the treatment of the one or more biological fluids is determined, at least in part, by the identifying information of the one or more identifying information fields of the third graphical user interface.

In some aspects of the above systems, when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

In some aspects of the above systems, a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

In some aspects of the above systems, the fifth graphical user interface includes a second button that when selected by the user is configured to provide a plurality of graphical user interfaces that are configured to guide the user on preparing a biological fluid for processing using the second treatment chamber of the device.

In some aspects of the above systems, the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

In some aspects of the above systems, when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

In some aspects of the above systems, the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

In some aspects of the above systems, the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

In some aspects of the above systems, the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

In some aspects of the above systems, the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

In another aspect, a computer readable storage medium storing one or more programs, the one or more programs comprising instructions, which when executed by an electronic device configured to treat one or more biological fluids with a display and a user input interface, cause the device to: display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device; when the first button is active, display a second graphical user interface, wherein the second graphical user interface includes an image that visually depicts one or more steps that the user is to engage in so as to perform the first platform-loading process of the first chamber at the electronic device; when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids; when the third button is active, display a fourth graphical user interface, wherein the fourth graphical user interface includes an image that visually depicts one or more steps that the user is to engage in so as to perform the second platform-loading process of the first treatment chamber at the electronic device; and when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

In some aspects of the above computer readable storage medium, the electronic device is configured to treat the one or more biological fluids by illumination with an ultraviolet light, and wherein when the user selects the first button of the fifth graphical user interface, the electronic device initiates the illumination of the one or more biological fluids by the first chamber of the device.

In some aspects of the above computer readable storage media, the electronic device is configured to treat the one or more biological fluids by pathogen inactivation with an ultraviolet light and a pathogen inactivation compound in admixture with the one or more biological fluids.

In some aspects of the above computer readable storage media, a treatment profile for the treatment of the one or more biological fluids is determined, at least in part, by the identifying information of the one or more identifying information fields of the third graphical user interface.

In some aspects of the above computer readable storage media, when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

In some aspects of the above computer readable storage media, a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

In some aspects of the above computer readable storage media, the fifth graphical user interface includes a second button that when selected by the user is configured to provide a plurality of graphical user interfaces that are configured to guide the user on preparing a biological fluid for processing using the second treatment chamber of the device.

In some aspects of the above computer readable storage media, the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

In some aspects of the above computer readable storage media, when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

In some aspects of the above computer readable storage media, the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

In some aspects of the above computer readable storage media, the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

In some aspects of the above computer readable storage media, the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

In some aspects of the above computer readable storage media, the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

In another aspect, a method comprises: at an electronic device configured to treat one or more biological fluids, wherein the electronic device includes a display and an interface configured to accept one or more inputs from a user of the electronic device: displaying one or more graphical user interfaces directed to a platform-loading process, wherein the one or more graphical user interfaces are configured to acquire input data corresponding to applying the platform-loading process to a first treatment chamber, applying the platform-loading process to a second treatment chamber, or applying the platform-loading process to both the first treatment chamber and the second treatment chamber; displaying one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids; and displaying one or more graphical user interfaces directed to a treatment process, wherein the one or more graphical user interfaces are configured to visually represent a status of the treatment process of the biological fluid.

In some aspects of the above method, the electronic device is configured to treat the one or more biological fluids by illumination with an ultraviolet light.

In some aspects of the above methods, the electronic device is configured to treat the one or more biological fluids by pathogen inactivation with an ultraviolet light and a pathogen inactivation compound in admixture with the one or more biological fluids.

In some aspects of the above methods, a treatment profile for the treatment of the one or more biological fluids is determined, at least in part, by the identifying information of the one or more identifying information fields.

In some aspects of the above methods, the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

In some aspects of the above methods, the method further comprises: at the electronic device configured to treat one or more biological fluids, wherein the electronic device includes a display and an interface configured to accept one or more inputs from a user of the electronic device: displaying a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device; when either the first button, or second button of the first graphical user interface is selected by the user, displaying a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and when the first button of the second graphical user interface is selected by the user, displaying a third graphical user interface, wherein the third graphical user interface includes a first visual panel that is configured to visually represent a status of the treatment process of the biological fluid.

In some aspects of the above methods, the first graphical user interface includes a third button, wherein the third button corresponds to the platform loading process applied to both the first treatment chamber and second treatment chamber for operating the electronic device.

In some aspects of the above methods, the method further comprises: when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and when the first button of the second graphical user interface is selected by the user, displaying a third graphical user interface, wherein the third graphical user interface includes a first visual panel that is configured to visually represent a status of the treatment process of the biological fluid.

In some aspects of the above methods, the first button of the second graphical user interface can only be selected by the user when a container with a biological fluid to be treated is detected in the first or second treatment chamber, and the electronic device detects that the first and second treatment chambers are in a closed position.

In some aspects of the above methods, the first visual panel of the third graphical user interface includes a first time indicator, and wherein the first time indicator visually depicts an elapsed time since the processing step has started.

In some aspects of the above methods, the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

In some aspects of the above methods, the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

In some aspects of the above methods, the method further comprises directing the user to discard the one or more biological fluids.

In some aspects of the above methods, the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

In some aspects of the above methods, the sixth graphical interface includes a fourth button that when selected allows the user to view an event history of the electronic device.

In some aspects of the above methods, if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

In some aspects of the above methods, the method further comprises: at the electronic device configured to treat one or more biological fluids, wherein the electronic device includes a display and an interface configured to accept one or more inputs from a user of the electronic device: displaying a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device; when the first button is active, displaying a second graphical user interface, wherein the second graphical user interface includes an image that visually depicts one or more steps that the user is to engage in so as to perform the first platform-loading process of the first chamber at the electronic device; when the second button is active, displaying a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids; and when the third button is active, displaying a fourth graphical user interface, wherein the fourth graphical user interface includes an image that visually depicts one or more steps that the user is to engage in so as to perform the second platform-loading process of the first treatment chamber at the electronic device; and when the fourth button is active, displaying a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

In some aspects of the above methods, when the first button of the fifth graphical user interface is active, the method further comprises displaying a sixth graphical user interface, wherein the sixth graphical user interface includes a first indicator bar, and wherein the first indicator bar in configured to provide the user with a visual depiction of a status of a processing step associated with electronic device.

In some aspects of the above methods, a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

In some aspects of the above methods, the fifth graphical user interface includes a second button that when selected by the user is configured to provide a plurality of graphical user interfaces that are configured to guide the user on preparing a biological fluid for processing using the second treatment chamber of the device.

In some aspects of the above methods, the method further includes displaying a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

In some aspects of the above methods, when the user selects the first button of the ninth graphical user interface, the method further comprises displaying a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

In some aspects of the above methods, the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

In some aspects of the above methods, the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

In some aspects of the above methods, the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

In some aspects of the above methods, the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

In another aspect, a computing system with an electronic device configured to treat one or more biological fluids, comprising: a display; a user interface configured to receive inputs from a user of the system; a memory; and one or more processors, wherein one or more programs are stored in the memory and configured to be executed by the one or more processors, the one or more programs when executed by the one or more processors cause the processor to: display one or more graphical user interfaces directed to a platform-loading process, wherein the one or more graphical user interfaces are configured to acquire input data corresponding to applying the platform-loading process to a first treatment chamber, applying the platform-loading process to a second treatment chamber, or applying the platform-loading process to both the first treatment chamber and the second treatment chamber; display one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids; and display one or more graphical user interfaces directed to a treatment process, wherein the one or more graphical user interfaces are configured to visually represent a status of the treatment process of the biological fluid.

In some aspects of the above system, the electronic device is configured to treat the one or more biological fluids by illumination with an ultraviolet light.

In some aspects of the above systems, the electronic device is configured to treat the one or more biological fluids by pathogen inactivation with an ultraviolet light and a pathogen inactivation compound in admixture with the one or more biological fluids.

In some aspects of the above system, a treatment profile for the treatment of the one or more biological fluids is determined, at least in part, by the identifying information of the one or more identifying information fields.

In some aspects of the above systems, the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

In some aspects of the above systems, the one or more processors are further caused to: display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device; when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and when the first button of the second graphical user interface is selected by the user, display a third graphical user interface, wherein the third graphical user interface includes a first visual panel that is configured to visually represent a status of the treatment process of the biological fluid.

In some aspects of the above systems, the first graphical user interface includes a third button, wherein the third button corresponds to the platform loading process applied to both the first treatment chamber and second treatment chamber for operating the electronic device.

In some aspects of the above systems, the method further comprises: when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and when the first button of the second graphical user interface is selected by the user, displaying a third graphical user interface, wherein the third graphical user interface includes a first visual panel that is configured to visually represent a status of the treatment process of the biological fluid.

In some aspects of the above systems, the first button of the second graphical user interface can only be selected by the user when a container with a biological fluid to be treated is detected in the first or second treatment chamber, and the electronic device detects that the first and second treatment chambers are in a closed position.

In some aspects of the above systems, the first visual panel of the third graphical user interface includes a first time indicator, and wherein the first time indicator visually depicts an elapsed time since the processing step has started.

In some aspects of the above systems, the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

In some aspects of the above systems, the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

In some aspects of the above systems, the system of claim further comprises directing the user to discard the one or more biological fluids.

In some aspects of the above systems, the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

In some aspects of the above systems, the sixth graphical interface includes a fourth button that when selected allows the user to view an event history of the electronic device.

In some aspects of the above systems, if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

In some aspects of the above systems, the one or more processors are further caused to: display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device; when the first button is active, display a second graphical user interface, wherein the second graphical user interface includes an image that visually depicts one or more steps that the user is to engage in so as to perform the first platform-loading process of the first chamber at the electronic device; when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids; when the third button is active, display a fourth graphical user interface, wherein the fourth graphical user interface includes an image that visually depicts one or more steps that the user is to engage in so as to perform the second platform-loading process of the first treatment chamber at the electronic device; and when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

In some aspects of the above systems, when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

In some aspects of the above systems, a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

In some aspects of the above systems, the fifth graphical user interface includes a second button that when selected by the user is configured to provide a plurality of graphical user interfaces that are configured to guide the user on preparing a biological fluid for processing using the second treatment chamber of the device.

In some aspects of the above systems, the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

In some aspects of the above systems, when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

In some aspects of the above systems, the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

In some aspects of the above systems, the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

In some aspects of the above systems, the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

In some aspects of the above systems, the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

In another aspect, a computer readable storage medium storing one or more programs, the one or more programs comprising instructions, which when executed by an electronic device configured to treat one or more biological fluids with a display and a user input interface, cause the device to: display one or more graphical user interfaces directed to a platform-loading process, wherein the one or more graphical user interfaces are configured to acquire input data corresponding to applying the platform-loading process to a first treatment chamber, applying the platform-loading process to a second treatment chamber, or applying the platform-loading process to both the first treatment chamber and the second treatment chamber; display one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids; and display one or more graphical user interfaces directed to a treatment process, wherein the one or more graphical user interfaces are configured to visually represent a status of the treatment process of the biological fluid.

In some aspects of the above computer readable storage medium, the electronic device is configured to treat the one or more biological fluids by illumination with an ultraviolet light.

In some aspects of the above computer readable storage media, the electronic device is configured to treat the one or more biological fluids by pathogen inactivation with an ultraviolet light and a pathogen inactivation compound in admixture with the one or more biological fluids.

In some aspects of the above computer readable storage media, a treatment profile for the treatment of the one or more biological fluids is determined, at least in part, by the identifying information of the one or more identifying information fields.

In some aspects of the above computer readable storage media, the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

In some aspects of the above computer readable storage media, the device is further caused to: display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device; when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and when the first button of the second graphical user interface is selected by the user, display a third graphical user interface, wherein the third graphical user interface includes a first visual panel that is configured to visually represent a status of the treatment process of the biological fluid.

In some aspects of the above computer readable storage media, the first graphical user interface includes a third button, wherein the third button corresponds to the platform loading process applied to both the first treatment chamber and second treatment chamber for operating the electronic device.

In some aspects of the above computer readable storage media, the device is further caused to: when the third button of the first graphical user interface is selected by the user, display a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and when the first button of the second graphical user interface is selected by the user, display a third graphical user interface, wherein the third graphical user interface includes a first visual panel that is configured to visually represent a status of the treatment process of the biological fluidIn some aspects of the above computer readable storage media, the first button of the second graphical user interface can only be selected by the user when a container with a biological fluid to be treated is detected in the first or second treatment chamber, and the electronic device detects that the first and second treatment chambers are in a closed position.

In some aspects of the above computer readable storage media, the first visual panel of the third graphical user interface includes a first time indicator, and wherein the first time indicator visually depicts an elapsed time since the processing step has started.

In some aspects of the above computer readable storage media, the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

In some aspects of the above computer readable storage media, the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

In some aspects of the above computer readable storage media, the computer readable storage media further comprises directing the user to discard the one or more biological fluids.

In some aspects of the above computer readable storage media, the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

In some aspects of the above computer readable storage media, the sixth graphical interface includes a fourth button that when selected allows the user to view an event history of the electronic device.

In some aspects of the above computer readable storage media, if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

In some aspects of the above computer readable storage media, the device is further caused to: display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device; when the first button is active, display a second graphical user interface, wherein the second graphical user interface includes an image that visually depicts one or more steps that the user is to engage in so as to perform the first platform-loading process of the first chamber at the electronic device; when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids; when the third button is active, display a fourth graphical user interface, wherein the fourth graphical user interface includes an image that visually depicts one or more steps that the user is to engage in so as to perform the second platform-loading process of the first treatment chamber at the electronic device; and when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

In some aspects of the above computer readable storage media, when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

In some aspects of the above computer readable storage media, a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

In some aspects of the above computer readable storage media, the fifth graphical user interface includes a second button that when selected by the user is configured to provide a plurality of graphical user interfaces that are configured to guide the user on preparing a biological fluid for processing using the second treatment chamber of the device.

In some aspects of the above computer readable storage media, the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

In some aspects of the above computer readable storage media, when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

In some aspects of the above computer readable storage media, the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

In some aspects of the above computer readable storage media, the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

In some aspects of the above computer readable storage media, the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

In some aspects of the above computer readable storage media, the first visual panel and the second visual panel are oriented next to one another about a horizontal axis, and wherein the orientation of the first visual panel with respect to the second visual panel is configured to be substantially identical to the orientation of the first treatment chamber with respect to the second treatment chamber of the electronic device.

Variations of the embodiments provided herein may become apparent to those working in the art upon reading the foregoing description. It is expected that skilled artisans will be able to employ such variations as appropriate, and the practice of the compositions, methods, and kits described herein otherwise than as specifically described herein. Accordingly, the systems and methods described herein include all modifications and equivalents of the subject matter recited in the claims appended hereto as permitted by applicable law. Moreover, any combination of the above-described elements in all possible variations thereof is encompassed by the description unless otherwise indicated herein or otherwise clearly contradicted by context. The following is a list of particular embodiments of the present disclosure. The list is exemplary is it not intended to be limiting of the disclosure provided herein.

Embodiment 1: A method, comprising:
    at an electronic device configured to treat one or more biological fluids, wherein the electronic device includes a display and an interface configured to accept one or more inputs from a user of the electronic device:
        displaying a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device;
        when either the first button, or second button of the first graphical user interface is selected by the user, displaying a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and when the first button of the second graphical user interface is selected by the user, displaying a third graphical user interface, wherein the third graphical user interface includes a first visual panel that is configured to visually represent a status of the treatment process of the biological fluid.

Embodiment 2: The method of embodiment 1, wherein the first graphical user interface includes a third button, wherein the third button corresponds to the platform loading process applied to both the first treatment chamber and second treatment chamber for operating the electronic device.

Embodiment 3: The method of embodiment 2, wherein the method further comprises:

when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and when the first button of the second graphical user interface is selected by the user, displaying a third graphical user interface, wherein the third graphical user interface includes a first visual panel that is configured to visually represent a status of the treatment process of the biological fluid.

Embodiment 4: The method of any one of embodiments 1-3, wherein the first button of the second graphical user interface can only be selected by the user when a container with a biological fluid to be treated is detected in the first or second treatment chamber, and the electronic device detects that the first and second treatment chambers are in a closed position.

Embodiment 5: The method of any one of embodiments 1-4, wherein the first visual panel of the third graphical user interface includes a first time indicator, and wherein the first time indicator visually depicts an elapsed time since the processing step has started.

Embodiment 6: The method of any one of embodiments 1-5, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

Embodiment 7: The method of embodiment 6, wherein the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

Embodiment 8: The method of embodiment 7 further comprising directing the user to discard the one or more biological fluids.

Embodiment 9: The method of any one of embodiments 1-8, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

Embodiment 10: The method of embodiment 9, wherein the sixth graphical interface includes a fourth button that when selected allows the user to view an event history of the electronic device.

Embodiment 11: The method of embodiment 9 or 10, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

Embodiment 12: The method of any one of embodiments 1-11, wherein the electronic device is configured to treat the one or more biological fluids by illumination with an ultraviolet light, and wherein when the user selects the first button of the second graphical user interface, the electronic device initiates the illumination of the one or more biological fluids.

Embodiment 13: The method of any one of embodiments 1-12, wherein the electronic device is configured to treat the one or more biological fluids by pathogen inactivation with an ultraviolet light and a pathogen inactivation compound in admixture with the one or more biological fluids.

Embodiment 14: The method of any one of embodiments 1-13, wherein a treatment profile for the treatment of the one or more biological fluids is determined, at least in part, by the identifying information of the one or more identifying information fields of the second graphical user interface.

Embodiment 15: A computing system with an electronic device configured to treat one or more biological fluids, comprising:
a display;
a user interface configured to receive inputs from a user of the system;
a memory; and
one or more processors,
wherein one or more programs are stored in the memory and configured to be executed by the one or more processors, the one or more programs when executed by the one or more processors cause the processor to:
- display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device;
- when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and
- when the first button of the second graphical user interface is selected by the user, display a third graphical user interface, wherein the third graphical user interface includes a first visual panel that is configured to visually represent a status of the treatment process of the biological fluid.

Embodiment 16: The system of embodiment 15, wherein the first graphical user interface includes a third button, wherein the third button corresponds to the platform loading process applied to both the first treatment chamber and second treatment chamber for operating the electronic device.

Embodiment 17: The system of embodiment 16, wherein the method further comprises:
- when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
- when the first button of the second graphical user interface is selected by the user, displaying a third graphical user interface, wherein the third graphical user interface includes a first visual panel that is configured to visually represent a status of the treatment process of the biological fluid.

Embodiment 18: The system of any one of embodiments 15-17, wherein the first button of the second graphical user interface can only be selected by the user when a container with a biological fluid to be treated is detected in the first or second treatment chamber, and the electronic device detects that the first and second treatment chambers are in a closed position.

Embodiment 19: The system of any one of embodiments 15-18, wherein the first visual panel of the third graphical user interface includes a first time indicator, and wherein the first time indicator visually depicts an elapsed time since the processing step has started.

Embodiment 20: The system of any one of embodiments 15-19, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

Embodiment 21: The system of embodiment 20, wherein the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

Embodiment 22: The system of embodiment 21 further comprising directing the user to discard the one or more biological fluids.

Embodiment 23: The system of any one of embodiments 15-22, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

Embodiment 24: The system of embodiment 23, wherein the sixth graphical interface includes a fourth button that when selected allows the user to view an event history of the electronic device.

Embodiment 25: The system of embodiments 23 or 24, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

Embodiment 26: The system of any one of embodiments 15-25, wherein the electronic device is configured to treat the one or more biological fluids by illumination with an ultraviolet light, and wherein when the user selects the first button of the second graphical user interface, the electronic device initiates the illumination of the one or more biological fluids.

Embodiment 27: The system of any one of embodiments 15-26, wherein the electronic device is configured to treat the one or more biological fluids by pathogen inactivation with an ultraviolet light and a pathogen inactivation compound in admixture with the one or more biological fluids.

Embodiment 28: The system of any one of embodiments 15-27, wherein a treatment profile for the treatment of the one or more biological fluids is determined, at least in part, by the identifying information of the one or more identifying information fields of the second graphical user interface.

Embodiment 29: A computer readable storage medium storing one or more programs, the one or more programs comprising instructions, which when executed by an electronic device configured to treat one or more biological fluids with a display and a user input interface, cause the device to:
display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device;
when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and
when the first button of the second graphical user interface is selected by the user, display a third graphical user interface, wherein the third graphical user interface includes a first visual panel that is configured to visually represent a status of the treatment process of the biological fluid.

Embodiment 30: The computer readable storage medium of embodiment 29, wherein the first graphical user interface includes a third button, wherein the third button corresponds to the platform loading process applied to both the first treatment chamber and second treatment chamber for operating the electronic device.

Embodiment 31: The computer readable storage medium of embodiment 30, wherein the device is further caused to:
when the third button of the first graphical user interface is selected by the user, display a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
when the first button of the second graphical user interface is selected by the user, display a third graphical user interface, wherein the third graphical user interface includes a first visual panel that is configured to visually represent a status of the treatment process of the biological fluid.

Embodiment 32: The computer readable storage medium of any one of embodiments 29-31, wherein the first button of the second graphical user interface can only be selected by the user when a container with a biological fluid to be treated is detected in the first or second treatment chamber, and the electronic device detects that the first and second treatment chambers are in a closed position.

Embodiment 33: The computer readable storage medium of any one of embodiments 29-32, wherein the first visual panel of the third graphical user interface includes a first time indicator, and wherein the first time indicator visually depicts an elapsed time since the processing step has started.

Embodiment 34: The computer readable storage medium of any one of embodiments 29-33, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

Embodiment 35: The computer readable storage medium of embodiment 34, wherein the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

Embodiment 36: The computer readable storage medium of embodiment 35 further comprising directing the user to discard the one or more biological fluids.

Embodiment 37: The computer readable storage medium of any one of embodiments 29-36, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

Embodiment 38: The computer readable storage medium of embodiment 37, wherein the sixth graphical interface includes a fourth button that when selected allows the user to view an event history of the electronic device.

Embodiment 39: The computer readable storage medium of embodiments 37 or 38, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

Embodiment 40: The computer readable storage medium of any one of embodiments 29-39, wherein the electronic device is configured to treat the one or more biological fluids by illumination with an ultraviolet light, and wherein when the user selects the first button of the second graphical user interface, the electronic device initiates the illumination of the one or more biological fluids.

Embodiment 41: The computer readable storage medium of any one of embodiments 29-40, wherein the electronic device is configured to treat the one or more biological fluids by pathogen inactivation with an ultraviolet light and a pathogen inactivation compound in admixture with the one or more biological fluids.

Embodiment 42: The computer readable storage medium of any one of embodiments 29-41, wherein a treatment profile for the treatment of the one or more biological fluids is determined, at least in part, by the identifying information of the one or more identifying information fields of the second graphical user interface.

Embodiment 43: A method, comprising:
at an electronic device configured to treat one or more biological fluids, wherein the electronic device includes a display and an interface configured to accept one or more inputs from a user of the electronic device:
displaying a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device;
when the first button is active, displaying a second graphical user interface, wherein the second graphical user interface includes an image that visually depicts one or more steps that the user is to engage in so as to perform the first platform-loading process of the first chamber at the electronic device;
when the second button is active, displaying a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids; and
when the third button is active, displaying a fourth graphical user interface, wherein the fourth graphical user interface includes an image that visually depicts one or more steps that the user is to engage in so as to perform the second platform-loading process of the first treatment chamber at the electronic device; and
when the fourth button is active, displaying a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

Embodiment 44: The method of embodiment 43, wherein the electronic device is configured to treat the one or more biological fluids by illumination with an ultraviolet light, and wherein when the user selects the first button of the fifth graphical user interface, the electronic device initiates the illumination of the one or more biological fluids by the first chamber of the device.

Embodiment 45: The method of embodiment 43 or 44, wherein the electronic device is configured to treat the one or more biological fluids by pathogen inactivation with an ultraviolet light and a pathogen inactivation compound in admixture with the one or more biological fluids.

Embodiment 46: The method of any one of embodiments 43-45, wherein a treatment profile for the treatment of the one or more biological fluids is determined, at least in part, by the identifying information of the one or more identifying information fields of the third graphical user interface.

Embodiment 47: The method of any one of embodiments 43-46, wherein when the first button of the fifth graphical user interface is active, the method further comprises displaying a sixth graphical user interface, wherein the sixth graphical user interface includes a first indicator bar, and wherein the first indicator bar is configured to provide the user with a visual depiction of a status of a processing step associated with electronic device.

Embodiment 48: The method of any one of embodiments 43-47, wherein a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

Embodiment 49: The method of any one of embodiments 43-48 wherein the fifth graphical user interface includes a second button that when active is configured to provide a plurality of graphical user interfaces that are configured to guide the user on preparing a biological fluid for processing using the second treatment chamber of the device.

Embodiment 50: The method of embodiment 49, wherein the method further includes displaying a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

Embodiment 51: The method of embodiment 50, wherein when the user selects the first button of the ninth graphical user interface, the method further comprises displaying a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

Embodiment 52: The method of embodiment 51, wherein the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

Embodiment 53: The method of embodiment 51, wherein the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

Embodiment 54: The method of any one of embodiments 43-53 wherein the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

Embodiment 55: The method of any one of embodiments 43-53 wherein the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

Embodiment 56: A computing system with an electronic device configured to treat one or more biological fluids, comprising:
a display;
a user interface configured to receive inputs from a user of the system;
a memory; and
one or more processors,
wherein one or more programs are stored in the memory and configured to be executed by the one or more processors, the one or more programs when executed by the one or more processors cause the processor to:
display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device;
when the first button is active, display a second graphical user interface, wherein the second graphical user interface includes an image that visually depicts one or more steps that the user is to engage in so as to perform the first platform-loading process of the first chamber at the electronic device;
when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids; and
when the third button is active, display a fourth graphical user interface, wherein the fourth graphical user interface includes an image that visually depicts one or more steps that the user is to engage in so as to perform the second platform-loading process of the first treatment chamber at the electronic device; and
when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

Embodiment 57: The system, of embodiment 56, wherein the electronic device is configured to treat the one or more biological fluids by illumination with an ultraviolet light, and wherein when the user selects the first button of the fifth graphical user interface, the electronic device initiates the illumination of the one or more biological fluids by the first chamber of the device.

Embodiment 58: The system of embodiment 56 or 57, wherein the electronic device is configured to treat the one or more biological fluids by pathogen inactivation with an ultraviolet light and a pathogen inactivation compound in admixture with the one or more biological fluids.

Embodiment 59: The system of any one of embodiments 56-58, wherein a treatment profile for the treatment of the one or more biological fluids is determined, at least in part, by the identifying information of the one or more identifying information fields of the third graphical user interface.

Embodiment 60: The system of any one of embodiments 56-59, wherein when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

Embodiment 61: The system of any one of embodiments 56-60, wherein a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

Embodiment 62: The system of any one of embodiments 56-61 wherein the fifth graphical user interface includes a second button that when selected by the user is configured to provide a plurality of graphical user interfaces that are configured to guide the user on preparing a biological fluid for processing using the second treatment chamber of the device.

Embodiment 63: The system of embodiment 62, wherein the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

Embodiment 64: The system of embodiment 63, wherein when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

Embodiment 65: The system of embodiment 64, wherein the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

Embodiment 66: The system of embodiment 64, wherein the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

Embodiment 67: The system of any one of embodiments 56-66 wherein the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

Embodiment 68: The system of any one of embodiments 56-66 wherein the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

Embodiment 69: A computer readable storage medium storing one or more programs, the one or more programs comprising instructions, which when executed by an electronic device configured to treat one or more biological fluids with a display and a user input interface, cause the device to:

display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device;

when the first button is active, display a second graphical user interface, wherein the second graphical user interface includes an image that visually depicts one or more steps that the user is to engage in so as to perform the first platform-loading process of the first chamber at the electronic device;

when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids;

when the third button is active, display a fourth graphical user interface, wherein the fourth graphical user interface includes an image that visually depicts one or more steps that the user is to engage in so as to perform the second platform-loading process of the first treatment chamber at the electronic device; and when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

Embodiment 70: The computer readable storage medium of embodiment 69, wherein the electronic device is configured to treat the one or more biological fluids by illumination with an ultraviolet light, and wherein when the user selects the first button of the fifth graphical user interface, the electronic device initiates the illumination of the one or more biological fluids by the first chamber of the device.

Embodiment 71: The computer readable storage medium of embodiment 69 or 70, wherein the electronic device is configured to treat the one or more biological fluids by pathogen inactivation with an ultraviolet light and a pathogen inactivation compound in admixture with the one or more biological fluids.

Embodiment 72: The computer readable storage medium of any one of embodiments 69-71, wherein a treatment profile for the treatment of the one or more biological fluids is determined, at least in part, by the identifying information of the one or more identifying information fields of the third graphical user interface.

Embodiment 73: The computer readable storage medium of any one of embodiments 69-72, wherein when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

Embodiment 74: The computer readable storage medium of any one of embodiments 69-73, wherein a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

Embodiment 75: The computer readable storage medium of any one of embodiments 69-73 wherein the fifth graphical user interface includes a second button that when selected by the user is configured to provide a plurality of graphical user interfaces that are configured to guide the user on preparing a biological fluid for processing using the second treatment chamber of the device.

Embodiment 76: The computer readable storage medium of embodiment 75, wherein the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

Embodiment 77: The computer readable storage medium of embodiment 76, wherein when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

Embodiment 78: The computer readable storage medium of embodiment 77, wherein the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

Embodiment 79: The computer readable storage medium of embodiment 77, wherein the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

Embodiment 80: The computer readable storage medium of any one of embodiments 69-79 wherein the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

Embodiment 81: The computer readable storage medium of any one of embodiments 69-79 wherein the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

Embodiment 82: A method, comprising:
  at an electronic device configured to treat one or more biological fluids, wherein the electronic device includes a display and an interface configured to accept one or more inputs from a user of the electronic device:
    displaying one or more graphical user interfaces directed to a platform-loading process, wherein the one or more graphical user interfaces are configured to acquire input data corresponding to applying the platform-loading process to a first treatment chamber, applying the platform-loading process to a second treatment chamber, or applying the platform-loading process to both the first treatment chamber and the second treatment chamber;
    displaying one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids; and
    displaying one or more graphical user interfaces directed to a treatment process, wherein the one or more graphical user interfaces are configured to visually represent a status of the treatment process of the biological fluid.

Embodiment 83: The method of embodiment 82, wherein the electronic device is configured to treat the one or more biological fluids by illumination with an ultraviolet light.

Embodiment 84: The method of any one of embodiments 82-83, wherein the electronic device is configured to treat the one or more biological fluids by pathogen inactivation with an ultraviolet light and a pathogen inactivation compound in admixture with the one or more biological fluids.

Embodiment 85: The method of any one of embodiments 82-84, wherein a treatment profile for the treatment of the one or more biological fluids is determined, at least in part, by the identifying information of the one or more identifying information fields.

Embodiment 86: The method of any one of embodiments 82-85, wherein the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

Embodiment 87: The method of any one of embodiments 82-86, wherein the method further comprises:
  at the electronic device configured to treat one or more biological fluids, wherein the electronic device includes a display and an interface configured to accept one or more inputs from a user of the electronic device:
    displaying a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device;
    when either the first button, or second button of the first graphical user interface is selected by the user, displaying a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and
    when the first button of the second graphical user interface is selected by the user, displaying a third graphical user interface, wherein the third graphical user interface includes a first visual panel that is configured to visually represent a status of the treatment process of the biological fluid.

Embodiment 88: The method of embodiment 87, wherein the first graphical user interface includes a third button, wherein the third button corresponds to the platform loading process applied to both the first treatment chamber and second treatment chamber for operating the electronic device.

Embodiment 89: The method of embodiment 88, wherein the method further comprises:
  when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
  when the first button of the second graphical user interface is selected by the user, displaying a third graphical user interface, wherein the third graphical user interface includes a first visual panel that is configured to visually represent a status of the treatment process of the biological fluid.

Embodiment 90: The method of any one of embodiments 87-89, wherein the first button of the second graphical user interface can only be selected by the user when a container with a biological fluid to be treated is detected in the first or second treatment chamber, and the electronic device detects that the first and second treatment chambers are in a closed position.

Embodiment 91: The method of any one of embodiments 87-90, wherein the first visual panel of the third graphical user interface includes a first time indicator, and wherein the first time indicator visually depicts an elapsed time since the processing step has started.

Embodiment 92: The method of any one of embodiments 87-91, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

Embodiment 93: The method of embodiment 92, wherein the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

Embodiment 94: The method of embodiment 93 further comprising directing the user to discard the one or more biological fluids.

Embodiment 95: The method of any one of embodiments 87-94, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

Embodiment 96: The method of embodiment 95, wherein the sixth graphical interface includes a fourth button that when selected allows the user to view an event history of the electronic device.

Embodiment 97: The method of embodiment 95 or 96, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

Embodiment 98: The method of any one of embodiments 82-86, wherein the method further comprises:
at the electronic device configured to treat one or more biological fluids, wherein the electronic device includes a display and an interface configured to accept one or more inputs from a user of the electronic device:
displaying a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device;
when the first button is active, displaying a second graphical user interface, wherein the second graphical user interface includes an image that visually depicts one or more steps that the user is to engage in so as to perform the first platform-loading process of the first chamber at the electronic device;
when the second button is active, displaying a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids; and
when the third button is active, displaying a fourth graphical user interface, wherein the fourth graphical user interface includes an image that visually depicts one or more steps that the user is to engage in so as to perform the second platform-loading process of the first treatment chamber at the electronic device; and
when the fourth button is active, displaying a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

Embodiment 99: The method of embodiment 98, wherein when the first button of the fifth graphical user interface is active, the method further comprises displaying a sixth graphical user interface, wherein the sixth graphical user interface includes a first indicator bar, and wherein the first indicator bar in configured to provide the user with a visual depiction of a status of a processing step associated with electronic device.

Embodiment 100: The method of any one of embodiments 98-99, wherein a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

Embodiment 101: The method of any one of embodiments 98-100 wherein the fifth graphical user interface includes a second button that when selected by the user is configured to provide a plurality of graphical user interfaces that are configured to guide the user on preparing a biological fluid for processing using the second treatment chamber of the device.

Embodiment 102: The method of embodiment 101, wherein the method further includes displaying a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

Embodiment 103: The method of embodiment 102, wherein when the user selects the first button of the ninth graphical user interface, the method further comprises displaying a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

Embodiment 104: The method of embodiment 103, wherein the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

Embodiment 105: The method of embodiment 103, wherein the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

Embodiment 106: The method of any one of embodiments 98-105 wherein the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

Embodiment 107: The method of any one of embodiments 98-105 wherein the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

Embodiment 108: A computing system with an electronic device configured to treat one or more biological fluids, comprising:
a display;
a user interface configured to receive inputs from a user of the system;
a memory; and
one or more processors,
wherein one or more programs are stored in the memory and configured to be executed by the one or more processors, the one or more programs when executed by the one or more processors cause the processor to:
display one or more graphical user interfaces directed to a platform-loading process, wherein the one or more graphical user interfaces are configured to acquire input data corresponding to applying the platform-loading process to a first treatment chamber, applying the platform-loading process to a second treatment chamber, or applying the platform-loading process to both the first treatment chamber and the second treatment chamber;
display one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids; and
display one or more graphical user interfaces directed to a treatment process, wherein the one or more graphical user interfaces are configured to visually represent a status of the treatment process of the biological fluid.

Embodiment 109: The system of embodiment 108, wherein the electronic device is configured to treat the one or more biological fluids by illumination with an ultraviolet light.

Embodiment 110: The system of any one of embodiments 108-109, wherein the electronic device is configured to treat the one or more biological fluids by pathogen inactivation with an ultraviolet light and a pathogen inactivation compound in admixture with the one or more biological fluids.

Embodiment 111: The system of any one of embodiments 108-110, wherein a treatment profile for the treatment of the one or more biological fluids is determined, at least in part, by the identifying information of the one or more identifying information fields.

Embodiment 112: The system of any one of embodiments 108-111, wherein the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

Embodiment 113: The system of embodiments 108-112, wherein the one or more processors are further caused to:

display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device;

when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and when the first button of the second graphical user interface is selected by the user, display a third graphical user interface, wherein the third graphical user interface includes a first visual panel that is configured to visually represent a status of the treatment process of the biological fluid.

Embodiment 114: The system of embodiment 113, wherein the first graphical user interface includes a third button, wherein the third button corresponds to the platform loading process applied to both the first treatment chamber and second treatment chamber for operating the electronic device.

Embodiment 115: The system of embodiment 114, wherein the method further comprises:

when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and when the first button of the second graphical user interface is selected by the user, displaying a third graphical user interface, wherein the third graphical user interface includes a first visual panel that is configured to visually represent a status of the treatment process of the biological fluid.

Embodiment 116: The system of any one of embodiments 113-115, wherein the first button of the second graphical user interface can only be selected by the user when a container with a biological fluid to be treated is detected in the first or second treatment chamber, and the electronic device detects that the first and second treatment chambers are in a closed position.

Embodiment 117: The system of any one of embodiments 113-116, wherein the first visual panel of the third graphical user interface includes a first time indicator, and wherein the first time indicator visually depicts an elapsed time since the processing step has started.

Embodiment 118: The system of any one of embodiments 113-117, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

Embodiment 119: The system of embodiment 118, wherein the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

Embodiment 120: The system of embodiment 119 further comprising directing the user to discard the one or more biological fluids.

Embodiment 121: The system of any one of embodiments 113-120, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

Embodiment 122: The system of embodiment 121, wherein the sixth graphical interface includes a fourth button that when selected allows the user to view an event history of the electronic device.

Embodiment 123: The system of embodiments 121 or 122, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

Embodiment 124: The system of embodiment 108-112, wherein the one or more processors are further caused to:

display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device;

when the first button is active, display a second graphical user interface, wherein the second graphical user interface includes an image that visually depicts one or more steps that the user is to engage in so as to perform the first platform-loading process of the first chamber at the electronic device;

when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids;

when the third button is active, display a fourth graphical user interface, wherein the fourth graphical user interface includes an image that visually depicts one or more steps that the user is to engage in so as to perform the second platform-loading process of the first treatment chamber at the electronic device; and when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

Embodiment 125: The system of embodiment 124, wherein when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

Embodiment 126: The system of any one of embodiments 124-125, wherein a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

Embodiment 127: The system of any one of embodiments 124-126 wherein the fifth graphical user interface includes a second button that when selected by the user is configured to provide a plurality of graphical user interfaces that are configured to guide the user on preparing a biological fluid for processing using the second treatment chamber of the device.

Embodiment 128: The system of embodiment 127, wherein the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

Embodiment 129: The system of embodiment 128, wherein when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

Embodiment 130: The system of embodiment 129, wherein the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

Embodiment 131: The system of embodiment 129, wherein the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

Embodiment 132: The system of any one of embodiments 124-131 wherein the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

Embodiment 133: The system of any one of embodiments 124-131 wherein the first visual panel and the second visual panel are oriented next to one another about a horizontal axis, and wherein the orientation of the first visual panel with respect to the second visual panel is configured to be substantially identical to the orientation of the first treatment chamber with respect to the second treatment of the electronic device.

Embodiment 134: A computer readable storage medium storing one or more programs, the one or more programs comprising instructions, which when executed by an electronic device configured to treat one or more biological fluids with a display and a user input interface, cause the device to:
  display one or more graphical user interfaces directed to a platform-loading process, wherein the one or more graphical user interfaces are configured to acquire input data corresponding to applying the platform-loading process to a first treatment chamber, applying the platform-loading process to a second treatment chamber, or applying the platform-loading process to both the first treatment chamber and the second treatment chamber;
  display one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids; and
  display one or more graphical user interfaces directed to a treatment process, wherein the one or more graphical user interfaces are configured to visually represent a status of the treatment process of the biological fluid.

Embodiment 135: The computer readable storage medium of embodiment 134, wherein the electronic device is configured to treat the one or more biological fluids by illumination with an ultraviolet light.

Embodiment 136: The computer readable storage medium of any one of embodiments 134-135, wherein the electronic device is configured to treat the one or more biological fluids by pathogen inactivation with an ultraviolet light and a pathogen inactivation compound in admixture with the one or more biological fluids.

Embodiment 137: The computer readable storage medium of any one of embodiments 134-136, wherein a treatment profile for the treatment of the one or more biological fluids is determined, at least in part, by the identifying information of the one or more identifying information fields.

Embodiment 138: The computer readable storage medium of any one of embodiments 134-137, wherein the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

Embodiment 139: The computer readable storage medium of any one of embodiments 134-138 wherein the device is further caused to:
  display a first graphical user interface, wherein the first graphical user interface includes a first button, wherein the first button corresponds to a platform loading process applied to a first treatment chamber for operating the electronic device, and a second button, wherein the second button corresponds to the platform loading process applied to a second treatment chamber for operating the electronic device;
  when either the first button, or second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the biological fluid; and
  when the first button of the second graphical user interface is selected by the user, display a third graphical user interface, wherein the third graphical user interface includes a first visual panel that is configured to visually represent a status of the treatment process of the biological fluid.

Embodiment 140: The computer readable storage medium of embodiment 139, wherein the first graphical user interface includes a third button, wherein the third button corresponds to the platform loading process applied to both the first treatment chamber and second treatment chamber for operating the electronic device.

Embodiment 141: The computer readable storage medium of embodiment 140, wherein the device is further caused to:
  when the third button of the first graphical user interface is selected by the user, display a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
  when the first button of the second graphical user interface is selected by the user, display a third graphical user interface, wherein the third graphical user interface includes a first visual panel that is configured to visually represent a status of the treatment process of the biological fluid.

Embodiment 142: The computer readable storage medium of any one of embodiments 139-141, wherein the first button of the second graphical user interface can only be selected by the user when a container with a biological fluid to be treated is detected in the first or second treatment chamber, and the electronic device detects that the first and second treatment chambers are in a closed position.

Embodiment 143: The computer readable storage medium of any one of embodiments 139-142, wherein the first visual panel of the third graphical user interface includes a first time indicator, and wherein the first time indicator visually depicts an elapsed time since the processing step has started.

Embodiment 144: The computer readable storage medium of any one of embodiments 139-143, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since a treatment process of the electronic device has been completed.

Embodiment 145: The system of embodiment 144, wherein the method further comprises displaying a fifth graphical user interface, wherein the fifth graphical user interface is configured to alert the user to an error, if the electronic device determines that an error has occurred during the treatment process or when the elapsed time since the treatment process has been completed is greater than a pre-determined threshold.

Embodiment 146: The computer readable storage medium of embodiment 145 further comprising directing the user to discard the one or more biological fluids.

Embodiment 147: The computer readable storage medium of any one of embodiments 139-146, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of a treatment process.

Embodiment 148: The computer readable storage medium of embodiment 147, wherein the sixth graphical interface includes a fourth button that when selected allows the user to view an event history of the electronic device.

Embodiment 149: The computer readable storage medium of embodiments 147 or 148, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

Embodiment 150: The computer readable storage medium of any one of embodiments 134-138 wherein the device is further caused to:
display a first graphical user interface, wherein the first graphical interface includes a plurality of buttons comprising images that visually depict one or more steps that a user is to engage in to perform a platform-loading process, and wherein a first button of the plurality of buttons corresponds to a first platform-loading process of a first treatment chamber for operating the electronic device, wherein a second button of the plurality of buttons corresponds to a scanning process for operating the electronic device, wherein a third button of the plurality of buttons corresponds to a second platform-loading process of a first treatment chamber for operating the electronic device, and wherein a fourth button of the plurality of buttons corresponds to a processing initialization process for operating the electronic device;
when the first button is active, display a second graphical user interface, wherein the second graphical user interface includes an image that visually depicts one or more steps that the user is to engage in so as to perform the first platform-loading process of the first chamber at the electronic device;
when the second button is active, display a third graphical user interface, wherein the third graphical user interface includes an image that visually depicts one or more steps that the user is to engage in so as to perform the scanning process for operating the electronic device, and wherein the third graphical user interface includes one or more identifying information fields that are filled when a scanner scans one or more identifying information elements associated with the one or more biological fluids;
when the third button is active, display a fourth graphical user interface, wherein the fourth graphical user interface includes an image that visually depicts one or more steps that the user is to engage in so as to perform the second platform-loading process of the first treatment chamber at the electronic device; and
when the fourth button is active, display a fifth graphical user interface, wherein the fifth graphical user interface includes a first visual panel that is configured to visually represent a status of the first treatment chamber of the electronic device, wherein the fifth graphical user interface includes a second visual panel that is configured to visually represent a status of a second treatment chamber of the electronic device, and wherein the fifth graphical user interface includes a first button that when selected by a user is configured to cause the electronic device to initiate processing of the one or more biological fluids by the first treatment chamber of the device.

Embodiment 151: The computer readable storage medium of any one of embodiments 150, wherein when the first button of the fifth graphical user interface is active, the processor is further caused to display a sixth graphical user interface, wherein the sixth graphical user interface includes a first indicator bar, and wherein the first indicator bar in configured to provide the user with a visual depiction of a status of a processing step associated with electronic device.

Embodiment 152: The computer readable storage medium of any one of embodiments 150-151, wherein a seventh graphical user interface is presented to the user after the processing step associated with the electronic device is completed, and wherein the seventh graphical user interface includes a first visual indicator that corresponds to the status of the processing step, and wherein the seventh graphical user interface includes a first time indicator, and wherein the first time indicator visually depicts an elapsed time since the treatment process of the electronic device has been completed.

Embodiment 153: The computer readable storage medium of any one of embodiments 150-152 wherein the fifth graphical user interface includes a second button that when selected by the user is configured to provide a plurality of graphical user interfaces that are configured to guide the user on preparing a biological fluid for processing using the second treatment chamber of the device.

Embodiment 154: The computer readable storage medium of embodiment 153, wherein the processor is further caused to display a ninth graphical user interface once the biological fluid has been prepared for processing using the second treatment chamber, wherein the ninth graphical user interface includes a first button that is selectable by the user, and that when selected by the user is configured to cause the electronic device to initiate processing of the one or more biological fluids by the second treatment chamber of the device.

Embodiment 155: The computer readable storage medium of embodiment 154, wherein when the user selects the first button of the ninth graphical user interface, the processor is further caused to display a tenth graphical user interface, wherein the tenth graphical user interface includes a first indicator bar, wherein the first indicator bar is configured to provide the user with a visual depiction of a status of a processing step occurring in the first treatment chamber of the electronic device, and wherein the tenth graphical user interface includes a second indicator bar, and wherein the second indicator bar is configured to provide the user with a visual depiction of a status of a processing step occurring in the second treatment chamber of the electronic device.

Embodiment 156: The computer readable storage medium of embodiment 155, wherein the first indicator bar and the second indicator bar are oriented next to one another about a vertical axis, and wherein the orientation of the first indicator bar with respect to the second indicator bar is configured to be substantially identical to the orientation of the first treatment chamber with respect to the second treatment chamber of the electronic device.

Embodiment 157: The computer readable storage medium of embodiment 155, wherein the first indicator bar and the second indicator bar are oriented next to one another about a horizontal axis, and wherein the orientation of the first indicator bar with respect to the second indicator bar is configured to be substantially identical to the orientation of the first treatment chamber with respect to the second treatment chamber of the electronic device.

Embodiment 158: The computer readable storage medium of any one of embodiments 150-157 wherein the first visual panel and the second visual panel are oriented next to one another about a vertical axis, and wherein the orientation of the first visual panel with respect to the second visual panel is configured to be substantially identical to the orientation of the first treatment chamber with respect to the second treatment chamber of the electronic device.

Embodiment 159: The computer readable storage medium of any one of embodiments 150-157 wherein the first visual panel and the second visual panel are oriented next to one another about a horizontal axis, and wherein the orientation of the first visual panel with respect to the second visual panel is configured to be substantially identical to the orientation of the first treatment chamber with respect to the second treatment chamber of the electronic device.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method, comprising:
at an electronic device configured to treat one or more biological fluids by illumination with an ultraviolet light, wherein the electronic device includes a display and an interface configured to accept one or more inputs from a user of the electronic device:
displaying one or more graphical user interfaces directed to a platform-loading process, wherein the one or more graphical user interfaces are configured to acquire first input data corresponding to applying the platform-loading process to a first treatment chamber, second input data corresponding to applying the platform-loading process to a second treatment chamber, and third input data corresponding to applying the platform-loading process to both the first treatment chamber and the second treatment chamber;
displaying one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids;
displaying one or more graphical user interfaces directed to a treatment process of the first treatment chamber, the second treatment chamber, or both, wherein the one or more graphical user interfaces are configured to visually represent a status of the treatment process of the one or more biological fluids, wherein the one or more graphical user interfaces configured to visually represent a status of the treatment process comprises a graphical user interface configured to visually represent how much time has elapsed in the treatment process and/or a graphical user interface configured to visually represent how much time is left to go before the treatment process has completed;
displaying one or more graphical user interfaces configured to visually represent an amount of time that has elapsed since a treatment process has completed; and
displaying one or more graphical user interfaces, wherein the one or more graphical user interfaces are configured to alert the user to an error when the elapsed time since the treatment process has completed is greater than a pre-determined threshold, wherein the error indicates a treatment error and wherein the biological fluid(s) should be discarded upon indication of the treatment error.

2. The method of claim 1, wherein the electronic device is configured to treat the one or more biological fluids by pathogen inactivation with an ultraviolet light and a pathogen inactivation compound in admixture with the one or more biological fluids.

3. The method claim 1, wherein a treatment profile for the treatment of the one or more biological fluids is determined, at least in part, by the one or more identifying information elements of the one or more identifying information fields.

4. The method of claim 1, wherein the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

5. The method of claim 1, wherein the method further comprises:
- at the electronic device configured to treat one or more biological fluids:
  - displaying a first graphical user interface, wherein the first graphical user interface includes a first button, wherein the first button corresponds to the platform loading process applied to the first treatment chamber for operating the electronic device, and a second button, wherein the second button corresponds to the platform loading process applied to the second treatment chamber for operating the electronic device;
  - when either the first button or the second button of the first graphical user interface is selected by the user, displaying a second graphical user interface, wherein the second graphical user interface includes an image that instructs the user to perform the platform-loading process to either the first treatment chamber or the second treatment chamber, respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
  - when the first button of the second graphical user interface is selected by the user, displaying a third graphical user interface, wherein the third graphical user interface includes a first visual panel that-is configured to visually represent a status of the treatment process of the one or more biological fluids.

6. The method of claim 5, wherein the first graphical user interface includes a third button, wherein the third button corresponds to the platform-loading process applied to both the first treatment chamber and the second treatment chamber for operating the electronic device.

7. The method of claim 6, wherein the method further comprises:
- when the third button of the first graphical user interface is selected by the user, displaying a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
- when the first button of the second graphical user interface is selected by the user, displaying a third graphical user interface, wherein the third graphical user interface includes first visual panel that is configured to visually represent a status of the treatment process of the one or more biological fluids.

8. The method of claim 7, wherein the first button of the second graphical user interface is selectable by the user when a container with a biological fluid to be treated is detected in the first or the second treatment chamber, and the electronic device detects that the first and the second treatment chambers are in a closed position.

9. The method of claim 7, wherein the first visual panel of the third graphical user interface includes a first time indicator, and wherein the first time indicator visually depicts an elapsed time since the treatment process has started.

10. The method of claim 9, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since the treatment process of the electronic device has been completed.

11. The method of claim 10, wherein the method further comprises displaying a fifth graphical user interface, wherein the fifth graphical user interface is configured to alert the user to an error, if the electronic device determines that an error has occurred during the treatment process.

12. The method of claim 11, further comprising: directing the user to discard the one or more biological fluids.

13. The method of claim 11, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of the treatment process.

14. The method of claim 13, wherein the sixth graphical interface includes a fourth button that when selected allows the user to view an event history of the electronic device.

15. The method of claim 13, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

16. A computing system with an electronic device configured to treat one or more biological fluids by illumination with an ultraviolet light, comprising:
a display;
a user interface configured to receive inputs from a user of the system;
a memory; and
one or more processors,
wherein one or more programs are stored in the memory and configured to be executed by the one or more processors, the one or more programs when executed by the one or more processors cause the one or more processors to:
display one or more graphical user interfaces directed to a platform-loading process, wherein the one or more graphical user interfaces are configured to acquire first input data corresponding to applying the platform-loading process to a first treatment chamber, second input data corresponding to applying the platform-loading process to a second treatment chamber, and third input data corresponding to applying the platform-loading process to both the first treatment chamber and the second treatment chamber;
display one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids;
display one or more graphical user interfaces directed to a treatment process of the first treatment chamber, the second treatment chamber, or both, wherein the one or more graphical user interfaces are configured to visually represent a status of the treatment process of the one or more biological fluids, wherein the one or more graphical user interfaces configured to visually represent a status of the treatment process comprises a graphical user interface configured to visually represent how much time has elapsed in the treatment process and/or a graphical user interface configured to visually represent how much time is left to go before the treatment process has completed;
display one or more graphical user interfaces configured to visually represent an amount of time that has elapsed since treatment process has completed; and
display one or more graphical user interfaces, wherein the one or more graphical user interfaces are configured to alert the user to an error when the elapsed time since the treatment process has completed is greater than a pre-determined threshold, wherein the error indicates a treatment error and wherein the biological fluid(s) should be discarded upon the indication of the treatment error.

17. The system of claim 16, wherein the electronic device is configured to treat the one or more biological fluids by pathogen inactivation with an ultraviolet light and a pathogen inactivation compound in admixture with the one or more biological fluids.

18. The system of claim 16, wherein a treatment profile for the treatment of the one or more biological fluids is determined, at least in part, by the one or more identifying information elements of the one or more identifying information fields.

19. The system of claim 16, wherein the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

20. The system of claim 16, wherein the one or more processors are further caused to: display a first graphical user interface, wherein the first graphical user interface includes a first button, wherein the first button corresponds to the platform-loading process applied to the first treatment chamber for operating the electronic device, and a second button, wherein the second button corresponds to the platform loading process applied to the second treatment chamber for operating the electronic device;
when either the first button or the second button of the first graphical user interface is selected by the user, display a second graphical user interface, wherein the second graphical user interface includes an image that instructs the user to perform the platform-loading process to either the first treatment chamber or the second treatment chamber, respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
when the first button of the second graphical user interface is selected by the user, display a third graphical user interface, wherein the third graphical user interface includes a first visual panel that is configured to visually represent a status of the treatment process of the one or more biological fluids.

21. The system of claim 20, wherein the first graphical user interface includes a third button, wherein the third button corresponds to the platform-loading process applied to both the first treatment chamber and the second treatment chamber for operating the electronic device.

22. The system of claim 21, wherein the one or more processors are further caused to:
display a second graphical user interface when the third button of the first graphical user interface is selected by the user, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and
display a third graphical user interface when the first button of the second graphical user interface is selected by the user, wherein the third graphical user interface includes a first visual panel that is configured to visually represent a status of the treatment process of the one or more biological fluids.

23. The system of claim 22, wherein the first button of the second graphical user interface is selectable by the user when a container with a biological fluid to be treated is detected in the first or the second treatment chamber, and the electronic device detects that the first and the second treatment chambers are in a closed position.

24. The system of claim 22, wherein the first visual panel of the third graphical user interface includes a first time indicator, and wherein the first time indicator visually depicts an elapsed time since the treatment process has started.

25. The system of claim 24, wherein the one or more processors are further caused to: display a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since the treatment process of the electronic device has been completed.

26. The system of claim 25, wherein the one or more processors are further caused to: display a fifth graphical user interface, wherein the fifth graphical user interface is configured to alert the user to an error, if the electronic device determines that an error has occurred during the treatment process.

27. The system of claim 26, further comprising: directing the user to discard the one or more biological fluids.

28. The system of claim 26, wherein the one or more processors are further caused to: display a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of the treatment process.

29. The system of claim 28, wherein the sixth graphical interface includes a fourth button that when selected allows the user to view an event history of the electronic device.

30. The system of claim 28, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of the one or more biological fluids, and wherein the seventh graphical user interface includes a first button that when selected by the user performs a search of the event history of the electronic device based on the one or more treatment event information field filled in by the user.

31. A computer readable storage medium storing one or more programs, the one or more programs comprising instructions, which when executed by an electronic device configured to treat one or more biological fluids by illumination with an ultraviolet light, the electronic device comprising a display and a user input interface, cause the device to:
  display one or more graphical user interfaces directed to a platform-loading process, wherein the one or more graphical user interfaces are configured to acquire first input data corresponding to applying the platform-loading process to a first treatment chamber, second input data corresponding to applying the platform-loading process to a second treatment chamber, and third input data corresponding to applying the platform-loading process to both the first treatment chamber and the second treatment chamber;
  display one or more graphical user interfaces directed to a scanning process, wherein the one or more graphical user interfaces are configured to acquire input data corresponding to one or more identifying information fields, wherein the one or more identifying information fields are associated with one or more identifying information elements associated with the one or more biological fluids;
  display one or more graphical user interfaces directed to a treatment process, wherein the one or more graphical user interfaces are configured to visually represent a status of the treatment process of the one or more biological fluids, wherein the one or more graphical user interfaces configured to visually represent a status of the treatment process comprises a graphical user interface configured to visually represent how much time has elapsed in the treatment process and/or a graphical user interface configured to visually represent how much time is left to go before the treatment process has completed;
  display one or more graphical user interfaces configured to visually represent an amount of time that has elapsed since a treatment process has completed; and
  display one or more graphical user interfaces, wherein the one or more graphical user interfaces are configured to alert the user to an error when the elapsed time since the treatment process has completed is greater than a pre-determined threshold, wherein the error indicates a treatment error and wherein the biological fluid(s) should be discarded upon the indication of the treatment error.

32. The computer readable storage medium of claim 31, wherein the electronic device is configured to treat the one or more biological fluids by pathogen inactivation with an ultraviolet light and a pathogen inactivation compound in admixture with the one or more biological fluids.

33. The computer readable storage medium of claim 31, wherein a treatment profile for the treatment of the one or more biological fluids is determined, at least in part, by the one or more identifying information elements of the one or more identifying information fields.

34. The computer readable storage medium of claim 31, wherein the one or more graphical user interfaces directed to a platform-loading process, the one or more graphical user interfaces directed to a scanning process, and the one or more graphical user interfaces directed to a treatment process are collectively configured to visually guide the user as to an operation of the electronic device.

35. The computer readable storage medium of claim 31, wherein the device is further caused to: display a first graphical user interface, wherein the first graphical user interface includes a first button, wherein the first button corresponds to the platform-loading process applied to the first treatment chamber for operating the electronic device, and a second button, wherein the second button corresponds to the platform loading process applied to the second treatment chamber for operating the electronic device;
  when either the first button or the second button of the first graphical user interface is selected by the user, display a second graphical user interface, wherein the second graphical user interface includes an image that instructs the user to perform the platform-loading process to either the first treatment chamber or the second treatment chamber respectively, wherein the second graphical user interface instructs the user to perform a scanning process and includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and when the first button of the second graphical user interface is selected by the user, display a third graphical user interface, wherein the third graphical user interface includes a first visual panel that is configured to visually represent a status of the treatment process of the one or more biological fluids.

36. The computer readable storage medium of claim 35, wherein the first graphical user interface includes a third button, wherein the third button corresponds to the platform-loading process applied to both the first treatment chamber and the second treatment chamber for operating the electronic device.

37. The computer readable storage medium of claim 36, wherein the device is further caused to:

when the third button of the first graphical user interface is selected by the user, display a second graphical user interface, wherein the second graphical user interface includes an image that instructs the user to perform the platform-loading process to the first chamber and the second treatment chamber, wherein the second graphical user interface includes one or more identifying information fields, wherein the one or more identifying information fields are associated with one or more identifying information elements associated with the one or more biological fluids, and wherein the second graphical user interface includes a first button that when selected by the user initiates a treatment process for the one or more biological fluids; and when the first button of the second graphical user interface is selected by the user, display a third graphical user interface, wherein the third graphical user interface includes a first visual panel that is configured to visually represent a status of the treatment process of the one or more biological fluids.

38. The computer readable storage medium of claim 37, wherein the first button of the second graphical user interface is selectable by the user when a container with a biological fluid to be treated is detected in the first or the second treatment chamber, and the electronic device detects that the first and the second treatment chambers are in a closed position.

39. The computer readable storage medium of claim 37, wherein the first visual panel of the third graphical user interface includes a first time indicator, and wherein the first time indicator visually depicts an elapsed time since the treatment process has started.

40. The computer readable storage medium of claim 39, wherein the method further comprises displaying a fourth graphical user interface, when the elapsed time of the first time indicator of the first visual panel of the third graphical user interface is greater than a pre-determined threshold for completion of a treatment process, and wherein the fourth graphical user interface includes a first visual indicator that corresponds to a first time indicator, and wherein the first time indicator visually depicts an elapsed time since the treatment process of the electronic device has been completed.

41. The system of claim 40, wherein the method further comprises displaying a fifth graphical user interface, wherein the fifth graphical user interface is configured to alert the user to an error, if the electronic device determines that an error has occurred during the treatment process.

42. The computer readable storage medium of claim 41, further comprising: directing the user to discard the one or more biological fluids.

43. The computer readable storage medium of claim 41, wherein the method further comprises displaying a sixth graphical user interface, wherein the sixth graphical interface includes a first button that when selected allows the user to search an event history of the electronic device, wherein the sixth graphical interface includes a second button that when selected allows the user to configure one or more settings of the electronic device, and wherein the sixth graphical user interface includes a third button that when selected allows the user to initiate the selection of the treatment process.

44. The computer readable storage medium of claim 43, wherein the sixth graphical interface includes a fourth button that when selected allows the user to view an event history of the electronic device.

45. The computer readable storage medium of claim 43, wherein if the first button of the sixth graphical user interface is selected, displaying a seventh graphical user interface, wherein the seventh graphical user interface includes one or more treatment event information fields that are filled in by the user, wherein the one or more treatment event information fields are associated with one or more treatment event information elements associated with the treatment of one or more biological fluids, and wherein the seventh graphical user interface includes a first button that when selected by the user performs a search of the event history of the electronic device based on the one or more treatment event information field filled in by the user.

\* \* \* \* \*